US012640133B2

(12) United States Patent
Lovchinsky et al.

(10) Patent No.: US 12,640,133 B2
(45) Date of Patent: May 26, 2026

(54) BINAURAL DATA SHARING IN EAR-WORN DEVICES USING NEURAL NETWORKS

(71) Applicant: Fortell Research Inc., New York, NY (US)

(72) Inventors: Igor Lovchinsky, New York, NY (US); Nathan Agmon, New York, NY (US); Philip Meyers, IV, Brooklyn, NY (US); Israel Malkin, Manhattan Beach, CA (US); Nicholas Morris, Brooklyn, NY (US); Mark Berry, Berlin (DE)

(73) Assignee: Fortell Research Inc., New York, NY (US)

( * ) Notice: Subject to any disclaimer, the term of this patent is extended or adjusted under 35 U.S.C. 154(b) by 0 days.

(21) Appl. No.: 19/379,332

(22) Filed: Nov. 4, 2025

(65) Prior Publication Data

US 2026/0128028 A1 May 7, 2026

Related U.S. Application Data

(60) Provisional application No. 63/792,602, filed on Apr. 22, 2025, provisional application No. 63/715,768, filed on Nov. 4, 2024.

(51) Int. Cl.
*H04R 25/00* (2006.01)
*G10K 11/175* (2006.01)
*H04R 1/10* (2006.01)

(52) U.S. Cl.
CPC ....... *G10K 11/1752* (2020.05); *H04R 1/1016* (2013.01); *G10K 2210/3038* (2013.01)

(58) Field of Classification Search
CPC ....... G10K 11/1752; G10K 2210/3038; H04R 25/507; H04R 25/552; H04R 25/554
See application file for complete search history.

(56) References Cited

U.S. PATENT DOCUMENTS

| | | | | |
|---|---|---|---|---|
| 2021/0166714 | A1* | 6/2021 | Linton | G10L 21/0264 |
| 2022/0124444 | A1 | 4/2022 | Andersen | |
| 2022/0141599 | A1 | 5/2022 | Kohl | |
| 2023/0262400 | A1 | 8/2023 | Hofbauer | |
| 2023/0306982 | A1* | 9/2023 | Lovchinsky | G10L 17/18 |

OTHER PUBLICATIONS

International Search Report and Written Opinion from International Application No. PCT/US2025/053999 mailed Feb. 10, 2026, 13 pages.

* cited by examiner

*Primary Examiner* — Ping Lee
(74) *Attorney, Agent, or Firm* — Shih IP Law Group, PLLC

(57) ABSTRACT

Described herein is binaural data sharing technology for ear-worn devices to improve audio processing performance. Different embodiments may include sharing of various data types, such as processed microphone signals, beamformed signals, neural network products (e.g., masks), and environmental metrics. For beamforming, devices may combine signals from both ears for improved directional selectivity or process separate beamformed signals independently. Devices may be configured to generate identical masks or average mask magnitude portions while preserving device-specific phase components. Neural networks may be trained to handle mixed-latency data, processing current local data with "stale" data from the other device. Environmental metrics like signal-to-noise ratios may be shared for coordinated responses to acoustic conditions. The technology may also apply to integrated devices like eyeglasses.

22 Claims, 24 Drawing Sheets

BINAURAL DATA SHARING IN EAR-WORN DEVICES USING NEURAL NETWORKS

BACKGROUND

Field

The present disclosure relates to ear-worn devices. Some aspects relate to binaural data sharing in ear-worn devices using neural networks.

Related Art

Ear-worn devices, such as hearing aids, may be used to help those who have trouble hearing to hear better. Typically, ear-worn devices amplify received sound. Some ear-worn devices may attempt to reduce noise in received sound.

SUMMARY

The inventors have recognized that for systems including two ear-worn devices, one worn on each ear, sharing data between the ear-worn devices may improve the performance of each of the ear-worn devices. For example, by sharing data between the two ear-worn devices, each device may leverage information from both ears to make better decisions about audio processing, noise reduction, and/or spatial focusing. This binaural approach may result in improved speech clarity, better noise suppression, and/or enhanced directional hearing compared to each device operating independently with only its own microphone data. The shared information may enable neural network processing that can take advantage of the spatial separation between the two ears, allowing for better localization of sound sources and more effective separation of desired speech from background noise. Additionally, the binaural data sharing may help reduce inconsistencies between the two ears that might otherwise create unnatural or distracting auditory experiences for the user.

The data shared may include, for example, processed microphone signals, beamformed microphone signals, masks, neural network products, and/or values for certain metrics. One important implementation challenge with binaural sharing is latency, as there may be a delay due to wireless transmission of data from ear-worn device to ear-worn device, in addition to audio processing delay. Latency that becomes too high may result in an intolerable experience for the wearer, for example due to the delay between the wearer hearing the direct path of sound versus the amplified path of sound resulting in echoes and/or due to lag between movement of lips and perception of sound.

As a first matter, the wireless communication protocol used may depend on latency considerations. For example, a lower latency protocol like near-field magnetic induction (NFMI)) may be preferable than a higher latency protocol like Bluetooth.

Furthermore, data transfer considerations may affect what kind of data may be shared. Wireless communication protocols may feature a data budget that must be satisfied in order to realize a tolerable latency. Audio signals may exceed the data budget, but neural network products such as masks may not. Furthermore, neural network products such as masks may be more resilient for use as "stale" features (i.e., used for processing later audio frames). On the other hand, shared audio signals may contain more useful data than neural network products, may allow for forming sophisticated beam patterns, and may be more natural inputs to neural networks.

Accordingly, the inventors have developed technology enabling transmission of different types of data. For scenarios in which latency constraints make transmitting audio signals impractical, the inventors have developed technology for enabling sharing of neural network products such as masks. One potential drawback of sharing masks rather than audio signals is that the neural network running on each ear-worn device might not receive the benefit of input data generated by the other ear-worn device. Accordingly, the inventors have developed technology enabling input of a shared mask to a neural network, thus providing the neural network with input data from the other ear-worn device. The inventors have recognized that in some scenarios, even sharing neural network products such as masks may be impractical due to latency constraints. Accordingly, the inventors have developed technology enabling "stale" neural network products (e.g., generated by the other ear-worn device from a previous frame of audio) from one ear-worn device to be input into the neural network of another ear-worn device.

As described above, a neural network may be able to provide higher quality output when it receives, as input, data from both ear-worn devices. Therefore, for this consideration, sharing data upstream of the neural network may be helpful. However, another consideration is binaural consistency. As described above, inconsistencies between the sound output from the device on each ear may create unnatural or distracting auditory experiences for the wearer. Sharing data upstream of the neural networks might not necessarily result in the same outputs, and thus might not ensure binaural consistency. While sharing and combining downstream data such as masks may be one method for ensuring binaural consistency (as described in more detail in the description below), sharing data both upstream and downstream of the neural network may be prohibitive in terms of latency. Accordingly, the inventors have developed technology that may help ensure binaural consistency when data (such as audio signals) upstream of the neural networks is shared.

In more detail, for embodiments that include beamforming, the description below describes technology enabling ear-worn devices to beamform signals from different ears together, or to use beamformed signals from different ears that are not beamformed together, both of which may result in enhanced spatial focusing capabilities compared to using signals from a single ear alone. When beamforming signals from different ears together, the system may combine microphone signals from both the left and right ear-worn devices to achieve improved directional selectivity and better attenuation of sounds originating from non-target directions. Alternatively, when using beamformed signals from different ears without beamforming them together, each ear may generate its own beamformed signals independently, and the neural network may process these separate beamformed signals to leverage the spatial information from both ears. Both approaches may take advantage of the natural spatial separation between the ears to create more effective directional patterns and provide enhanced audio processing capabilities, potentially providing additional noise suppression.

For embodiments that include generation of masks, the description below describes technology enabling both ear-worn devices to generate the same masks, or at least the same mask magnitude portions. This may help to ensure consistent audio enhancement decisions across both ears, thereby mitigating phantom voice effects and other binaural inconsistencies that could occur when one device processes speech differently than the other. The description below also describes technology for combining masks from different ear-worn devices, such as through averaging of mask values, which may further reduce binaural inconsistencies. When masks are complex (having both magnitude and phase components), the ear-worn devices may be configured to average the magnitude portions while maintaining device-specific phase portions to preserve spatial characteristics.

The description below also describes technology enabling neural networks on both ear-worn devices to order inputs in the same way, which may allow both devices to process the shared binaural data in a coordinated manner, leading to more predictable and consistent audio enhancement results. Furthermore, the description describes how neural networks may be trained to handle input data with mixed latencies, allowing the devices to effectively process both current data from their own microphones and potentially stale data received from the other device, thereby maintaining robust performance even when wireless transmission delays occur.

The description below also describes technology for sharing environmental metrics between ear-worn devices, such as signal-to-noise ratio measurements, which may enable coordinated responses to changing acoustic conditions. For example, when one ear-worn device detects a degraded acoustic environment, both devices may adjust their processing parameters accordingly, ensuring consistent performance across both ears even when acoustic conditions differ between the left and right sides of the user.

Similar techniques may be used for one ear-worn device (such as eyeglasses with built-in hearing aids) with two portions, one worn on each ear, where processing circuitry in the two portions (e.g., the right and left temple portions of eyeglasses) may communicate via internal electrical connections (e.g., implemented in the front rim of eyeglasses) rather than wireless links.

DETAILED DESCRIPTION

The aspects and embodiments described above, as well as additional aspects and embodiments, are described further below. These aspects and/or embodiments may be used individually, all together, or in any combination of two or more, as the disclosure is not limited in this respect.

Figure 1:
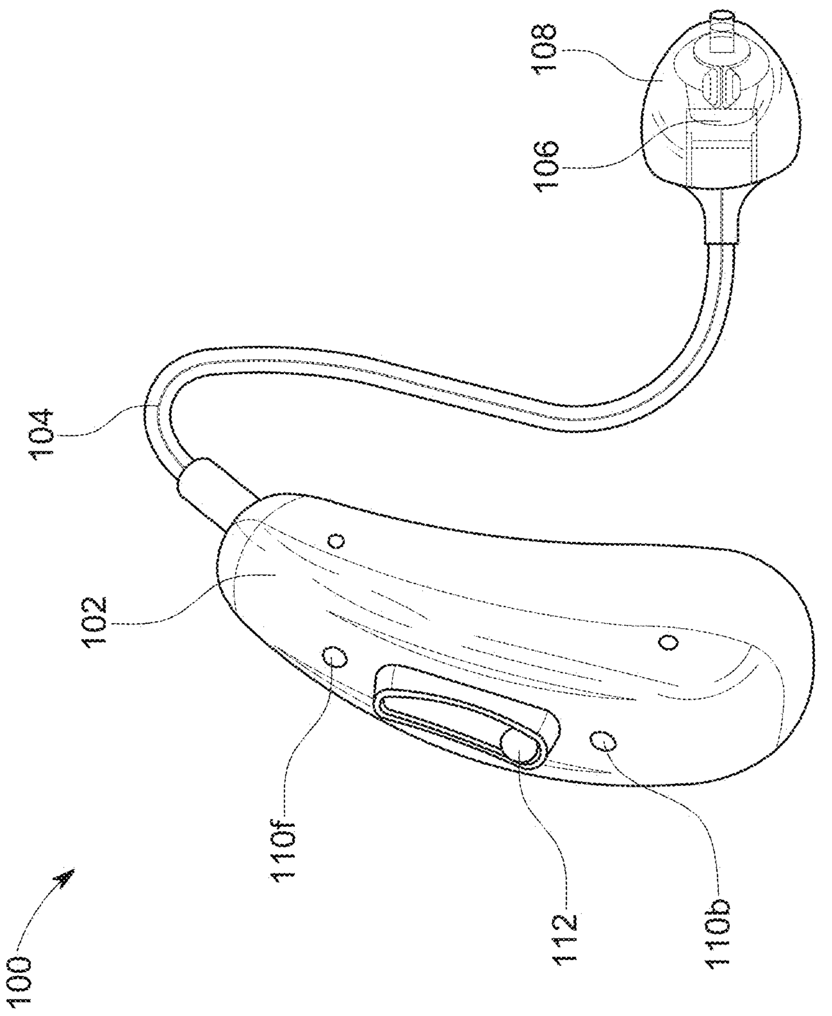
FIG. 1 illustrates a hearing aid, in accordance with certain embodiments described herein.

FIG. 1 illustrates a hearing aid 100, in accordance with certain embodiments described herein. The hearing aid 100 may be any of the ear-worn devices or hearing aids described herein. The hearing aid 100 is a receiver-in-canal (RIC) (also referred to as a receiver-in-the-ear (RITE)) type of hearing aid. However, any other type of hearing aid (e.g., behind-the-ear, in-the-ear, in-the-canal, completely-in-canal, open fit, etc.) may also be used. The hearing aid 100 includes a body 102, a receiver wire 104, a receiver 106, and a dome 108. The body 102 is coupled to the receiver wire 104 and the receiver wire 104 is coupled to the receiver 106. The dome 108 is placed over the receiver 106. The body 102 includes a front microphone 110*f*, a back microphone 110*b*, and a user input device 112. The body 102 additionally includes circuitry (e.g., any of the circuitry described hereinafter, aside from the receiver 106) not illustrated in FIG. 1. When the hearing aid 100 is worn, the front microphone 110*f* may be closer to the front of the wearer and the back microphone 110*b* may be closer to the back of the wearer. The front microphone 110*f* and the back microphone 110*b* may be configured to receive sound signals and generate audio signals based on the sound signals. Any of the microphones described herein may be the front microphone 110*f* and/or the back microphone 110*b* of the hearing aid 100. The user input device 112 (e.g., a button) may be configured to control certain functions of the hearing aid 100, such as volume, activation of neural network-based denoising, etc.

The receiver wire 104 may be configured to transmit audio signals from the body 102 to the receiver 106. The receiver 106 may be configured to receive audio signals (i.e., those audio signals generated by the body 102 and transmitted by the receiver wire 104) and generate sound signals based on the audio signals. The dome 108 may be configured to fit tightly inside the wearer's ear and direct the sound signal produced by the receiver 106 into the ear canal of the wearer.

In some embodiments, the length of the body 102 may be equal to 2 cm, equal to 5 cm, or between 2 and 5 cm in length. In some embodiments, the weight of the hearing aid 100 may be less than 4.5 grams. In some embodiments, the spacing between the microphones may be equal to 5 mm, equal to 12 mm, or between 5 and 12 mm. In some embodiments, the body 102 may include a battery (not visible in FIG. 1), such as a lithium ion rechargeable coin cell battery.

Figure 2:
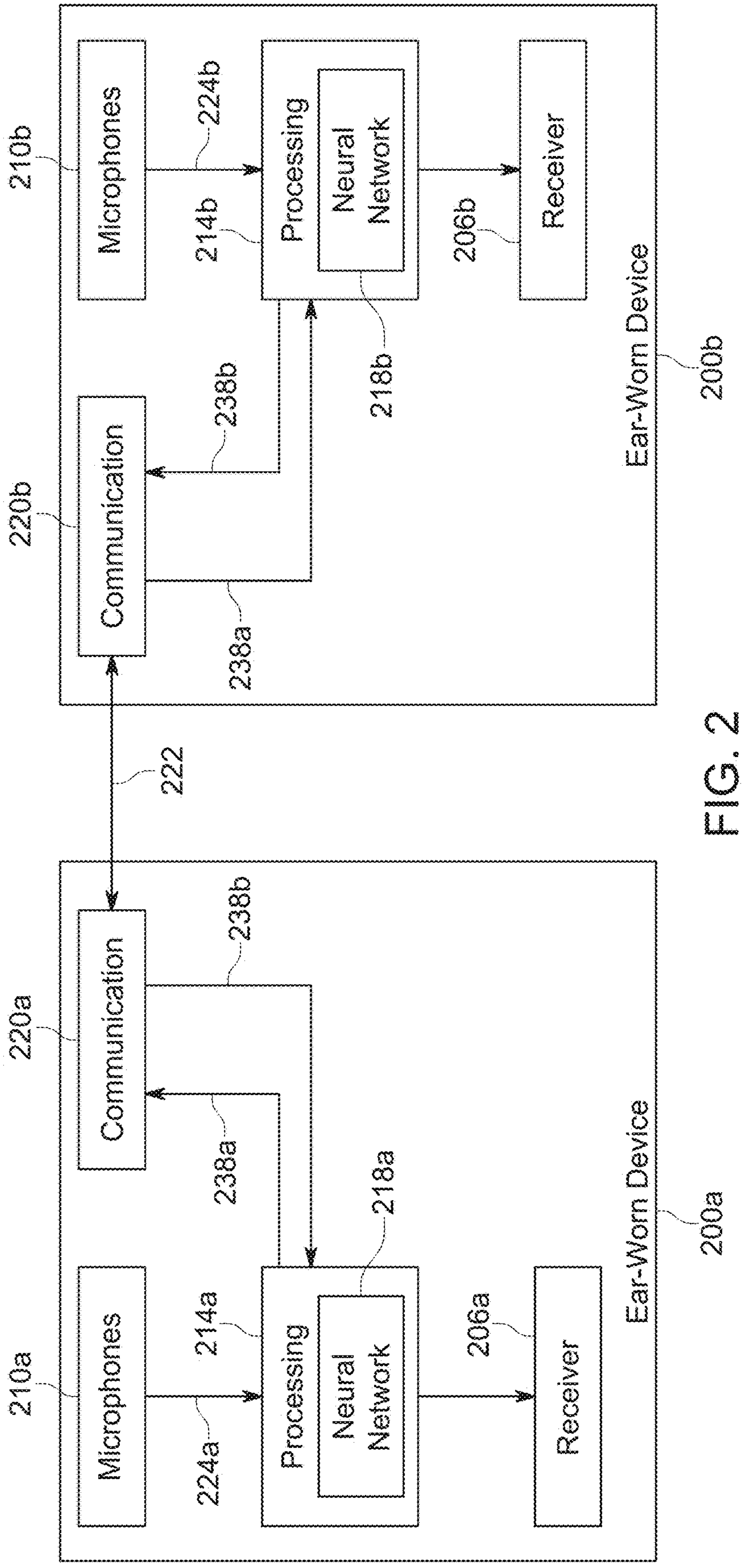
FIG. 2 illustrates a system of two ear-worn devices, and circuitry in each of the ear-worn devices, in accordance with certain embodiments described herein.

FIG. 2 illustrates a system of two ear-worn devices 200*a* and 200*b*, and circuitry in each of the ear-worn devices 200*a* and 200*b*, in accordance with certain embodiments described herein. Each of the ear-worn devices 200*a* and 200*b* may be, for example, a hearing aid (e.g., the hearing aid 100), a cochlear implant, or an earphone. The ear-worn device 200*a* may, for example, be worn on the right ear of a wearer, and the ear-worn device 200*b* may, for example, be worn on the left ear of a wearer. Thus, the ear-worn devices 200*a* and 200*b* may each be part of a pair. The ear-worn device 200*a* includes one or more microphones 210*a*, processing circuitry 214*a* including neural network circuitry 218*a*, a receiver 206*a*, and communication circuitry 220*a*. The ear-worn device 200*b* includes one or more microphones 210*b*, processing circuitry 214*b* including neural network circuitry 218*b*, a receiver 206*b*, and communication circuitry 220*b*. It should be appreciated that the ear-worn devices 200*a* and 200*b* may include more circuitry and components than shown and such circuitry and components may be disposed before, after, or between certain of the circuitry and components illustrated in FIG. 2.

The following description applies to each of the ear-worn devices 200*a* and 200*b*; for simplicity, the following description may refer generically to an ear-worn device 200 and to its components without an "a" or "b" appended to the reference numbers.

The one or more microphones 210 may include, for example, one, two, or more than two (e.g., 2, 3, 4, or more) microphones. (In other words, the one or more microphones 210*a* may include one, two, or more than two microphones, and the one or more microphones 210*b* may include one, two, or more than two microphones.) For example, the one or more microphones 210 may include two microphones, a front microphone that is closer to the front of the wearer of the ear-worn device and a back microphone that is closer to the back of the wearer of the ear-worn device (e.g., the microphones 110*f* and 110*b* in the hearing aid 100). As another example, the one or more microphones 210 may include more than two microphones in an array. The one or more microphones 210 may be configured to receive sound signals and generate audio signals from the sound signals. Audio signals generated by microphones may be referred to herein as microphone signals. FIG. 2 illustrates one or more microphone signals 224*a* generated by the one or more microphones 210*a* and inputted to the processing circuitry 214*a*, and one or more microphone signals 224*b* generated by the one or more microphones 210*b* and inputted to the processing circuitry 214*b*. Each microphone signal 224 may be generated by one of the one or more microphones 210. In some embodiments, an ear-worn device 200 may generate the same number of microphone signals 224 as its microphones 210, because each microphone may generate one microphone signal.

The processing circuitry 214 may be configured to process the one or more microphone signals 224. For example, the processing circuitry 214 may be configured to perform one or more of analog processing, digital processing, beamforming, and audio enhancement. In particular, the neural network circuitry 218 may be used for audio enhancement. Further description of processing circuitry may be found below with reference to FIGS. 3-22.

The receiver 206 (which may correspond to the receiver 106) may be configured to play back the output of the processing circuitry 214 as sound into the ear of the user. The receiver 206 may also be configured to implement digital-to-analog conversion prior to the playing back.

The communication circuitry 220*a* may be configured to facilitate communication between the ear-worn device 200*a* and other devices (e.g., the ear-worn device 200*b*, smartphones, tablets, laptops, computers), for example over wireless communication links (e.g., Bluetooth, a custom 2.4 GHz protocol, or near-field magnetic induction (NFMI). The communication circuitry 220*b* may be configured to facilitate communication between the ear-worn device 200*b* and other devices (e.g., the ear-worn device 200*a*, smartphones, tablets, laptops, computers), for example over wireless communication links (e.g., Bluetooth, a custom 2.4 GHz protocol, or near-field magnetic induction (NFMI)). FIG. 2 illustrates a wireless communication link 222 (e.g., a Bluetooth, custom 2.4 GHz protocol, or NFMI link) between the ear-worn device 200*a* and the ear-worn device 200*b*, facilitated by the communication circuitry 220*a* and the communication circuitry 220*b*. In other words, the communication circuitry 220*a* and the communication circuitry 220*b* may be configured to communicate over the wireless communication link 222. Thus, the car-worn devices 200*a* and 200*b* may be configured to send data to each other over the wireless communication link 222. When the communication circuitry 220*a* and 220*b* are configured to facilitate NFMI communication, the communication circuitry 220*a* and 220*b* may each include a magnetic induction transceiver and supporting control, audio processing, and power management circuitry. When the communication circuitry 220*a* and 220*b* are configured to facilitate Bluetooth or custom 2.4 GHz protocol communication, the communication circuitry 220 *a* and 220*b* may each include a transceiver (e.g., a 2.4 GHz transceiver) and supporting control, audio processing, and power management circuitry.

As illustrated in FIG. 2, the ear-worn device 200*a* may be configured to send shared data 238*a* from the processing circuitry 214*a* to the communication circuitry 220*a* and the ear-worn device 200*b* may be configured to send shared data 238*b* from the processing circuitry 214*b* to the communication circuitry 220*b*. The communication circuitry 220*a* may be configured to receive the shared data 238*b* from the communication circuitry 220*b* over the wireless communication link 222, and the ear-worn device 200*a* may be configured to input the shared data 238*b* to the processing circuitry 214*a*. The communication circuitry 220*b* may be configured to receive the shared data 238*a* from the communication circuitry 220*a* over the wireless communication link 222, and the ear-worn device 200*b* may be configured to input the shared data 238*a* to the processing circuitry 214*b*.

As will be described below, different embodiments may include an ear-worn device 200 outputting shared data 238 from different portions of the processing circuitry 214 to communication circuitry 220 for transfer to another ear-worn device. Different embodiments may also include an ear-worn device 200 inputting shared data 238 received from another ear-worn device 200 through communication circuitry 220 to different portions of the processing circuitry 214. Further examples will be described below with reference to FIGS. 7-22.

Figure 3:
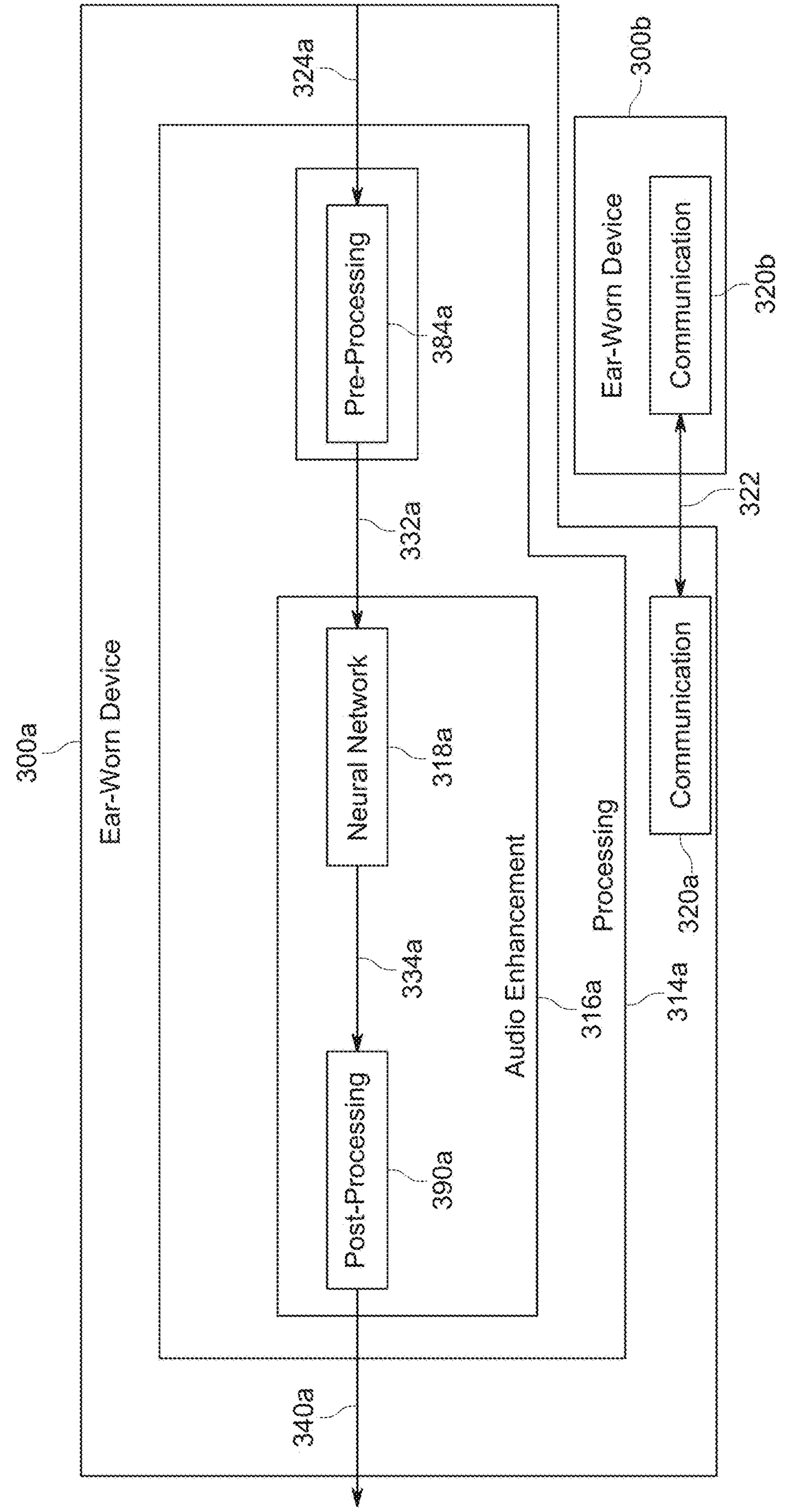
FIG. 3 illustrates an example system of two ear-worn devices, in accordance with certain embodiments described herein.

FIG. 3 illustrates an example system of two ear-worn devices 300*a* and 300*b*, in accordance with certain embodiments described herein. The ear-worn device 300*a* may, for example, be worn on the right ear of a wearer, and the ear-worn device 300*b* may, for example, be worn on the left ear of a wearer. Thus, the ear-worn devices 300*a* and 300*b* may each be part of a pair. FIG. 3 further illustrates circuitry in the ear-worn device 300*a* (which may correspond to the ear-worn device 200*a*). It should be appreciated that the circuitry and functionality described and illustrated for the ear-worn device 300*a* may be replicated in the ear-worn device 300*b* (which may correspond to the ear-worn device 200*b*), but may not be explicitly illustrated or described for simplicity. It should also be appreciated that the ear-worn device 300*a* may include more circuitry and components than shown and such circuitry and components may be disposed before, after, or between certain of the circuitry and components illustrated in FIG. 3.

The ear-worn device 300*a* includes processing circuitry 314*a* (which may correspond to the processing circuitry 214*a*) and communication circuitry 320*a* (which may correspond to the communication circuitry 220*a*). The processing circuitry 314*a* includes pre-processing circuitry 384*a* and audio enhancement circuitry 316*a*. The audio enhancement circuitry 316*a* includes neural network circuitry 318*a* (which may correspond to the neural network circuitry 218*a*) and post-processing circuitry 390*a*. (It should be appreciated that in some embodiments, the pre-processing circuitry 384*a* may be configured to perform certain types of audio enhancement as well.) This description will describe aspects of FIG. 3 that are generally applicable to the ear-worn devices of other figures, and will then describe other aspects with reference to each figure.

Generally, the pre-processing circuitry 384*a* may be configured to perform pre-processing on one or more microphone signals 324*a* (which may correspond to the one or more microphone signals 224*a*). One or more microphones (not illustrated, which may correspond to the microphones 210*a*) may be configured to generate the one or more microphone signals 324*a*. The pre-processing may include, for example, analog processing and digital processing. The pre-processing circuitry 384*a* may be configured to generate one or more audio signals 332*a*.

The audio enhancement circuitry 316*a* may be configured to perform audio enhancement on the one or more audio signals 332*a* (which may be in addition to noise reduction operations performed by the pre-processing circuitry 384*a*). Generally, the neural network circuitry 318*a* may be configured to receive the one or more audio signals 332*a* and implement one or more neural network layers trained to perform audio enhancement (where audio enhancement may include, for example, noise reduction and/or spatial focusing) based on the one or more audio signals 332*a*. (As an example of noise reduction and spatial focusing, noise reduction may include reducing background noise (i.e., non-speech), and spatial focusing may include direction-based reduction of non-desired speech, such as speech from in back of the wearer.) The neural network circuitry 318*a* may be configured to generate one or more neural network products 334*a*. As referred to herein, a neural network product should be understood to include a product of the processing of any neural network layer. Thus, a neural network product may be an intermediate product of a neural network (e.g., an intermediate representation, or in other words, a product of an intermediate or non-final layer of a neural network and/or a product that may be input to a subsequent layer of the neural network) or a final product of a neural network (e.g., a product of a final layer of a neural network and/or a product that might not be input to a subsequent layer of that neural network, one example of such a product being a mask). The post-processing circuitry 390*a* may be configured to perform post-processing using, at least in part, the one or more neural network products 334*a*. The post-processing circuitry 390*a* may be configured to output an output audio signal 340*a* (which may then be played back by a receiver, such as the receiver 206*a*).

The communication circuitry 320*a* may be configured to communicate with the communication circuitry 320*b* (which may correspond to the communication circuitry 220*b*) of the ear-worn device 300*b* over the wireless communication link 322 (which may correspond to the wireless communication link 222). For example, the wireless communication link 322 may be a Bluetooth, custom 2.4 GHz protocol, or near-field magnetic induction (NFMI) communication link. Subsequent figures might not illustrate the wireless communication link 322 explicitly, but may instead illustrate specific data (which may correspond to the shared data 238*a* and 238*b*) transmitted over the wireless communication link 322. The description below will describe various data that two ear-worn devices may share.

Figure 4:
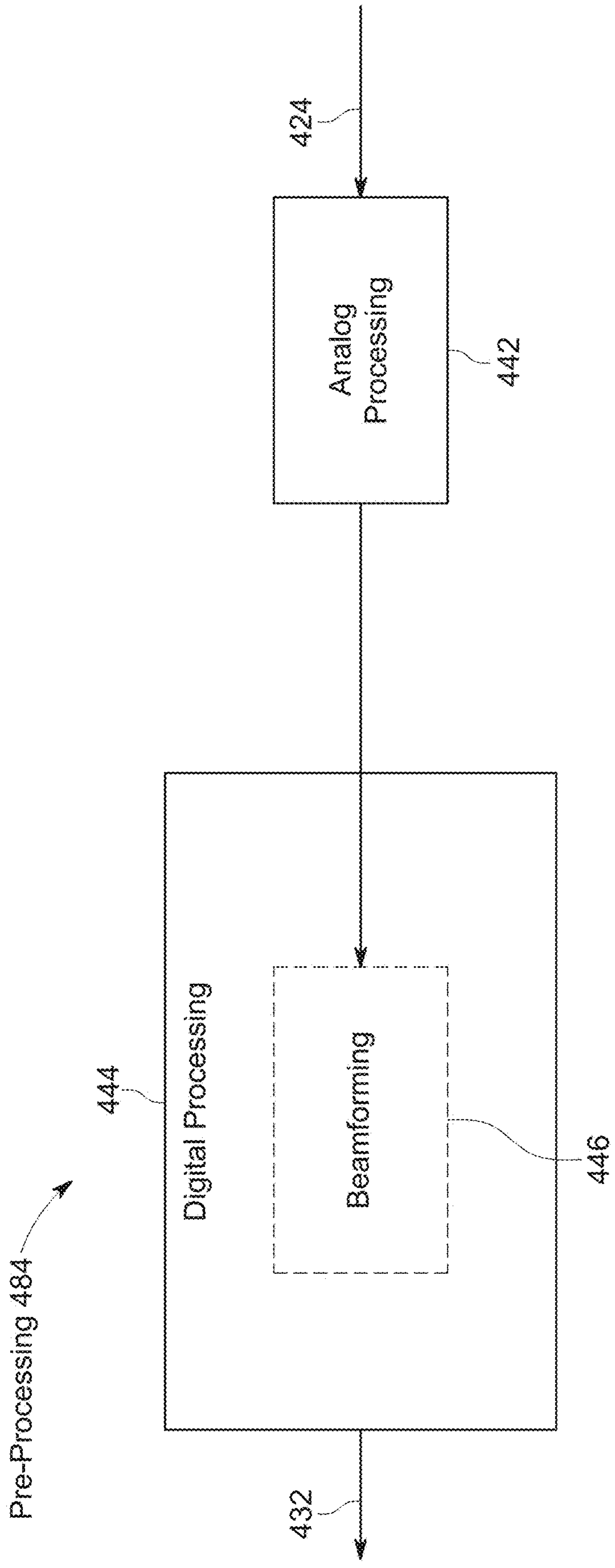
FIG. 4 illustrates example pre-processing circuitry, in accordance with certain embodiments described herein.

FIG. 4 illustrates example pre-processing circuitry 484 (which may correspond to the pre-processing circuitry 384*a*), in accordance with certain embodiments described herein. It should also be appreciated that the pre-processing circuitry 484 may include more circuitry and components than shown and such circuitry and components may be disposed before, after, or between certain of the circuitry and components illustrated in FIG. 4. This description will describe aspects of FIG. 4 that are generally applicable to the ear-worn devices of other figures, and will then describe other aspects with reference to each figure. The pre-processing circuitry 484 may be part of processing circuitry (not illustrated, e.g., the processing circuitry 214*a*, 214*b*, and/or 314*a*). The pre-processing circuitry 484 may be part of an ear-worn device (not illustrated, e.g., the ear-worn device 200*a*, 200*b*, 300*a*, 300*b*, and/or the hearing aid 100).

The pre-processing circuitry 484 includes analog processing circuitry 442 and digital processing circuitry 444. In some embodiments, the digital processing circuitry 444 may include beamforming circuitry 446. The analog processing circuitry 442 may be configured to perform analog processing on one or more microphone signals 424 (which may correspond to the one or more microphone signals 224*a*, 224*b*, and/or 324*a*). One or more microphones (not illustrated, which may correspond to the microphones 210*a* and/or 210*b*) may be configured to generate the one or more microphone signals 424. The analog processing circuitry 442 may be configured to receive the one or more microphone signals 424 from the microphones. The analog processing circuitry 442 may be configured to perform, for example, one or more of analog preamplification and analog filtering. In some embodiments, no analog processing may be performed, and thus the analog processing circuitry 442 may be absent. In such embodiments, the digital processing circuitry 444 may be configured to receive the one or more microphone signals 424.

The digital processing circuitry 444 may be configured to perform digital processing on the one or more signals received from the analog processing circuitry 442. For example, the digital processing circuitry 444 may be configured to perform one or more of analog-to-digital conversion, wind reduction, input calibration, and anti-feedback processing.

In embodiments in which the digital processing circuitry 444 includes beamforming circuitry 446, the beamforming circuitry 446 may be configured to receive (at least in part) two or more processed microphone signals generated by the digital processing circuitry 444 and generate one or more beamformed audio signals from (at least in part) the two or more processed microphone signals. In some embodiments, the beamforming circuitry 446 may be configured to generate multiple beamformed audio signals, each having a different beamformed directional pattern. For example, one or more of the beamformed audio signals may be front-facing and one or more of the beamformed audio signals may be rear-facing. Front-facing beamformed signals may generally attenuate signals coming from behind the wearer more than signals coming from in front of the wearer, and back-facing beamformed signals may generally attenuate signals coming from in front of the wearer more than signals coming from behind the wearer. Example directional patterns include cardioids, supercardioids, hypercardioids, and dipoles. In embodiments that do not include the beamforming circuitry 446, remaining data processing may be performed on non-beamformed audio signals.

Figure 5:
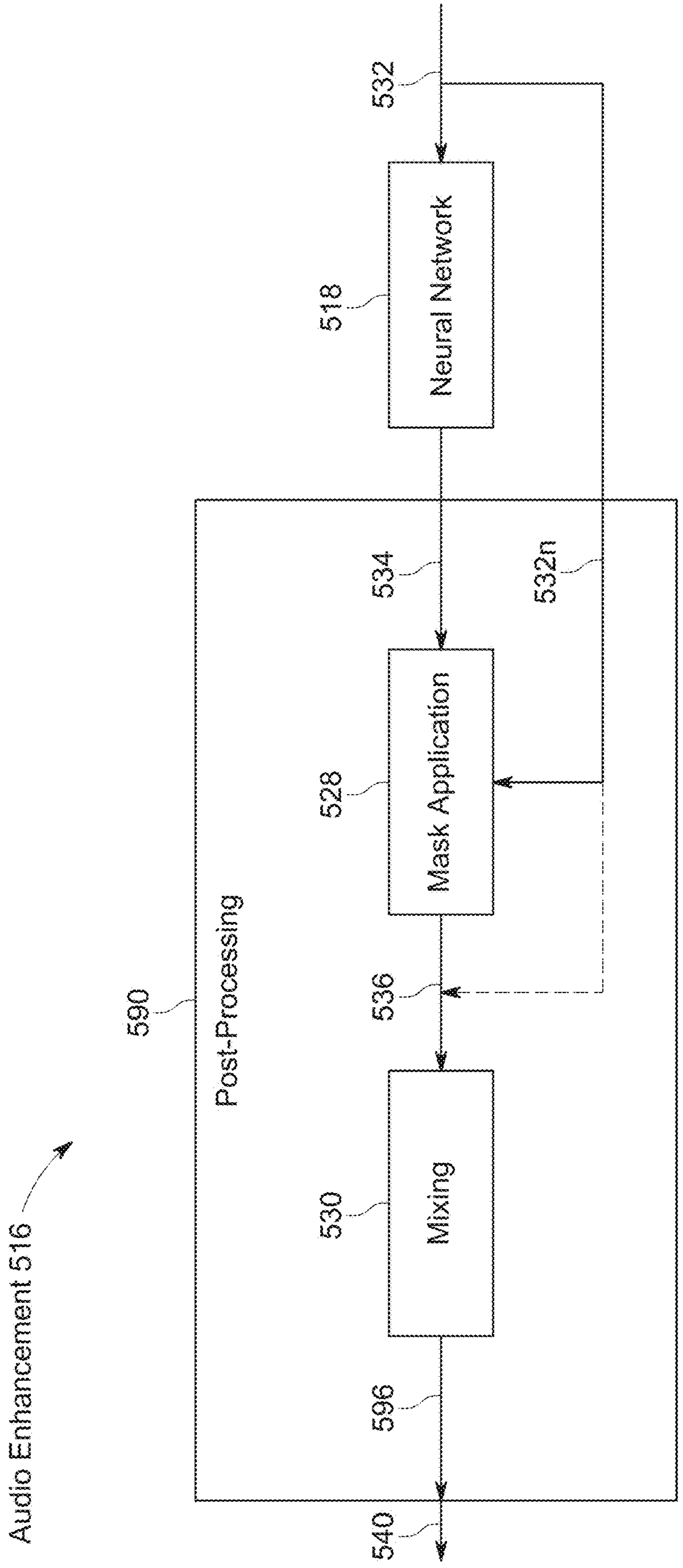
FIG. 5 illustrates example audio enhancement circuitry, in accordance with certain embodiments described herein.

FIG. 5 illustrates example audio enhancement circuitry 516 (which may correspond to the audio enhancement circuitry 316*a*), in accordance with certain embodiments described herein. The audio enhancement circuitry 516 includes neural network circuitry 518, mask application circuitry 528, and mixing circuitry 530. It should also be appreciated that the audio enhancement circuitry 516 may include more circuitry and components than shown and such circuitry and components may be disposed before, after, or between certain of the circuitry and components illustrated in FIG. 5. This description will describe aspects of FIG. 5 that are generally applicable to the ear-worn devices of other figures, and will then describe other aspects with reference to each figure. The audio enhancement circuitry 516 may be part of processing circuitry (not illustrated, e.g., the processing circuitry 214*a*, 214*b*, and/or 314*a*). The audio enhancement circuitry 516 may be part of an ear-worn device (not illustrated, e.g., the ear-worn device 200*a*, 200*b*, 300*a*, 300*b*, and/or the hearing aid 100).

The neural network circuitry 518 (which may correspond to the neural network circuitry 218*a*, 218*b*, and/or 318*a*) may be configured to receive one or more audio signals 532 (which may correspond to the one or more audio signals 332*a* and/or 432). In some embodiments, the neural network circuitry 518 may be configured to perform further pre-processing on the one or more audio signals 532 in preparation for processing by a neural network. In some embodiments, such pre-processing may include performing short-time Fourier transformation (STFT) to convert short windows of the beamformed audio signals 532 from time domain to frequency domain. In some embodiments, the pre-processing may include feature extraction, which may include performing certain mathematical transformations such as taking the magnitude. In some embodiments, the pre-processing circuitry may include normalization. In some embodiments, the result of such pre-processing might not be audio signals. This description and the claims may refer to neural network circuitry receiving one or more audio signals; this should be understood to include embodiments in which the neural network implemented by the neural network circuitry (e.g., the neural network circuitry 518) receives audio signals (e.g., the one or more audio signals 532) as well as embodiments in which the neural network implemented by the neural network circuitry receives non-audio signals that originate from audio signals (e.g., the one or more audio signals 532) received by upstream pre-processing circuitry in the neural network circuitry 518. Generally, neural network circuitry may be configured to receive inputs, and these inputs may be audio signals generated by the ear-worn device or may be inputs (not necessarily audio signals) originating from audio signals generated by the ear-worn device. Generally, the neural network circuitry 518 may be configured to receive the one or more audio signals 532 and implement one or more neural network layers trained to perform audio enhancement (which may include, e.g., noise reduction and/or spatial focusing) based on the one or more audio signals 532.

Thus, in some embodiments, the one or more neural network layers implemented by the neural network circuitry 518 may be trained to reduce noise. In such embodiments, one of the one or more neural network products 534 (which may correspond to the neural network products 334*a*) from the neural network circuitry 518 may be a version of one of the one or more audio signals 532 (e.g., the audio signal 532*n*) that has less noise (or just speech), an output (e.g., a mask) configured to generate a version of one of the one or more audio signals 532 (e.g., the audio signal 532*n*) that has less noise (or just speech), a version of one of the one or more audio signals 532 (e.g., the audio signal 532*n*) that has less speech (or just noise), or an output (e.g., a mask) configured to generate a version of one of the one or more audio signals 532 (e.g., the audio signal 532*n*) that has less speech (or just noise).

In some embodiments, the one or more neural network layers implemented by the neural network circuitry 518 may be trained to perform spatial focusing. In such embodiments, one of the one or more neural network products 534 from the neural network circuitry 518 may be a spatially-focused version of one of the one or more audio signals 532 (e.g., the audio signal 532*n*), or an output (e.g., a mask) configured to generate the spatially-focused version of one of the one or more audio signals 532 (e.g., the audio signal 532*n*).

In some embodiments, the one or more neural network layers implemented by the neural network circuitry 518 may be trained to both reduce noise and perform spatial focusing. In such embodiments, one of the one or more neural network products 534 from the neural network circuitry 518 may be a noise-reduced and spatially-focused version of one of the one or more audio signals 532 (e.g., the audio signal 532*n*), or an output (e.g., a mask) configured to generate the noise-reduced and spatially-focused version of one of the one or more audio signals 532 (e.g., the audio signal 532*n*). It should be appreciated that in some embodiments, one neural network layer may be trained to reduce noise, perform spatial focusing, or both reduce noise and perform spatial focusing. In some embodiments, multiple neural network layers may be trained to reduce noise, perform spatial focusing, or both reduce noise and perform spatial focusing. It should also be appreciated that, as described above, the neural network circuitry 518 may be trained to generate a mask configured to generate a noise-reduced and/or spatially-focused audio signal. In other words, the mask may be a noise-reducing mask, a spatially-focusing mask, or a noise-reducing and spatially-focusing mask.

This description may describe one or more neural network layers that are trained to perform a certain action, or to generate an output for use in performing that action. As referred to herein, one or more neural network layers may be considered trained to perform a certain action if the one or more neural network layers perform that action themselves, or if they generate output for use in performing that action. Thus, it should be appreciated that one or more neural network layers may be considered trained to perform noise reduction even if the neural network itself does not generate a noise-reduced audio signal; a neural network that generates a mask (or generally, an output) configured to be used to generate a noise-reduced audio signal may still be considered trained to perform noise reduction. In some embodiments, the mask may be used to isolate a speech component of an input signal. In some embodiments, the mask may be used to isolate a noise component of an input signal. In some embodiments, the output may be the speech component or the noise component itself. In any such embodiments, (and as described further below), the resulting component (speech or noise) may be used to generate an output signal having less noise than the input signal, and thus the one or more neural networks may be referred to as trained to perform noise reduction. It should also be appreciated that a neural network may be considered trained to perform spatial focusing even if the neural network itself does not generate a spatially-focused audio signal; a neural network that generates an output configured to be used to generate a spatially-focused audio signal may still be considered trained to perform spatial focusing. The output may be, as a non-limiting example, a mask configured to generate a spatially-focused audio signal.

Any neural network layers described herein may be, for example, of the recurrent, vanilla/feedforward, convolutional, generative adversarial, attention (e.g. transformer), or graphical type. Generally, a neural network made up of such layers may include an input layer, a plurality of intermediate layers, and an output layer, and the layers may be made up of a plurality of neurons/nodes to which neural network weights may be applied.

It should be appreciated that in a system of two ear-worn devices, the neural network circuitry 518 of a first ear-worn device (e.g., the ear-worn device 200*a* and/or 300*a*) may be configured to implement one or more first neural network layers, and neural network circuitry of a second ear-worn device (e.g., the ear-worn device 200*b* and/or 300*b*) may be configured to implement one or more second neural network layers. In some embodiments, the one or more first neural network layers and the one or more second neural network layers may be the same (e.g., have the same architecture and use the same weights). In some embodiments, the one or more first neural network layers and the one or more second neural network layers may be different (e.g., have different architecture and/or use different weights).

Generally, the neural network circuitry 518 may be configured to receive one or more audio signals 532. In some embodiments, the one or more audio signals 532 may include one signal. In some embodiments, the one or more audio signals 532 may include two signals. In some embodiments, the one or more audio signals 532 may include three signals. In some embodiments, the one or more audio signals 532 may include four signals. In some embodiments, the one or more audio signals 532 may include more than four signals. In some embodiments, the one or more audio signals 532 may be in the frequency domain. In some embodiments, the one or more audio signals 532 may be in the time domain. In some embodiments, the neural network circuitry 518 may be configured to receive the one or more audio signals 532 together (i.e., not one after another). In some embodiments, the neural network circuitry 518 may be configured to process the one or more audio signals 532 together (i.e., not one after another).

As described above, in some embodiments, two or more of the audio signals 532 may each have a different beamformed directional pattern. For example, one or more of the audio signals 532 may be front-facing and one or more of the audio signals 532 may be rear-facing. Front-facing beamformed signals may generally attenuate signals coming from behind the wearer more than signals coming from in front of the wearer, and back-facing beamformed signals may generally attenuate signals coming from in front of the wearer more than signals coming from behind the wearer. Example directional patterns include cardioids, supercardioids, hypercardioids, and dipoles. In some embodiments, the neural network circuitry 518 may instead be configured to receive non-beamformed audio signals, or a mix of beamformed and non-beamformed audio signals.

As described above, in some embodiments, the neural network circuitry 518 may be configured to implement one or more neural network layers trained to perform audio enhancement, such that the neural network circuitry 518 generates, based on the one or more audio signals 532, one or more neural network products 534. (For simplicity, this description may interchangeably describe receiving signals and generating outputs based on the signals as performed by neural network circuitry or one or more neural network layers implemented by the neural network circuitry.) In some embodiments, the audio enhancement circuitry 516 may be configured to generate, based on the one or more neural network products 534, at least one of a noise-reduced version of the audio signal 532*n* (which is one of the one or more audio signals 532), a spatially-focused version of the audio signal 532*n*, or a noise-reduced and spatially-focused version of the audio signal 532*n*. Following will be a description of various methods by which the audio enhancement circuitry 516 may generate these signals based on the one or more neural network products 534.

In some embodiments, one of the one or more neural network products 534 may be a mask. A mask may be a real or complex mask that varies with frequency. Thus, when a mask is applied to (e.g., multiplied by, or added to) an audio signal (in the example of FIG. 5, the audio signal 532*n*), the mask may operate differently on different frequency components of the audio signal. In other words, the mask may cause different frequency components of the audio signal to be multiplied by different real or complex values. A real mask may modify just magnitude, while a complex mask may modify both magnitude and phase. In other words, a complex mask may have a magnitude portion and a phase portion, while a real mask may just have a magnitude portion. When the one or more neural network products 534 include two masks, the two masks may be different.

With further regards to training, in some embodiments one or more neural network layers implemented by the neural network circuitry 518 may be trained to perform noise reduction. Training such neural network layers may include obtaining noisy speech audio signals and speech-isolated versions of the audio signals (i.e., with only the speech remaining). In some embodiments, masks that, when applied to the noisy speech audio signals, result in the speech-isolated audio signals may be determined. The training input data may be the noisy speech audio signals and the training output data may be the masks. The one or more neural network layers may thereby learn how to output a speech-isolating mask for the audio signal 532*n*, such that when the mask is applied to (e.g., multiplied by or added to) the audio signal 532*n*, the resulting output audio signal is a speech-isolated version of the audio signal 532*n*. In some embodiments, masks that, when applied to the noisy speech audio signals, result in the noise-isolated audio signals may be determined. The training input data may be the noisy speech audio signal and the training output data may be the masks. The neural network layers may thereby learn how to output a noise-isolating mask for the audio signal 532*n*, such that when the mask is applied to (e.g., multiplied by or added to) the audio signal 532*n*, the resulting output audio signal is a noise-reduced version of the audio signal 532*n*. In embodiments in which the one or more neural networks are trained to output speech-isolated or noise-isolated signals themselves, the output training data may be the speech-isolated or noise-isolated signals themselves. Further description of neural networks trained to perform noise reduction may be found in U.S. Pat. No. 11,812,225, titled "Method, Apparatus and System for Neural Network Hearing Aid," issued Nov. 7, 2023, which is incorporated by reference herein in its entirety.

In some embodiments, one or more neural network layers implemented by the neural network circuitry 518 may be trained to perform spatial focusing. Spatial focusing may include applying a spatial focusing pattern to an audio signal. A spatial focusing pattern may specify different weights as a function of direction-of-arrival (DOA) of sounds, where DOA may be defined relative to the wearer of the ear-worn device. In some embodiments, weights may be equal to 0, equal to 1, or between 0 and 1. In some embodiments, weights may be equal to or greater than 0. In some embodiments, weights may be greater than 0, less than 0, equal to zero, or complex numbers; a negative weight may flip phase by 180 degrees, while a complex weight may rotate the phase by some angle. Mapping weights to DOA may result in focusing, as higher weights may be applied to sounds originating from certain directions and lower weights may be applied to sounds originating from other directions. For training such neural network layers, a training audio signal may be formed from component audio signals originating from different DOAs. Multiple audio signals originating from multiple microphones may be generated from the training audio signal. When the neural network is trained to output a mask, a training mask may be determined such that, when the training mask is applied to one of the multiple audio signals, what remains is each component audio signal multiplied by a weight corresponding to the DOA from which it originated, and then summed together. The one or more neural network layers may thereby learn how to output a mask based on multiple audio signals such that, when the mask is applied to (e.g., multiplied by or added to) to one of the signals (e.g., the audio signal 532*n*), the resulting output includes each component of the signal multiplied by a weight corresponding to the DOA from which it originated, and then summed together (e.g., resulting in a spatially-focused version of the audio signal 532*n*). In embodiments in which the one or more neural networks are trained to output spatially-focused signals, the output training data may be the spatially-focused signals themselves. Further description of neural networks for spatially focusing may be found in U.S. Pat. No. 11,937,047, entitled "Ear-Worn Device with Neural Network for Noise Reduction and/or Spatial Focusing Using Multiple Input Audio Signals" issued Mar. 19, 2024, which is incorporated by reference herein in its entirety.

In some embodiments, one or more neural network layers implemented by the neural network circuitry 518 may be trained to perform noise reduction and spatial focusing. For training such neural network layers, a training audio signal may be formed from component audio signals originating from different DOAs. Multiple audio signals originating from multiple microphones may be generated from the training audio signal. When the neural network is trained to output a mask, a training mask may be determined such that, when the training mask is applied to one of the multiple audio signals, what remains is the speech of each component audio signal multiplied by a weight corresponding to the DOA from which it originated, and then summed together. (As described above, training audio signals may include noisy speech audio signals and speech-isolated versions of the audio signals, i.e., with only the speech remaining.) The one or more neural network layers may thereby learn how to output a mask based on the multiple audio signals such that, when the mask is applied to (e.g., multiplied by or added to) the audio signal 532*n*, the resulting output includes the speech of each component of the audio signal 532*n* multiplied by a weight corresponding to the DOA from which it originated, and then summed together, namely a noise-reduced and spatially-focused version of the speech component of the audio signal 532*n*. In embodiments in which the one or more neural networks are trained to output noise-reduced and spatially-focused signals, the output training data may be the noise-reduced and spatially-focused signals themselves.

The above description has described training data that may be input to neural networks being trained. The below description will describe various types of data sharing between ear-worn devices, which may impact the inputs to the neural networks on each ear-worn device. It should be appreciated that the type of data sharing implemented may affect the training data. For example, if the data sharing involves inputting processed microphone signals originating from two ear-worn devices into a neural network, then the training input data may include processed microphone signals originating from two ear-worn devices. As another example, if the data sharing involves inputting beamformed audio signals originating from two ear-worn devices into a neural network, then the training input data may include beamformed audio signals originating from two ear-worn devices. As another example, if the data sharing involves inputting neural network products originating from two ear-worn devices into a neural network, then the training input data may include neural network products originating from two ear-worn devices.

In addition to a mask, the neural network may also be trained to output an additive component (i.e., the one or more neural network products 534 may also include an additive component). The additive component may also be referred to as a post-mask correction, and may be added to the product of the mask and an input audio signal (e.g., the audio signal 532*n*). In some embodiments, the additive component may be complex (i.e., have a magnitude and phase portion). In some embodiments, the mask may be real and the additive component may be complex; thus, the additive component may be able to modify phase even if the mask cannot. Generally, one may think of the additive component as performing further refinement of the input audio signal not already performed by the mask.

As described above, in some embodiments the neural network circuitry 518 may be configured to generate a mask that, when applied to (e.g., multiplied by or added to) the audio signal 532*n*, results in a certain other signal (e.g., a noise-reduced version of the audio signal 532*n*, a spatially-focused version of the audio signal 532*n*, or a noise-reduced and spatially-focused version of the audio signal 532*n*). The mask may be one of the one or more neural network products 534. In some embodiments, the mask application circuitry 528 in the audio enhancement circuitry 516 may be configured to perform application of the mask to the audio signal 532*n* (e.g., using multiplication or addition).

While referred to herein for simplicity as the mask application circuitry 528, the mask application circuitry 528 may be configured to perform further operations in addition to mask application. In some embodiments, the mask application circuitry 528 may be configured to add an additive component (i.e., one of the one or more neural network products 534) to the product of the mask and the audio signal 532*n*. In some embodiments, the mask application circuitry 528 may be configured to obtain one or more signals by performing subtraction after the mask application. (However, in some embodiments, other operations, such as addition, may be used instead.) For example, consider that the mask application resulted in a speech component of the audio signal 532*n*. The mask application circuitry 528 may be configured to obtain the noise component of the audio signal 532*n* by subtracting the speech component from the audio signal 532*n*. As another example, consider that the mask application resulted in a noise component of the audio signal 532*n*. The mask application circuitry 528 may be configured to obtain the speech component of the audio signal 532*n* by subtracting the noise component from the audio signal 532*n*. As another example, consider that the mask application resulted in a speech component of the audio signal 532*n* that is spatially-focused in a target direction (which may be referred to as a target speech signal). The mask application circuitry 528 may be configured to obtain the speech component of the audio signal 532*n* spatially-focused in non-target directions (which may be referred to as an interfering speech signal) by subtracting the target speech component from the speech component. As another example, consider that the mask application resulted in the interfering speech component of the audio signal 532*n*. The mask application circuitry 528 may be configured to obtain the target speech component of the audio signal 532*n* by subtracting the interfering speech component from the speech component. The mask application circuitry 528 may be configured to output one or more audio signals 536, generated as described above.

In some embodiments, the mixing circuitry 530 may be configured to perform mixing of two or more audio signals. The two or more audio signals may include, for example, two or more audio signals 536 output by the mask application circuitry 528, one of the audio signals 536 and the audio signal 532*n*, or two or more audio signals 536 output by the mask application circuitry 528 and the audio signal 532*n*. As referred to herein, mixing should be understood to mean any combination of different elements after application of weights to some or all of the different elements. Thus, the mixing circuitry 530 may be configured to apply different weights to signals (e.g., by multiplication) and combine the results together (e.g., by addition). The mixing performed by the mixing circuitry 530 may also be considered interpolation. Different embodiments of the mixing circuitry 530 may be configured to mix together different combinations of audio signals (some or all of which may have been generated by the mask application circuitry 528). As non-limiting examples, the mixing circuitry 530 may be configured to mix together the speech component and the noise component of the audio signal 532*n*; the speech component of the audio signal 532*n* and the audio signal 532*n* itself; the noise component of the audio signal 532*n* and the audio signal 532*n* itself, or the target speech component, the interfering speech component, and the noise component of the audio signal 532*n*. As a specific example, referring to the speech component as S and the noise component as N, in some embodiments the mixing circuitry 530 may be configured to output S+x*N, where x is the weight applied to the noise component. The weight x may be, for example, between 0 and 1. (For simplicity, no weight is described as applied to the speech component, but in some embodiments a weight may be applied to the speech component as well.) As another specific example, referring to the target speech component as TS, the interfering speech component as IS, and the noise component as N, in some embodiments the mixing circuitry 530 may be configured to output TS+x*IS+y*N. The weights x and y may be, for example, between 0 and 1. (For simplicity, no weight is described as applied to the target speech component, but in some embodiments a weight may be applied to the target speech component as well.) The output of the mixing circuitry 530 may be an output audio signal 596.

The post-processing circuitry 590 may be configured to perform further processing on the output audio signal 596 from the mixing circuitry 530, such as one or more of wide-dynamic range compression and output calibration. Additionally, when the neural network circuitry 518 is configured to perform STFT, the post-processing circuitry 590 may be configured to perform inverse STFT (iSTFT). The output of the post-processing 590 may be the output audio signal 540 (which may correspond to the output audio signal 340*a*).

Figure 6:
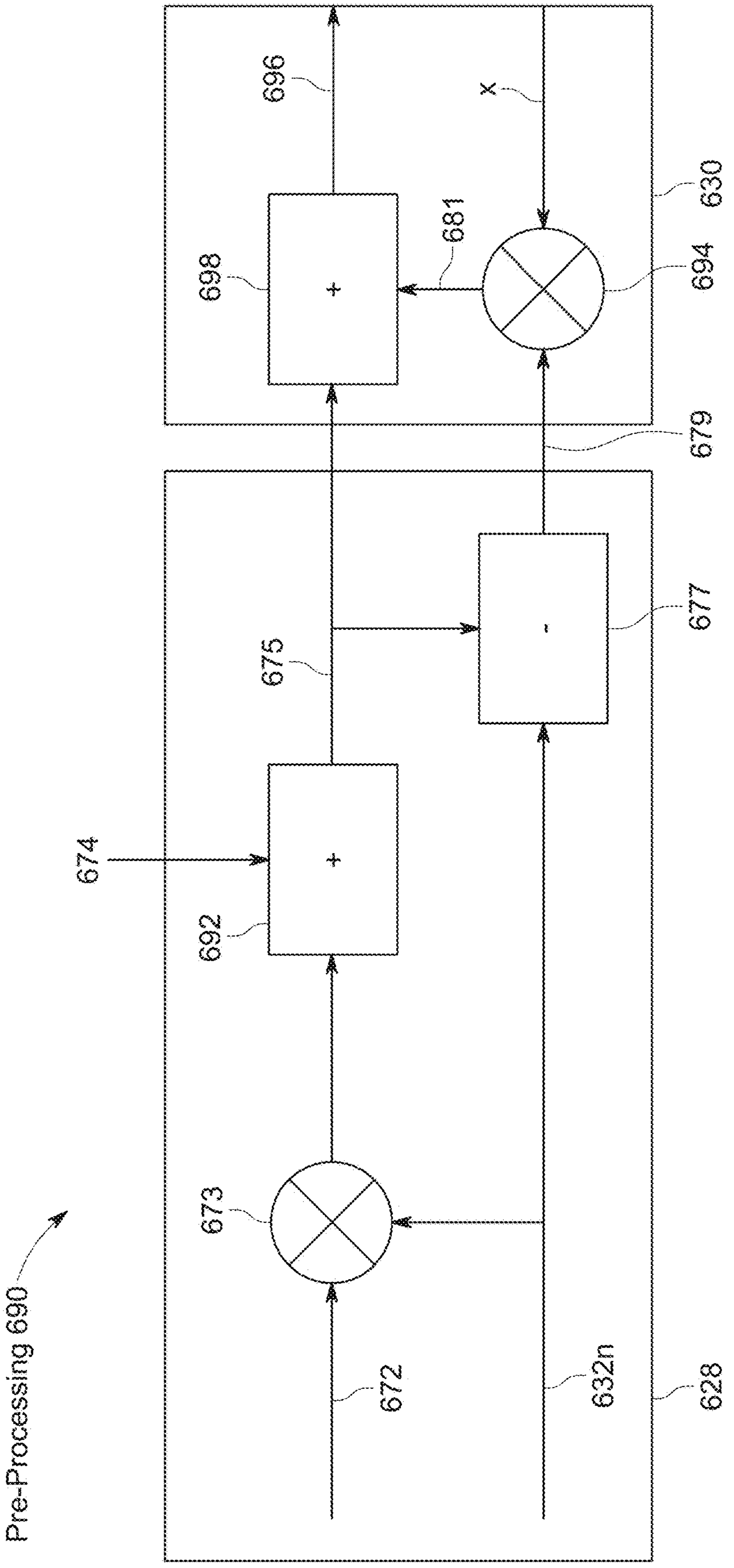
FIG. 6 illustrates example post-processing circuitry, in accordance with certain embodiments described herein.

FIG. 6 illustrates example post-processing circuitry 690 (which may correspond to the post-processing circuitry 590), in accordance with certain embodiments described herein. The post-processing circuitry 690 includes mask application circuitry 628 (which may correspond to the mask application circuitry 528) and mixing circuitry 630 (which may correspond to the mixing circuitry 530). The mask application circuitry 628 includes a multiplier 673, an adder 692, and a subtractor 677. The mixing circuitry 630 includes a multiplier 694 and an adder 698. The multiplier 673 may be configured to multiply the audio signal 632*n* (which may correspond to the audio signal 532*n*) by a mask 672 (which may be an example of a neural network product 534). The adder 692 may be configured to add the result of this operation to an additive component 674 (which may be an example of a neural network product 534) to the result, thereby generating a speech component 675 of the audio signal 632*n*. The subtractor 677 may be configured to subtract the speech component 675 from the audio signal 632*n*, thereby generating a noise component 679 of the audio signal 632*n*. The multiplier 694 may be configured to multiply the noise component 679 by a weight (i.e., an attenuation factor) x, resulting in an attenuated noise component 681. The adder 698 may be configured to add the attenuated noise component 681 to the speech component 675, thereby generating an audio signal 696 (which may correspond to the output audio signal 596).

As described above, there may be different variations on the post-processing circuitry 690. For example, application of the mask 672 to the audio signal 632*n* may result in the noise component 679. As another example, the adder 698 may be configured to add weighted versions of the speech component 675 and the audio signal 632*n*, or weighted versions of the noise component 679 and the audio signal 632*n*.

In some embodiments, the one or more neural network products 534 may include audio signals themselves. In some embodiments, application of masks may result in all the signals that need to be generated. In some embodiments, the neural network circuitry 518 may be configured to directly output all the signals that need to be generated. In any such embodiments, certain circuitry described above may be absent.

Figure 7:
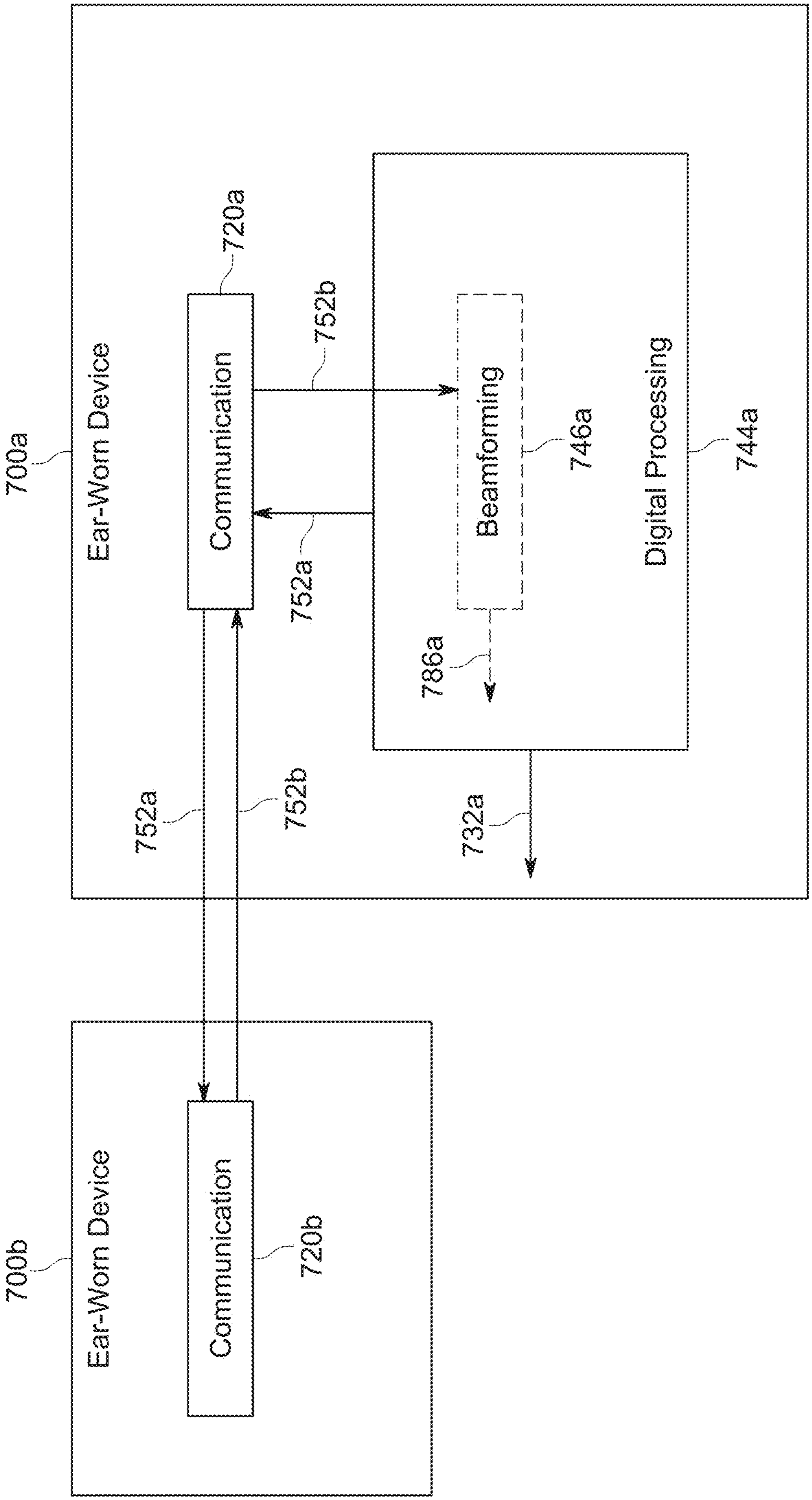
FIG. 7 illustrates a system of two ear-worn devices, in accordance with certain embodiments described herein.

FIG. 7 illustrates a system of two ear-worn devices 700*a* (which may correspond to the ear-worn device 200*a* and/or 300*a*) and 700*b* (which may correspond to the ear-worn device 200*b* and/or 300*b*), in accordance with certain embodiments described herein. The ear-worn device 700*a* may, for example, be worn on the right ear of a wearer, and the ear-worn device 700*b* may, for example, be worn on the left ear of a wearer. Thus, the ear-worn devices 700*a* and 700*b* may each be part of a pair. FIG. 7 further illustrates circuitry in the ear-worn device 700*a*. It should be appreciated that the circuitry and functionality described and illustrated for the ear-worn device 700*a* may be replicated in the ear-worn device 700*b*, but might not be explicitly illustrated or described for simplicity. It should also be appreciated that the ear-worn device 700*a* may include more circuitry and components than shown and such circuitry and components may be disposed before, after, or between certain of the circuitry and components illustrated in FIG. 7.

The circuitry in the ear-worn device 700*a* includes digital processing circuitry 744*a* (which may correspond to the digital processing circuitry 444) and communication circuitry 720*a* (which may correspond to the communication circuitry 220*a* and/or 320*a*). In some embodiments, the digital processing circuitry 744*a* includes beamforming circuitry 746*a* (which may correspond to the beamforming circuitry 446). The ear-worn device 700*b* includes communication circuitry 720*b* (which may correspond to the communication circuitry 220*b* and/or 320*b*). The digital processing circuitry 744*a* may be part of pre-processing circuitry (e.g., the pre-processing circuitry 384*a* and/or 484), and the pre-processing circuitry may be part of processing circuitry (e.g., the processing circuitry 214*a* and/or 314*a*).

In the ear-worn device 700*a*, the communication circuitry 720*a* may be configured to receive one or more processed microphone signals 752*a* generated by the digital processing circuitry 744*a*. The communication circuitry 720*a* may be configured to transmit the one or more processed microphone signals 752*a* to the communication circuitry 720*b* of the ear-worn device 700*b* over a wireless communication link. The one or more processed microphone signals 752*a* may be examples of the shared data 238*a*. As further illustrated in FIG. 7, the communication circuitry 720*a* may be configured to receive one or more processed microphone signals 752*b* from the communication circuitry 720*b* of the ear-worn device 700*b* over the wireless communication link. The one or more processed microphone signals 752*b* may be examples of the shared data 238*b*.

As described above with reference to FIG. 4, the digital processing circuitry 744*a* may be configured to generate the processed microphone signals 752*a* from one or more microphone signals. It should be appreciated that any amount of processing may be performed on the one or more microphone signals (e.g., the one or more microphone signals 424*a*) to generate from them the processed microphone signals 752*a*. For example, in some embodiments the processed microphone signals 752*a* may just be digitized versions of the microphone signals. In some embodiments, more processing (e.g., one or more of analog preamplification, analog filtering, analog-to-digital conversion, wind reduction, input calibration, anti-feedback processing, and/or beamforming) may be performed to generate the processed microphone signals 752*a* from the microphone signals. Generally, processed microphone signals as referred to in this description and in the claims should be understood to mean microphone signals that have at least been digitized, and may have other processing performed on them as well.

The digital processing circuitry 744*a* may be configured to receive the one or more processed microphone signals 752*b* and generate from them and, in some embodiments, the one or more processed microphone signals 752*a*, the one or more audio signals 732*a* (which may correspond to the one or more audio signals 332*a*, 432, and/or 532).

In some embodiments, the beamforming circuitry 746*a* (which may correspond to the beamforming circuitry 446) of the digital processing circuitry 744*a* may be configured to receive the one or more processed microphone signals 752*b* from the communication circuitry 720*a*. In some embodiments, the digital processing circuitry 744*a* may be configured to perform further processing on the one or more processed microphone signals 752*b* prior to the beamforming circuitry 746*a* receiving them. In some embodiments, the beamforming circuitry 746*a* may be configured to receive the one or more processed microphone signals 752*a* and the one or more processed microphone signals 752*b* (i.e., microphone signals from two different ear-worn devices, after processing), or processed versions thereof, and generate one or more beamformed audio signals 786*a* from the one or more processed microphone signals 752*a* and the one or more processed microphone signals 752*b*. Generally, the beamforming circuitry 746*a* may be configured to perform beamforming on the one or more processed microphone signals 752*a* and the one or more processed microphone signals 752*b*, thereby generating the one or more beamformed audio signals 786*a*. In some embodiments, the beamforming circuitry 746*a* may be configured to beamform the one or more processed microphone signals 752*a* together with the one or more processed microphone signals 752*b*, thereby generating the one or more beamformed audio signals 786*a*. It should therefore be appreciated that the beamforming circuitry 746*a* may be configured to beamform at least one signal from one ear-worn device (e.g., the ear-worn device 700*a*) together with at least one signal from another ear-worn device (e.g., the ear-worn device 700*b*) to generate one or more of the one or more beamformed audio signals 786*a*. Thus, in some embodiments, the beamforming circuitry 746*a* may be configured to beamform at least one processed microphone signal 752*a* from the ear-worn device 700*a* together with at least one processed microphone signal 752*b* from the ear-worn device 700*b* to generate one or more of the one or more beamformed audio signals 786*a*. In some embodiments, the beamforming circuitry 746*a* may be configured to beamform at least two processed microphone signals 752*a* from the ear-worn device 700*a* together with at least two processed microphone signals 752*b* from the ear-worn device 700*b* to generate one or more of the one or more beamformed audio signals 786*a*.

In some embodiments, the beamforming circuitry 746*a* may be configured to only beamform together processed microphone signals 752 from the same ear-worn device 700, rather than beamforming together processed microphone signals 752 from both the ear-worn device 700*a* and 700*b*. In other words, the beamforming circuitry 746*a* might not be configured to beamform the one or more processed microphone signals 752*a* together with the one or more processed microphone signals 752*b*. Thus, in some embodiments, the beamforming circuitry 746*a* may be configured to generate two or more beamformed audio signals 786 *a* by 1. Beamforming together at least two processed microphone signals 752*a* from the ear-worn device 700*a* to generate one or more of the two or more beamformed audio signals 786*a*, and 2. Beamforming together at least two processed microphone signals 752*b* from the ear-worn device 700*b* to generate one or more of the two or more beamformed audio signals 786*a*. In some embodiments, only beamforming together processed microphone signals 752 from the same ear-worn device 700 may be helpful because it might not require knowledge of certain parameters such as the precise distance between the two ear-worn devices 700, whereas beamforming together processed microphone signals 752 from different ear-worn devices 700 may require this knowledge.

In some embodiments, the beamforming circuitry 746*a* may be configured to generate multiple (i.e., two or more) beamformed audio signals 786*a*, each having a different beamformed directional pattern. For example, the two or more beamformed audio signals 786*a* may include at least one front-facing beamformed audio signal and at least one rear-facing beamformed audio signal. Front-facing beamformed signals may generally attenuate signals coming from behind the wearer more than signals coming from in front of the wearer, and back-facing beamformed signals may generally attenuate signals coming from in front of the wearer more than signals coming from behind the wearer. Example directional patterns include cardioids, supercardioids, hypercardioids, and dipoles. As a specific example, consider that the ear-worn device 700*a* has two microphones and generates two processed microphone signals 752*a*, and the ear-worn device 700*b* has two microphones and generates two processed microphone signals 752*b*. The beamforming circuitry 746*a* in the ear-worn device 700*a* may be configured to beamform four microphone signals together (the two processed microphone signals 752*a* and the two processed microphone signals 752*b*) to generate one or more of the beamformed audio signals 786*a*. The ear-worn device 700*b* may also be configured to use its own beamforming circuitry (not illustrated) to beamform four microphone signals (the two processed microphone signals 752*a* and the two processed microphone signals 752*b*). A beamformed audio signal 786 formed from four processed microphone signals 752 (typically, two processed microphone signals 752 from one ear-worn device 700 and two processed microphone signals 752 from another ear-worn device 700) may be referred to herein as a four-beam pattern.

As another specific example, consider that the ear-worn device 700*a* has two microphones and generates two processed microphone signals 752*a*, and the ear-worn device 700*b* has two microphones and generates two processed microphone signals 752*b*. The beamforming circuitry 746*a* in the ear-worn device 700*a* may be configured to beamform two microphone signals together (the two processed microphone signals 752*a*) to generate one or more of the beamformed audio signals 786*a*, and to beamform two microphone signals together (the two processed microphone signals 752*b*) to generate one or more of the beamformed audio signals 786*b*. The ear-worn device 700*b* may also be configured to use its own beamforming circuitry (not illustrated) to beamform two microphone signals together (the two processed microphone signals 752*a*) and to beamform another two microphone signals together (the two processed microphone signals 752*b*). In this example, an ear-worn device 700 might be configured to only beamform together processed microphone signals 752 from the same ear-worn device 700, rather than beamforming processed microphone signals 752*a* from the ear-worn device 700*a* together with processed microphone signals 752*b* from the ear-worn device 700*b*. A beamformed audio signal 786 formed from two processed microphone signals 752 (typically from the same ear-worn device 700) may be referred to herein as a two-beam pattern.

In further detail, refer to the two processed microphone signals 752*a* from the ear-worn device 700*a* as $x_{a1}(t)$ and $x_{a2}(t)$. Refer to the two processed microphone signals 752*b* from the ear-worn device 700*b* as $x_{b1}(t)$ and $x_{b2}(t)$. A two-beam pattern may be formed from the processed microphone signals 752*a* by delaying $x_{a2}(t)$ by an amount $t_{delay}$ and applying a weighting factor $\alpha$, producing a beamformed audio signal 786*a*, which may be expressed as $y_a(t)=x_{a1}(t)-\alpha x_{a2}(t-t_{delay})$. A two-beam pattern may be similarly formed for the ear-worn device 700*b* as $y_b(t)=x_{b1}(t)-\alpha x_{b2}(1-t_{delay})$. A compensation filter, which may be a multiplicative factor different for each frequency that is multiplied by $y_a(t)$ and $y_b(t)$, may also be applied to form the two-beam patterns. As a simple example, a four-beam pattern may be formed by adding $y_a(t)$ and $y_b(t)$. (Such addition may be considered beamforming.)

Beamforming processed microphone signals 752 from different ear-worn devices 700 together (as described above, e.g., with respect to a four-beam pattern) may result in better spatial focusing than just beamforming processed microphone signals 752 from a single ear-worn device 700. Neural network circuitry may be configured to receive the one or more beamformed audio signals, or processed versions thereof, and implement one or more neural network layers trained to perform audio enhancement based on the one or more beamformed audio signals. When the neural network circuitry (e.g., the neural network circuitry 218*a*, 318*a*, and/or 518) of the ear-worn device 700*a* receives one or more beamformed audio signals originating from both ear-worn devices 700*a* and 700*b* (e.g., at least one four-beam pattern formed from the processed microphone signals 752*a* and 752*b*, or at least two two-beam patterns, one formed from the processed microphone signals 752*a* and one formed from the processed microphone signals 752*b*), the ear-worn device 700*a* may be able to generate an enhanced output audio signal having better spatial focusing than if the ear-worn device 700*a* did not receive the processed microphone signals 752*b* from the ear-worn device 700*b*. In some embodiments, better spatial focusing may include narrower focusing with extra attenuation of sounds not in front of the wearer. The extra attenuation may be in the range of, for example, 1-4 dB.

It should be appreciated that the ear-worn device 700*b* may include its own processing circuitry (e.g., the processing circuitry 214*b*), the processing circuitry including beamforming circuitry and audio enhancement circuitry, and the audio enhancement circuitry including neural network circuitry (e.g., the neural network circuitry 518 and/or 218*b*) The communication circuitry 720*b* of the ear-worn device 700*b* may be configured to transmit the one or more processed microphone signals 752*b* to the communication circuitry 720*a* of the ear-worn device 700*a* over the wireless communication link and receive the one or more processed microphone signals 752*a* from the communication circuitry 720*a* of the ear-worn device 700*a* over the wireless communication link. In some embodiments, the beamforming circuitry of the ear-worn device 700*b* may be configured to perform beamforming on the one or more processed microphone signals 752*a* and the one or more processed microphone signals 752*b* (either beamforming them together or separately), thereby generating one or more beamformed audio signals. The neural network circuitry of the ear-worn device 700*b* may be configured to receive the one or more beamformed audio signals, or processed versions thereof, and implement one or more neural network layers (which may be the same as or different from the one or more neural network layers implemented by the neural network circuitry of the ear-worn device 700*a*) trained to perform audio enhancement based on the one or more beamformed audio signals. It should thus be appreciated that in some embodiments, each of the ear-worn devices 700*a* and 700*b* may be configured to perform beamforming on the same processed microphone signals 752*a* and 752*b* in the same manner. Thus, in some embodiments, the beamforming circuitry in each of the ear-worn devices 700*a* and 700*b* may be configured to generate the same one or more beamformed signals. It should be further appreciated that, in some embodiments, the neural network circuitry in each of the ear-worn devices 700*a* and 700*b* may be configured to generate, based on the one or more beamformed signals that each neural network circuitry receives, the same mask, or at least a same mask portion, namely the mask magnitude. Generally, when the mask is real, it may be helpful for each of the ear-worn devices 700*a* and 700*b* to generate the same mask. When the mask is complex, it may be helpful for each of the ear-worn devices 700*a* and 700*b* to generate the same magnitude portion of the mask but different phase portions. Further description of mask generation may be found above. Further description of generating the same mask (or the same mask magnitude portion) on two different ear-worn devices 700 may be found below with reference to FIG. 19-22. In some embodiments, the mask may be a noise-reducing mask. In some embodiments, the mask may be a spatially-focusing mask. In some embodiments, the mask may be a noise-reducing and spatially-focusing mask.

In some embodiments, the ear-worn devices 700*a* and 700*b* may be configured to beamform together processed microphone signals 752 that were generated at the same time, or approximately the same time. In such embodiments, the ear-worn device 700*a* may be configured to generate its own processed microphone signals 752*a*, wait for the latency period during which the ear-worn device 700*b* transmits its processed microphone signals 752*b* to the ear-worn device 700*b*, and then beamform together the processed microphone signals 752*a* and 752*b* (and vice versa for the ear-worn device 700*b*). In some embodiments, an NFMI wireless communication link between the two ear-worn devices 700*a* and 700*b* may be used to realize a sufficiently short latency. Additionally, in such embodiments, the ear-worn devices 700*a* and 700*b* may be configured to establish a shared timebase such that processed microphone signals 752 are generated at the same time, or approximately the same time. In some embodiments, one of the ear-worn devices 700 may be configured to transmit a message to the other ear-worn device 700 about establishing the shared timebase. When the transmit latency is not known accurately, the two ear-worn devices 700 may be configured to transmit messages back and forth to determine the latency. This may not be necessary when the latency is known accurately, such as with an NFMI wireless communication link. In some embodiments, the ear-worn devices 700*a* and 700*b* may be configured to beamform together processed microphone signals 752 that were not generated at the same time. For example, this may be the case when the ear-worn devices 700*a* and 700*b* have not established a shared timebase. In such embodiments, the ear-worn device 700*a* may be configured to beamform together the processed microphone signals 752*a* it most recently generated with the processed microphone signals 752*b* most recently received from the ear-worn device 700*b* (and vice versa for the ear-worn device 700*b*). In some embodiments, processed microphone signals 752 that were generated within 10 milliseconds of each other may be beamformed together. In some embodiments, processed microphone signals 752 that were generated within 5 milliseconds of each other may be beamformed together. In some embodiments, processed microphone signals 752 that were generated within 3 milliseconds of each other may be beamformed together. As described above, in some embodiments, an NFMI wireless communication link between the two ear-worn devices 700*a* and 700*b* may be used to realize a sufficiently short latency.

When the beamforming circuitry 746*a* generates the one or more beamformed audio signals 786*a*, the digital processing circuitry 744*a* may be configured to generate the one or more audio signals 732*a* from the one or more beamformed audio signals 786*a*. In some embodiments, the beamforming circuitry 746*a* may be absent and other circuitry in the digital processing circuitry 744*a* may be configured to receive the one or more processed microphone signals 752*b* and generate the one or more audio signals 732*a* from the one or more processed microphone signals 752*b* and, in some embodiments, the one or more processed microphone signals 752*a*. In such embodiments, the neural network circuitry of the ear-worn device 700*a* may be configured to receive non-beamformed audio signals.

Figure 8:
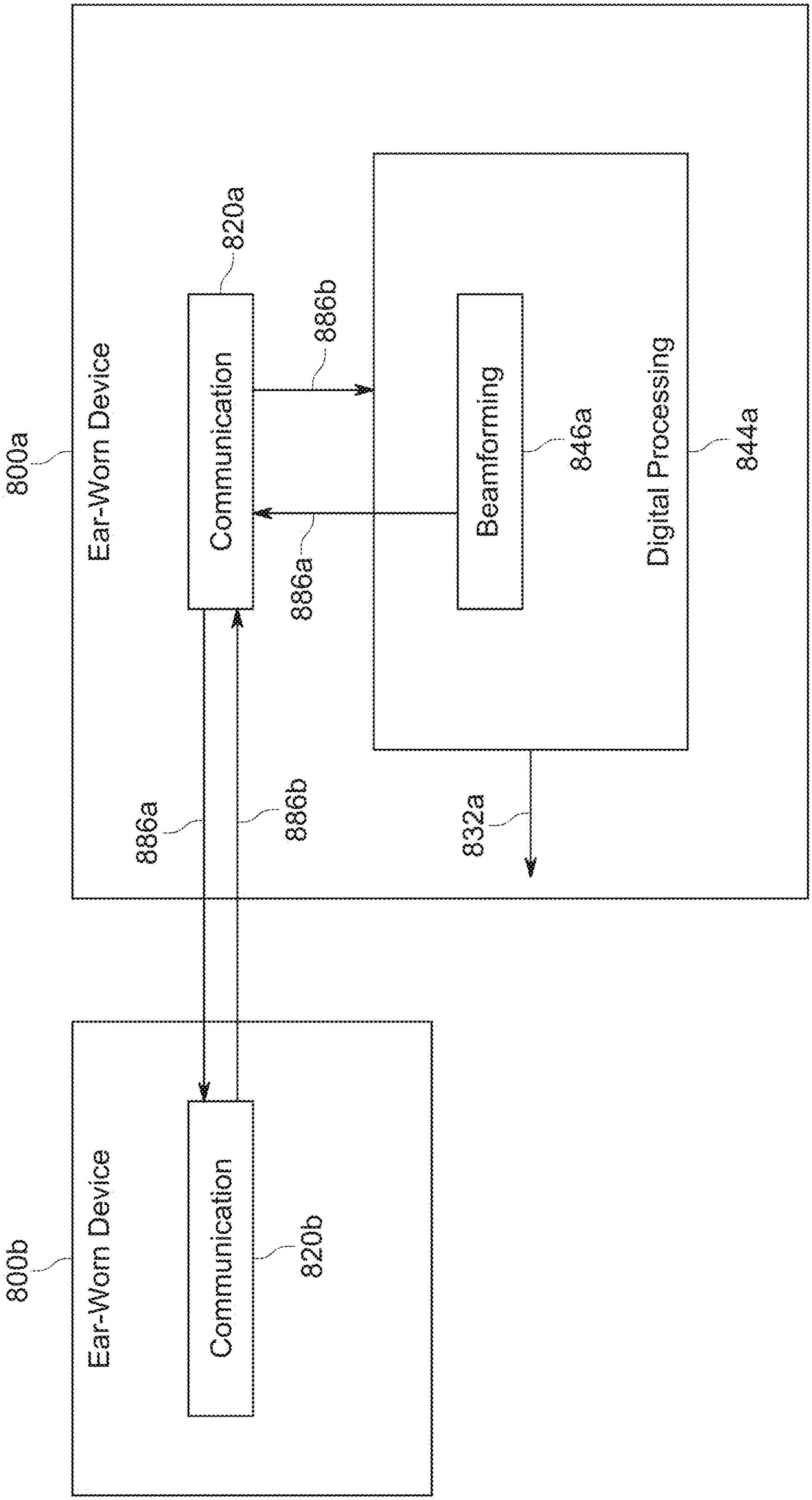
FIG. 8 illustrates a system of two ear-worn devices, in accordance with certain embodiments described herein.

FIG. 8 illustrates a system of two ear-worn devices 800*a* (which may correspond to the ear-worn device 200*a* and/or 300*a*) and 800*b* (which may correspond to the ear-worn device 200*b* and/or 300*b*), in accordance with certain embodiments described herein. The ear-worn device 800*a* may, for example, be worn on the right ear of a wearer, and the ear-worn device 800*b* may, for example, be worn on the left ear of a wearer. Thus, the ear-worn devices 800*a* and 800*b* may each be part of a pair. FIG. 8 further illustrates circuitry in the ear-worn device 800*a*. It should be appreciated that the circuitry and functionality described and illustrated for the ear-worn device 800*a* may be replicated in the ear-worn device 800*b*, but might not be explicitly illustrated or described for simplicity. It should also be appreciated that the ear-worn device 800*a* may include more circuitry and components than shown and such circuitry and components may be disposed before, after, or between certain of the circuitry and components illustrated in FIG. 8.

The circuitry in the ear-worn device 800*a* includes digital processing circuitry 844*a* (which may correspond to the digital processing circuitry 444) and communication circuitry 820*a* (which may correspond to the communication circuitry 220*a* and/or 320*a*). The digital processing circuitry 844*a* includes beamforming circuitry 846*a* (which may correspond to the beamforming circuitry 446). The ear-worn device 800*b* includes communication circuitry 720*b* (which may correspond to the communication circuitry 220*b* and/or 320*b*). The digital processing circuitry 844*a* may be part of pre-processing circuitry (e.g., the pre-processing circuitry 384*a* and/or 484), and the pre-processing circuitry may be part of processing circuitry (e.g., the processing circuitry 214*a* and/or 314*a*).

In the ear-worn device 800*a*, the communication circuitry 820*a* may be configured to receive the one or more beamformed audio signals 886*a* from the beamforming circuitry 846*a*, and the communication circuitry 820*a* may be configured to transmit the one or more beamformed audio signals 886*a* to the communication circuitry 820*b* of the ear-worn device 800*b* over the wireless communication link. The one or more beamformed audio signals 886*a* may be examples of the shared data 238*a*. As further illustrated in FIG. 8, the communication circuitry 820*a* may be configured to receive one or more beamformed audio signals 886*b* from the communication circuitry 820*b* of the other ear-worn device 800*b*. The one or more beamformed audio signals 886*b* may be examples of the shared data 238*b*.

In the example of FIG. 8, the one or more audio signals 832*a* (which may correspond to the one or more audio signals 332*a*, 432, and/or 532) output from the digital processing circuitry 844*a* may include one or more audio signals originating from the one or more beamformed audio signals 886*a* and one or more audio signals originating from the one or more beamformed audio signals 886*a*. In this example, the ear-worn device 800*a* (and the ear-worn device 800*b*) might be configured to only use beamformed audio signals formed by beamforming together signals from the same ear-worn device 800, rather than beamforming together signals from both the ear-worn device 800*a* and the ear-worn device 800*b*. In other words, the beamforming circuitry 846*a* might not be configured to beamform the one or more beamformed audio signals 886*a* together with the one or more beamformed audio signals 886*b*. In some embodiments, the beamforming circuitry 846*a* may be configured to beamform together one or more of the one or more beamformed audio signals 886*a* and one or more of the one or more beamformed audio signals 886*b*, and the digital processing circuitry 844*a* may be configured to generate the one of or more audio signals 832*a* from the result. (In some embodiments, beamforming together the beamformed audio signals 886*a* and 886*b* may include simple addition, as in the four-beam pattern example above.) In such embodiments, the ear-worn device 800*a* (and the ear-worn device 800*b*) may be configured to use beamformed audio signals 886*a* formed from beamforming signals from the ear-worn device 800*a* together with signals from the ear-worn device 800*b*. Generally, neural network circuitry (e.g., the neural network circuitry 218*a* and/or 518) of the ear-worn device 800*a* may be configured to receive one or more audio signals (e.g., the one or more audio signals 832*a*) that are or originate from one or more beamformed audio signals and implement one or more neural network layers trained to perform audio enhancement based on the one or more beamformed audio signals, where the one or more beamformed audio signals may include the one or more beamformed audio signals 886*a* and the one or more second beamformed audio signals 886*b*, and/or one or more beamformed audio signals formed by beamforming at least one of the one or more beamformed audio signals 886*a* together with at least one of the one or more beamformed audio signals 886*b*.

Using beamformed signals from different ear-worn devices 800 may result in better spatial focusing than just using beamformed signals from a single ear-worn device 800. As described above, neural network circuitry may be configured to receive one or audio signals (e.g., the one or more audio signals 832*a*) that are or originate from the one or more beamformed audio signals 886*a* and the one or more beamformed audio signals 886*b* and implement one or more neural network layers trained to perform noise reduction and spatial focusing based on these inputs. When neural network circuitry of the ear-worn device 800*a* receives inputs that are or originate from beamformed audio signals 886 originating from both ear-worn devices 800*a* and 800*b*, the ear-worn device 800*a* may be able to generate an enhanced output audio signal having better spatial focusing than if the ear-worn device 800*a* did not receive the beamformed audio signals 886*b* from the ear-worn device 800*b*. In some embodiments, better spatial focusing may include narrower focusing with extra attenuation of sounds not in front of the wearer, where the extra attenuation may be in the range of, for example, 1-4 dB.

It should be appreciated that the ear-worn device 800*b* may include its own processing circuitry (e.g., the processing circuitry 214*b*), the processing circuitry including audio enhancement circuitry, and the audio enhancement circuitry including neural network circuitry (e.g., the neural network circuitry 218*b*). The communication circuitry 820*b* of the ear-worn device 800*b* may be configured to transmit the one or more beamformed audio signals 886*b* to the communication circuitry 820*a* of the ear-worn device 800*a* over the wireless communication link and receive the one or more beamformed audio signals 886*a* from the communication circuitry 820*a* of the ear-worn device 800*a* over the wireless communication link. The neural network circuitry of the ear-worn device 800*b* may be configured to receive inputs that are or originate from one or more beamformed audio signals and implement one or more neural network layers (which may be the same as or different from the one or more neural network layers implemented by the neural network circuitry of the ear-worn device 800*a*) trained to perform audio enhancement based on the one or more beamformed audio signals. The one or more beamformed audio signals may include the one or more beamformed audio signals 886*a* and the one or more beamformed audio signals 886*b*, and/or one or more beamformed audio signals formed by beamforming at least one of the one or more beamformed audio signals 886*a* together with at least one of the one or more beamformed audio signals 886*b*. It should be further appreciated that, in some embodiments, the neural network circuitry in each of the ear-worn devices 800*a* and 800*b* may be configured to generate, based on the inputs that each neural network circuitry receives, the same mask, or at least a same mask portion, namely the mask magnitude. Generally, when the mask is real, it may be helpful for each of the ear-worn devices 800*a* and 800*b* to generate the same mask. When the mask is complex, it may be helpful for each of the ear-worn devices 800*a* and 800*b* to generate the same magnitude portion of the mask but different phase portions. Further description of mask generation may be found above. Further description of generating the same mask (or the same mask magnitude portion) on two different ear-worn devices 800 may be found below with reference to FIG. 19-22. In some embodiments, the mask may be a noise-reducing and spatially-focusing mask.

It should be appreciated that beamformed signals may be considered a type of processed microphone signals. Thus, embodiments that include sharing beamformed audio signals between devices (e.g., as described with reference to FIG. 8) may examples of embodiments that include sharing processed microphone signals (e.g., as described with reference to FIG. 7). Generally, a system may include a first ear-worn device (e.g., the ear-worn device 700*a* and/or 800*a*) including one or more first microphones (e.g., the one or more microphones 210*a*), first processing circuitry (e.g., the processing circuitry 214*a* and/or 314*a*) including first neural network circuitry (e.g., the neural network circuitry 218*a* and/or 318*a*), and first communication circuitry (e.g., the communication circuitry 720*a* and/or 820*a*); and a second ear-worn device (e.g., the ear-worn device 700*b* and/or 800*b*) including one or more second microphones (e.g., the one or more microphones 210*b*), second processing circuitry (e.g., the processing circuitry 214*b*) including second neural network circuitry (e.g., the neural network circuitry 218*b*), and second communication circuitry (e.g., the communication circuitry 720*b* and/or 820*b*). The first communication circuitry and the second communication circuitry may be configured to communicate over a wireless communication link (e.g., the wireless communication link 222 and/or 322). The one or more first microphones may be configured to generate one or more first microphone signals (e.g., the one or more microphone signals 224*a* and/or 324*a*). The one or more second microphones may be configured to generate one or more second microphone signals (e.g., the one or more microphone signals 224*b*). The first processing circuitry may be configured to process the one or more first microphone signals, thereby generating one or more first processed microphone signals (e.g., the one or more processed microphone signals 752*a* and/or the one or more beamformed audio signals 886*a*). The second processing circuitry may be configured to process the one or more second microphone signals, thereby generating one or more second processed microphone signals (e.g., the one or more processed microphone signals 752*b* and/or the one or more beamformed audio signals 886*b*). The first communication circuitry may be configured to transmit the one or more first processed microphone signals to the second communication circuitry over the wireless communication link, and receive the one or more second processed microphone signals from the second communication circuitry over the wireless communication link. The first neural network circuitry may be configured to receive one or more audio signals (e.g., the one or more audio signals 732*a* and/or 832*a*) comprising or originating from the one or more first processed microphone signals and the one or more second processed microphone signals and implement one or more first neural network layers trained to perform audio enhancement based on the one or more audio signals. Further description may be found with reference to FIGS. 7-8.

Figure 9:
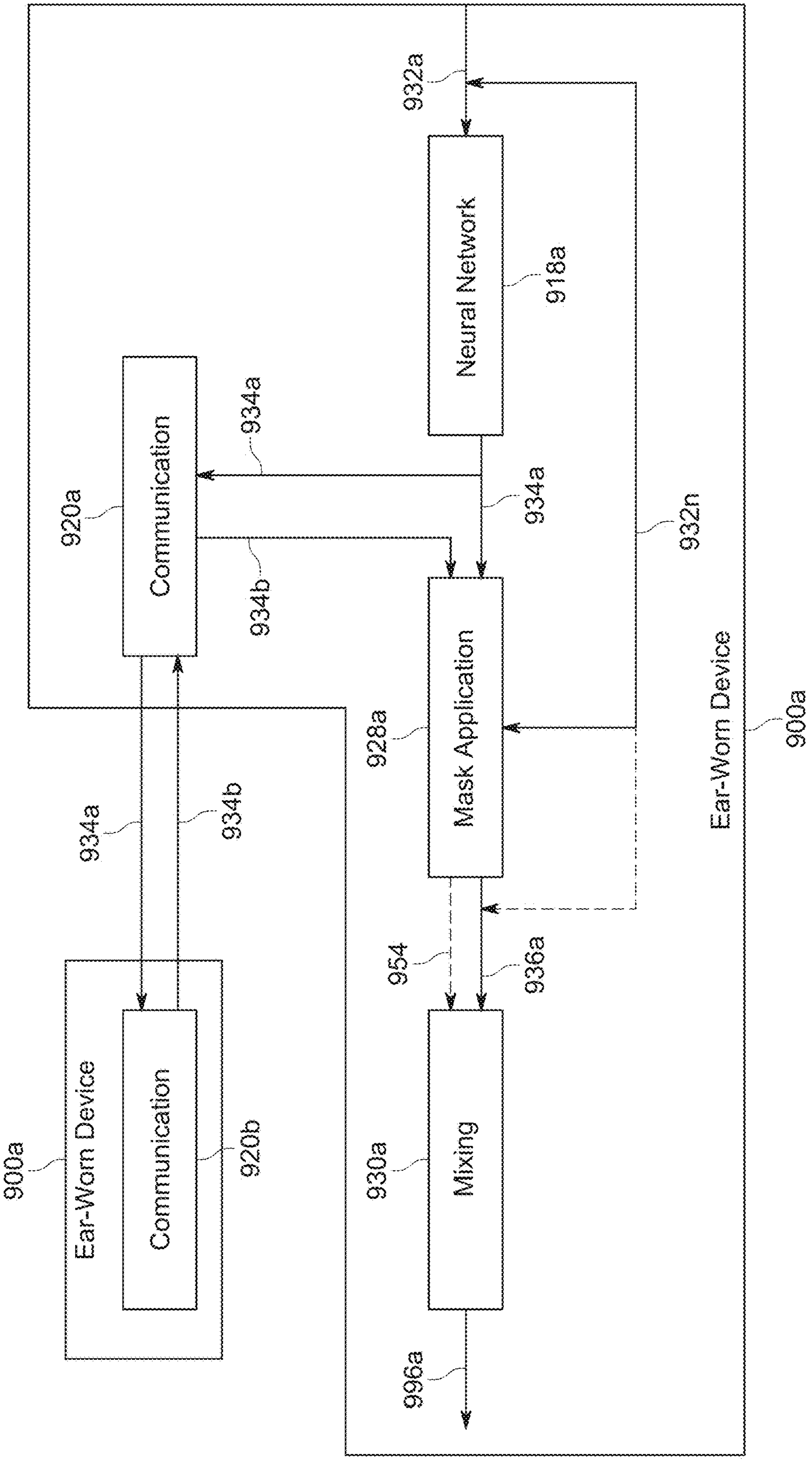
FIG. 9 illustrates a system of two ear-worn devices, in accordance with certain embodiments described herein.

FIG. 9 illustrates a system of two ear-worn devices 900*a* (which may correspond to the ear-worn device 200*a* and/or 300*a*) and 900*b* (which may correspond to the ear-worn device 200*b* and/or 300*b*), in accordance with certain embodiments described herein. The ear-worn device 900*a* may, for example, be worn on the right ear of a wearer, and the ear-worn device 900*b* may, for example, be worn on the left ear of a wearer. Thus, the ear-worn devices 900*a* and 900*b* may each be part of a pair. FIG. 9 further illustrates circuitry in the ear-worn device 900*a*. It should be appreciated that the circuitry and functionality described and illustrated for the ear-worn device 900*a* may be replicated in the ear-worn device 900*b*, but might not be explicitly illustrated or described for simplicity. It should also be appreciated that the ear-worn device 900*a* may include more circuitry and components than shown and such circuitry and components may be disposed before, after, or between certain of the circuitry and components illustrated in FIG. 9.

The circuitry in the ear-worn device 900*a* includes neural network circuitry 918*a* (which may correspond to the neural network circuitry 218*a*, 318*a*, 518), mask application circuitry 928*a* (which may correspond to the mask application circuitry 528), mixing circuitry 930*a* (which may correspond to the mixing circuitry 530), and communication circuitry 920*a* (which may correspond to the communication circuitry 220*a* and/or 320*a*). The ear-worn device 900*b* includes communication circuitry 920*b* (which may correspond to the communication circuitry 220*b* and/or 320*b*). The neural network circuitry 918*a*, the mask application circuitry 928*a*, and the mixing circuitry 930*a* may be part of audio enhancement circuitry (e.g., the audio enhancement circuitry 316*a* and/or 516), and the audio enhancement circuitry may be part of processing circuitry (e.g., the processing circuitry 214*a* and/or 314*a*). The mask application circuitry 928*a* and the mixing circuitry 930*a* may be part of post-processing circuitry (e.g., the post-processing circuitry 590 and/or 690).

In the ear-worn device 900*a*, the communication circuitry 920*a* may be configured to receive the one or more neural network products 934*a* from the neural network circuitry 918*a*, and the communication circuitry 920*a* may be configured to transmit the one or more neural network products 934*a* (which may correspond to the neural network products 334*a* and/or 534) to the communication circuitry 920*b* of the ear-worn device 900*b* over a wireless communication link (e.g., the wireless communication link 222 and/or 322). The one or more neural network products 934*a* may be examples of the shared data 238*a*. As further illustrated in FIG. 9, the communication circuitry 920*a* may be configured to receive one or more neural network products 934*b* generated by the ear-worn device 900*b* from the communication circuitry 920*b* of the ear-worn device 900*b*. The one or more neural network products 934*b* may be examples of the shared data 238*b*.

In more detail, the neural network circuitry 918*a* of the ear-worn device 900*a* may be configured to receive the one or more audio signals 932*a* generated by the ear-worn device 900*a* and implement one or more neural network layers. The neural network circuitry 918*a* may be configured to use the one or more neural network layers to generate a first mask (which may be an example of the one or more neural network products 934*a*) based on the one or more audio signals 932*a*. For example, when the first mask is a noise-reducing and spatially-focusing mask, the neural network circuitry 918*a* may be configured to generate the first mask such that, when the mask is applied to the audio signal 932*n* (or generally, one of the audio signals generated by the ear-worn device 900*a*), the result is a noise-reduced and spatially-focused version of the audio signal 932*n*. The neural network circuitry (e.g., the neural network circuitry 218*b*) of the ear-worn device 900*b* may be configured to receive one or more audio signals generated by the ear-worn device 900*b* and implement one or more neural network layers (which may be the same as or different from the one or more neural network layers implemented by the neural network circuitry 918*a* of the ear-worn device 900*a*). The neural network circuitry of the ear-worn device 900*b* may be configured to generate a second mask (which may be an example of the one or more neural network products 934*b*) based on the one or more audio signals. For example, when the second mask is a noise-reducing and spatially-focusing mask, the neural network circuitry may be configured to generate the second mask such that, when the mask is applied to one of the one or more audio signals generated by the ear-worn device 900*b*, the result is a noise-reduced and spatially-focused version of one of the beamformed audio signals. The communication circuitry 920*a* of the ear-worn device 900*a* may be configured to transmit the first mask (or at least, the magnitude portion of the first mask) to the communication circuitry 920*b* of the ear-worn device 900*b* over a wireless communication link, and receive the second mask (or at least, the magnitude portion of the second mask) from the communication circuitry 920*b* of the ear-worn device 900*b* over the wireless communication link. The communication circuitry 920*b* of the ear-worn device 900*b* may be configured to transmit the second mask (or at least, the magnitude portion of the second mask) to the communication circuitry 920*a* of the ear-worn device 900*a* over the wireless communication link, and receive the first mask (or at least, the magnitude portion of the first mask) from the communication circuitry 920*a* the ear-worn device 900*a* over the wireless communication link. When the first and second masks are real, the ear-worn devices 900*a* and 900*b* may be configured to transmit the masks. When the first and second masks are complex, the ear-worn devices 900*a* and 900*b* may be configured to transmit the magnitude portions of the masks.

In some embodiments, the one or more neural network layers (i.e., implemented by the neural network circuitry on each ear-worn device 900*a* and 900*b*) may be trained to perform noise reduction. In some embodiments, the one or more neural network layers (i.e., implemented by the neural network circuitry on each ear-worn device 900*a* and 900*b*) may be trained to perform spatial focusing. In some embodiments, the one or more neural network layers (i.e., implemented by the neural network circuitry on each ear-worn device 900*a* and 900*b*) may be trained to perform noise reduction and spatial focusing. In some embodiments, the first mask and the second mask may each be a noise-reducing mask. In some embodiments, the first mask and the second mask may each be a spatially-focusing mask. In some embodiments, the first mask and the second mask may each be a noise reducing and spatially-focusing mask.

As described above, one of the one or more neural network products 934*a* may be a first mask and one of the one or more neural network products 934*b* may be a second mask. In some embodiments, the ear-worn device 900*a* (in particular, in the example of FIG. 9, the mask application circuitry 928*a*) of the ear-worn device 900*a* may be configured to combine the first mask with the second mask (or at least, to combine the magnitude portions of the first and second masks), thereby generating, at least in part, a combined mask. In some embodiments, the ear-worn device 900*a* (in particular, in the example of FIG. 9, the mask application circuitry 928*a*) of the ear-worn device 900*a* may be configured, when combining the first mask with the second mask, to average the first mask with the second mask (or at least, to average the magnitude portions of the first and second masks). When the first and second masks are real, the ear-worn device 900*a* may be configured to average (or generally, combine) the first and second masks, and the result may be the combined mask. When the first and second masks are complex, the ear-worn device 900*a* may be configured to average (or generally, combine) the magnitude portions of the first and second masks. The magnitude portion of the combined mask may be based on (or equal to) the result of this averaging (or generally, this combination), and the phase portion of the combined mask may be based on (or equal to) the phase portion of the first mask. (In other words, the phase portion of the combined mask might not be based on the phase portion of the second mask.) The ear-worn device 900*a* (in particular, the mask application circuitry 928*b*) of the ear-worn device 900*a* may be configured to apply the combined mask to the audio signal 932*n* (or generally, an audio signal generated by the ear-worn device 900*a*).

The ear-worn device 900*b* may also be configured to combine the first mask with the second mask (or at least, to combine the magnitude portions of the first and second masks), thereby generating, at least in part, a combined mask. In some embodiments, the ear-worn device 900*b* may be configured, when combining the first mask with the second mask, to average the first mask with the second mask (or at least, to average the magnitude portions of the first and second masks). When the first and second masks are real, the ear-worn device may be configured to average (or generally, combine) the first and second masks, and the result may be the combined mask. When the first and second masks are complex, the ear-worn device may be configured to average (or generally, combine) the magnitude portions of the first and second masks. The magnitude portion of the combined mask may be based on (or equal to) the result of this averaging (or generally, this combining), and the phase portion of the combined mask may be based on (or equal to) the phase portion of the second mask. (In other words, the phase portion of the combined mask might not be based on the phase portion of the first mask.) Thus, when the first and second masks are real, the ear-worn device 900*a* and the ear-worn device 900*b* may be configured to generate the same combined mask. When the first and second masks are complex, the ear-worn device 900*a* and the ear-worn device 900*b* may be configured to generate combined masks having the same magnitude portions but different phase portions. In any case, the ear-worn device 900*a* and the ear-worn device 900*b* may be configured to apply their combined masks to different audio signals.

Averaging (or generally, combining) masks may be helpful in removing or reducing binaural inconsistencies. Binaural inconsistencies may generally refer to significant differences in audio generated by the ear-worn device on each ear. For example, consider that to the side of an ear-worn device wearer there is a speaker talking sufficiently quietly such that the speech from the speaker is recognized as speech by the neural network running on the ear-worn device closer to the speaker, but not by the neural network running on the ear-worn device farther from the speaker. This could cause the closer ear-worn device to pass the speech through to its output, but cause the farther ear-worn device to prevent the speech from passing through to its output (or otherwise attenuate it). This can create an undesirable phantom voice effect for the wearer. Ideally, both ear-worn devices would treat such speech in the same manner. Averaging masks as described above may be helpful in removing or reducing such binaural inconsistencies.

In some embodiments, the ear-worn devices 900*a* and 900*b* may also be configured to transmit and combine (e.g., average) their additive components (or at least, the magnitudes of their additive components). However, in some embodiments (e.g., when the neural networks are trained to make the additive components be small corrections), the ear-worn devices 900*a* and 900*b* might not be configured to transmit their additive components.

In some embodiments, the ear-worn device 900*a* (in particular, in the example of FIG. 9, the mask application circuitry 928*a*) may be configured to compare masks from each ear-worn device 900 (i.e., compare the first mask from the ear-worn device 900*a* with the second mask from the ear-worn device 900*b*). If the two masks are sufficiently different, this may indicate that there are binaural inconsistencies. In some embodiments, to compare two masks, the ear-worn device 900*a* may be configured to calculate a metric. For example, calculating the metric may include calculating the magnitude of each mask; subtracting the magnitudes, thereby generating a difference; and determining an absolute value of the difference. In some embodiments, calculating the metric may further include performing an average over all the frequency bins, while in other embodiments such an average may not be performed. In the latter embodiments, the comparison operation may be performed on a per-frequency bin basis. In some embodiments, based on the comparison, the mixing circuitry 930*a* (which may be configured to mix at least two audio signals 936*a*, thereby generating an output audio signal 996*a* (which may correspond to the output audio signals 696)), may be configured to modulate weighting of the at least two audio signals in the mixing. For example, consider that the mixing circuitry 930*a* generates the output audio signal 996*a* such that it includes a weighted mix of the speech component and noise component of the audio signal 932*n*. The mixing circuitry 930*a* may be configured to generate the output audio signal 996*a* to have a higher amplitude of noise (i.e., a higher amplitude of the noise component), or in other words, to be less aggressive with noise reduction, when the comparison indicates that a difference between the two masks has increased. As a specific example, referring to the speech component as S and the noise component as N, if the mixing circuitry 930*a* is configured to output S+x*N, then the mixing circuitry 930*a* may be configured to use a higher value for x when the value for the metric indicates a larger difference between the two masks. If the metric is calculated on a per-frequency basis, then the mixing circuitry 930*a* may be configured to modulate the mixing on a per-frequency basis.

FIG. 9 illustrates an optional control signal 954 from the mask application circuitry 928*a* to the mixing circuitry 930*a*. When the mask application circuitry 928*a* is configured to perform the comparison described above, the control signal 954 may be the value for the metric, or an indication whether the value for the metric exceeds a threshold. The mixing circuitry 930*a* may be configured to modulate the mixing based on the control signal 954. While FIG. 9 may illustrate the mask application circuitry 928*a* performing the mask comparison, in some embodiments the mixing circuitry 930*a* itself may be configured to perform the comparison. In such embodiments, the control signal 954 may be absent. In some embodiments, some other circuitry in the ear-worn device 900*a* may be configured to perform the comparison.

In some embodiments, the ear-worn devices 900*a* and 900*b* may be configured to average or compare masks that were generated at the same time, or approximately the same time. In such embodiments, the ear-worn device 900*a* may be configured to generate its own mask, wait for the latency period during which the ear-worn device 900*b* transmits its mask to the ear-worn device 900*b*, and then average or compare the masks (and vice versa for the ear-worn device 900*b*). In the case of comparing the masks, in some embodiments the result of the comparison may be used to determine how to process older signals (i.e., from when or approximately when the masks were generated), while in other embodiments, the result of the comparison may be used to determine how to process the most recent signals (even if the most recent signals and the masks were generated at different times). In some embodiments, an NFMI wireless communication link between the two ear-worn devices 900*a* and 900*b* may be used to realize a sufficiently short latency. Additionally, in such embodiments, the ear-worn devices 900*a* and 900*b* may be configured to establish a shared timebase such that processed microphone signals are generated at the same time, or approximately the same time. In some embodiments, one of the ear-worn devices 900 may be configured to transmit a message to the other ear-worn device 900 about establishing the shared timebase. When the transmit latency is not known accurately, the two ear-worn devices 900*a* and 900*b* may be configured to transmit messages back and forth to determine the latency. This may not be necessary when the latency is known accurately, such as with an NFMI wireless communication link. In some embodiments, the ear-worn devices 900*a* and 900*b* may be configured to average or compare masks that were not generated at the same time. For example, this may be the case when the ear-worn devices 900*a* and 900*b* have not established a shared timebase. In such embodiments, the ear-worn device 900*a* may be configured to average or compare the masks it most recently generated with the mask most recently received from the ear-worn device 900*b* (and vice versa for the ear-worn device 900*b*). In some embodiments, masks that were generated within 10 milliseconds of each other may be averaged or compared. In some embodiments, masks that were generated within 5 milliseconds of each other may be averaged or compared. In some embodiments, masks that were generated within 3 milliseconds of each other may be averaged or compared. In some embodiments, masks that were generated within 2 milliseconds of each other may be averaged or compared. As described above, in some embodiments, an NFMI wireless communication link between the two ear-worn devices 900*a* and 900*b* may be used to realize a sufficiently short latency.

Figure 10:
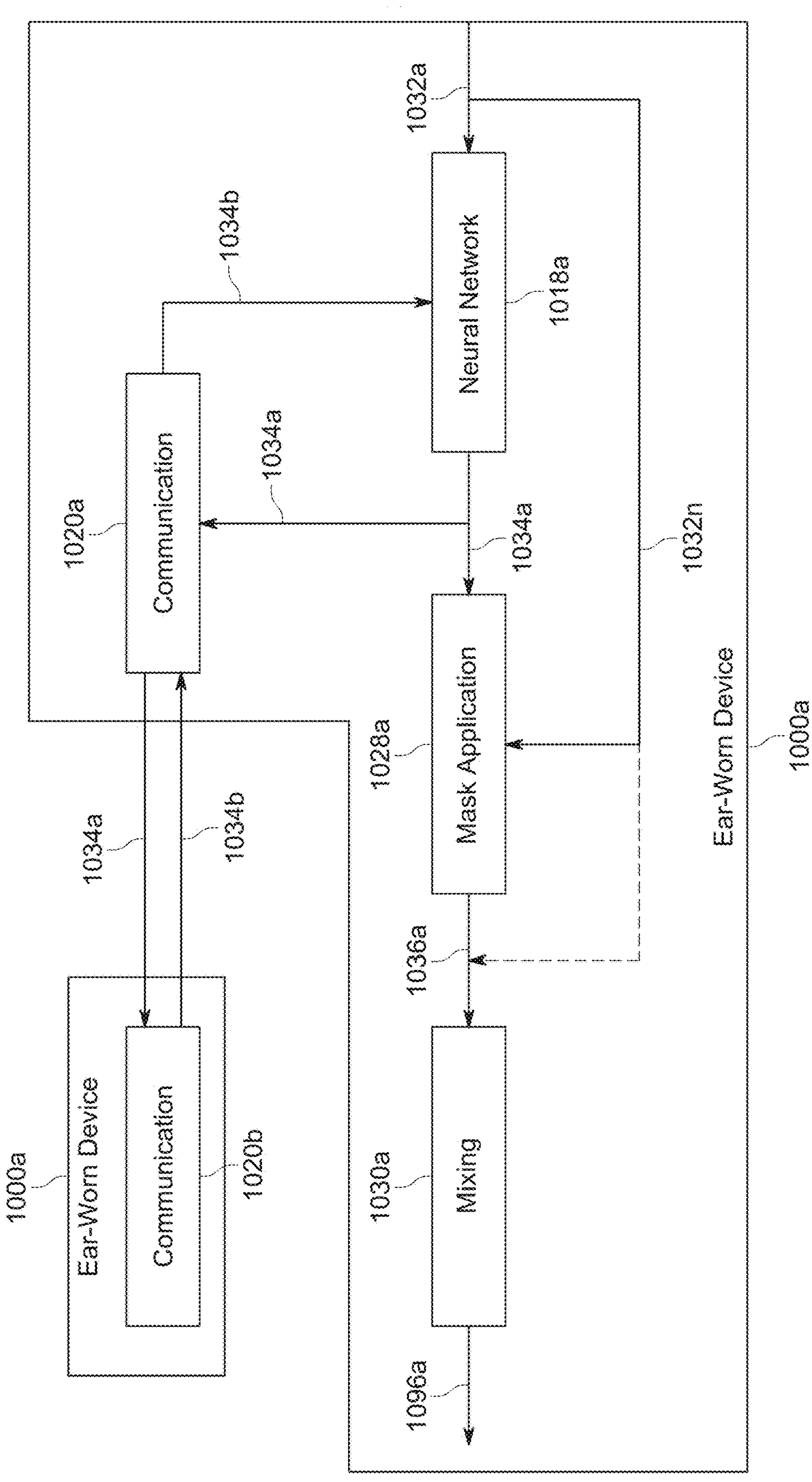
FIG. 10 illustrates a system of two ear-worn devices, in accordance with certain embodiments described herein.

FIG. 10 illustrates a system of two ear-worn devices 1000*a* (which may correspond to the ear-worn device 200*a* and/or 300*a*) and 1000*b* (which may correspond to the ear-worn device 200*b* and/or 300*b*), in accordance with certain embodiments described herein. The ear-worn device 1000*a* may, for example, be worn on the right ear of a wearer, and the ear-worn device 1000*b* may, for example, be worn on the left ear of a wearer. Thus, the ear-worn devices 1000*a* and 1000*b* may each be part of a pair. FIG. 10 further illustrates circuitry in the ear-worn device 1000*a*. It should be appreciated that the circuitry and functionality described and illustrated for the ear-worn device 1000*a* may be replicated in the ear-worn device 1000*b*, but might not be explicitly illustrated or described for simplicity. It should also be appreciated that the ear-worn device 1000*a* may include more circuitry and components than shown and such circuitry and components may be disposed before, after, or between certain of the circuitry and components illustrated in FIG. 10.

The circuitry in the ear-worn device 1000*a* includes neural network circuitry 1018*a* (which may correspond to the neural network circuitry 218*a*, 318*a*, 518), mask application circuitry 1028*a* (which may correspond to the mask application circuitry 528), mixing circuitry 1030*a* (which may correspond to the mixing circuitry 530), and communication circuitry 1020*a* (which may correspond to the communication circuitry 220*a* and/or 320*a*). The ear-worn device 1000*b* includes communication circuitry 1020*b* (which may correspond to the communication circuitry 220*b* and/or 320*b*). The neural network circuitry 1018*a*, the mask application circuitry 1028*a*, and the mixing circuitry 1030*a* may be part of audio enhancement circuitry (e.g., the audio enhancement circuitry 316*a* and/or 516), and the audio enhancement circuitry may be part of processing circuitry (e.g., the processing circuitry 214*a* and/or 314*a*). The mask application circuitry 1028*a* and the mixing circuitry 1030*a* may be part of post-processing circuitry (e.g., the post-processing circuitry 590 and/or 690).

The above description of FIG. 9 generally applies to FIG. 10, with the exception that the neural network circuitry 1018*a* of the ear-worn device 1000*a* may be configured to input the one or more neural network products 1034*b* (which may correspond to the one or more neural network products 334*a* and/or 534, e.g., a mask) received from the ear-worn device 1000*b* to at least one of the one or more neural network layers implemented by the neural network circuitry 1018*a*. In some embodiments, the ear-worn device 1000*a* may be configured to input the one or more neural network products 1034*b* when processing a later frame of audio data.

Figure 11:
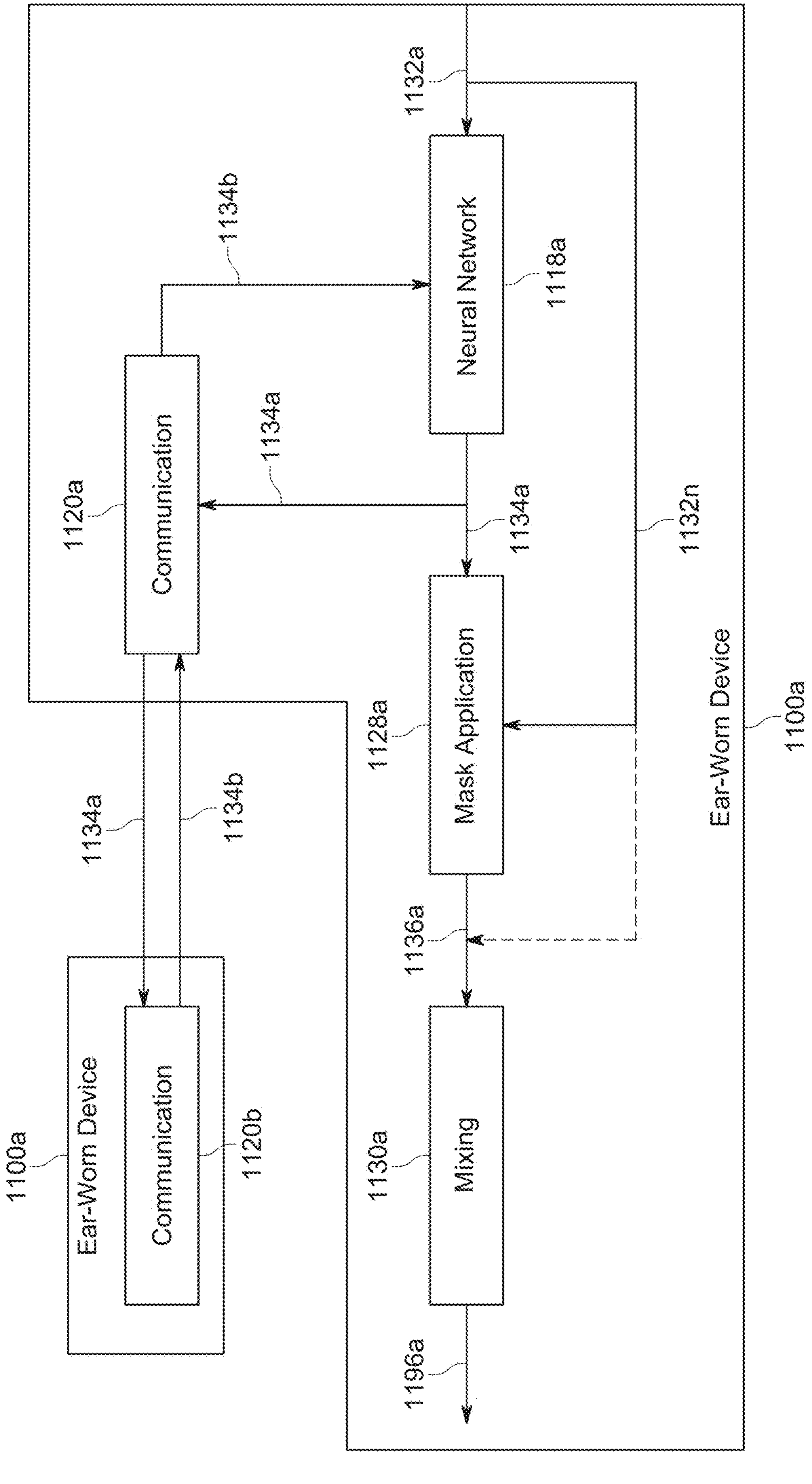
FIG. 11 illustrates a system of two ear-worn devices, in accordance with certain embodiments described herein.

In some embodiments, an ear-worn device may be configured to both combine neural network products 1034 (as described above with reference to FIG. 9) and input neural network products 1034 to neural network layers (as described above with reference to FIG. 10). FIG. 11 illustrates a system of two ear-worn devices 1100*a* (which may correspond to the ear-worn device 200*a*, 300*a*, 900*a*, and/or 1000*a*) and 1100*b* (which may correspond to the ear-worn device 200*b*, 300*b*, 900*b*, and/or 1000*b*), in accordance with certain embodiments described herein. The ear-worn device 1100*a* may, for example, be worn on the right ear of a wearer, and the ear-worn device 1100*b* may, for example, be worn on the left ear of a wearer. Thus, the ear-worn devices 1100*a* and 1100*b* may each be part of a pair. FIG. 11 further illustrates circuitry in the ear-worn device 1100*a*. It should be appreciated that the circuitry and functionality described and illustrated for the ear-worn device 1100*a* may be replicated in the ear-worn device 1100*b*, but might not be explicitly illustrated or described for simplicity. It should also be appreciated that the ear-worn device 1100*a* may include more circuitry and components than shown and such circuitry and components may be disposed before, after, or between certain of the circuitry and components illustrated in FIG. 11.

The circuitry in the ear-worn device 1100*a* includes neural network circuitry 1118*a* (which may correspond to the neural network circuitry 218*a*, 318*a*, 518, 918, and/or 1018), mask application circuitry 1128*a* (which may correspond to the mask application circuitry 528, 928, and/or 1028), mixing circuitry 1130*a* (which may correspond to the mixing circuitry 530, 930, and/or 1030), and communication circuitry 1120*a* (which may correspond to the communication circuitry 220*a*, 320*a*, 920*a*, and/or 1020*a*). The ear-worn device 1100*b* includes communication circuitry 1120*b* (which may correspond to the communication circuitry 220*b*, 320*b*, 920*b*, and/or 1020*b*). The neural network circuitry 1118*a*, the mask application circuitry 1128*a*, and the mixing circuitry 1130*a* may be part of audio enhancement circuitry (e.g., the audio enhancement circuitry 316*a*, and/or 516), and the audio enhancement circuitry may be part of processing circuitry (e.g., the processing circuitry 214*a*, 314*a*). The mask application circuitry 1128*a* and the mixing circuitry 1130*a* may be part of post-processing circuitry (e.g., the post-processing circuitry 590 and/or 690). The ear-worn device 1100*a* may be configured both to combine one or more neural network products 1134*a* (as described with reference to FIG. 9) and to input one or more neural network products 1134*a* to neural network layers (as described with reference to FIG. 10), where the one or more neural network products may correspond to the one or more neural network products 334*a*, 534, 934*a*, and/or 1034*a*. Thus, FIG. 11 may be considered an example of both FIG. 9 and FIG. 10. Further description of inputting neural network products to neural network layers and, in some embodiments, also combining neural network products may be found with reference to FIGS. 12-15.

Figure 12:
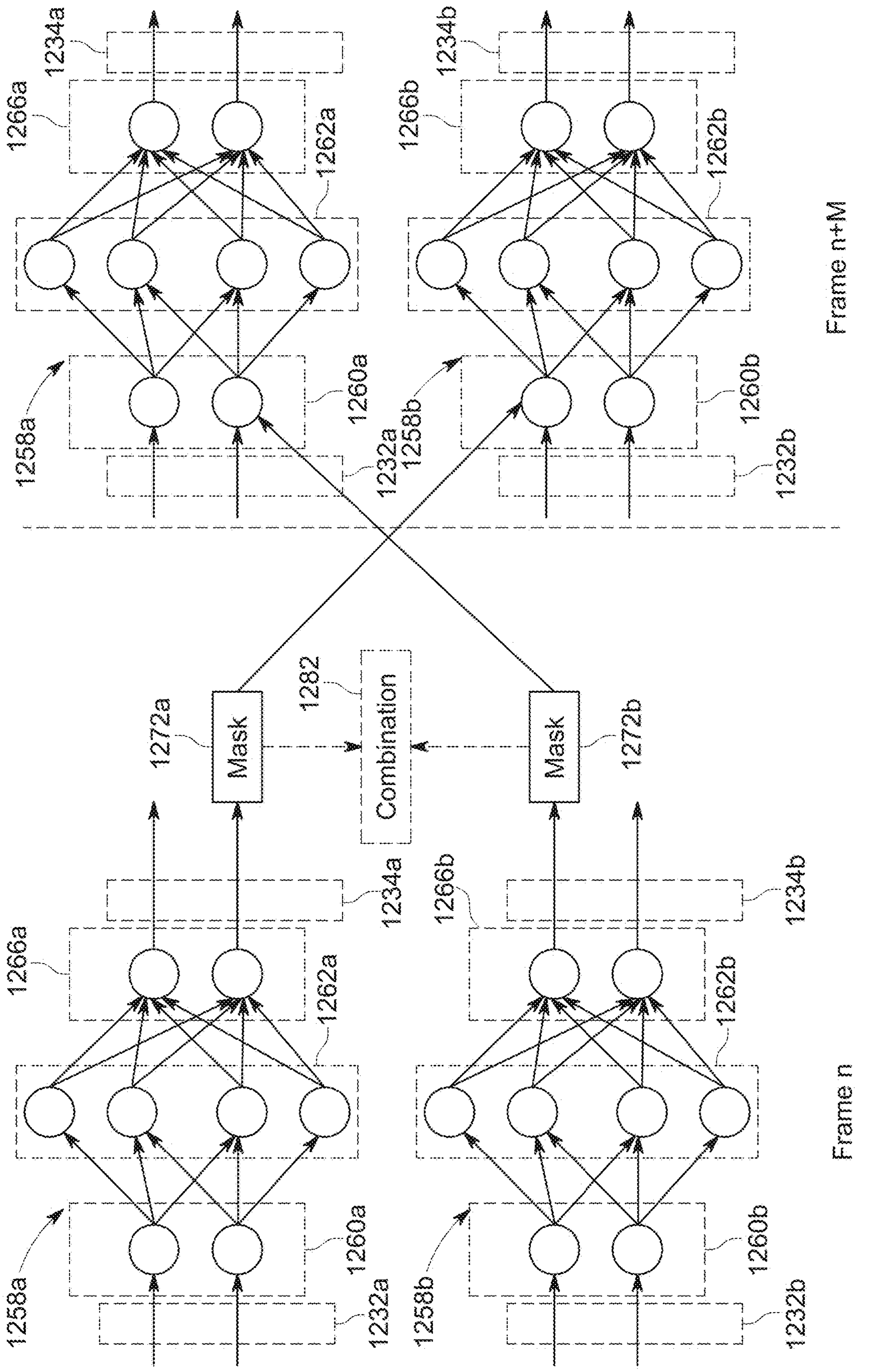
FIG. 12 illustrates an example of neural network layers using neural network products from other ear-worn devices, in accordance with certain embodiments described herein.

FIG. 12 illustrates an example of neural network layers using neural network products from other ear-worn devices, in accordance with certain embodiments described herein. FIG. 12 illustrates a neural network 1258*a* (which may generally be one or more neural network layers) and a neural network 1258*b* (which may also generally be one or more neural network layers). The neural network 1258*a* may be implemented by neural network circuitry in one ear-worn device (e.g., the neural network circuitry 1018*a* of the ear-worn device 1000*a* and/or the neural network circuitry 1118*a* of the ear-worn device 1100*a*) and the neural network 1258*b* may be implemented by neural network circuitry in another ear-worn device (e.g., the neural network circuitry of the ear-worn device 1000*b* and/or 1100*b*).

In the example of FIG. 12, each of the neural networks 1258 includes three layers, although it should be appreciated that the neural networks 1258 may have other numbers of layers. FIG. 12 highlights three different layers for each neural network 1258, an input layer 1260, an intermediate layer 1262, and an output layer 1266. The input layers 1260 may be configured to receive one or more audio signals 1232 (which may correspond, e.g., to the one or more audio signals 1032*a* and/or 1132*a*). (While the neural network 1285 is illustrated as receiving audio signals 1232, as described above, the neural network 1285 may actually receive pre-processed versions of the audio signals 1232. For simplicity, such pre-processing is not illustrated.) The output layers 1266 may be configured to output one or more neural network products 1234 (which may correspond, e.g., to the one or more neural network products 1034*a* and/or 1134*a*). FIG. 12 specifically illustrates that one of the one or neural network products 1234 is a mask 1272 (where the mask 1272*a* may be an example of the neural network products 1034*a* and/or 1134*a* and the mask 1272*b* may be an example of the neural network products 1034*b* and/or 1134*b*).

FIG. 12 further illustrates operation of the neural networks 1258*a* and 1258*b* on two frames of audio data (from which the one or more audio signals 1232*a* and 1232*b*) are generated. One frame is referred to as Frame n and a subsequent (but not necessarily directly subsequent) frame is referred to as Frame n+M (where M is greater than or equal to 1). As illustrated, the masks 1272*a* and 1272*b* may, in some embodiments, be combined (e.g., averaged) by combination circuitry 1282 (according to any of the manners described above, e.g., by mask application circuitry 928*a* as described with reference to FIG. 9) and applied to audio signals, thereby generating enhanced audio signals. Furthermore, the mask 1272*a* generated by the neural network 1258*a* when processing Frame n of audio data is input to the input layer 1260*b* of the neural network 1258*b* when it is processing Frame n+M of audio data. The mask 1272*b* generated by the neural network 1258*b* when processing Frame n of audio data is input to the input layer 1260*a* of the neural network 1258*a* when it is processing Frame n+M of audio data. Combining the masks 1272*a* and 1272*b* may be helpful for ensuring binaural consistency. Additionally, inputting the mask 1272*a* to the neural network 1258*b* and inputting the mask 1272*b* to the neural network 1258*a* may be helpful in providing each neural network 1258 with information from the other ear-worn device as input, which may improve performance as described above.

It should be appreciated that sharing and combining the masks 1272*a* and 1272*b* introduces some delay (e.g., due to wireless transmission) in generating and playing the output. In scenarios in which such delay is not tolerable, mask combination might not be performed. Thus, one ear-worn device might not wait for the current mask 1272 from the other ear-worn device before generating its output. The ear-worn device might just use whatever is the last mask 1272 it received from the other ear-worn device (i.e., a stale mask, e.g., where the masks are generated at least 2-20 milliseconds apart) as input to its neural network 1258. Such embodiments might not guarantee binaural consistency, but may produce sufficient binaural consistency as masks 1272 might not change too fast.

Figure 13:
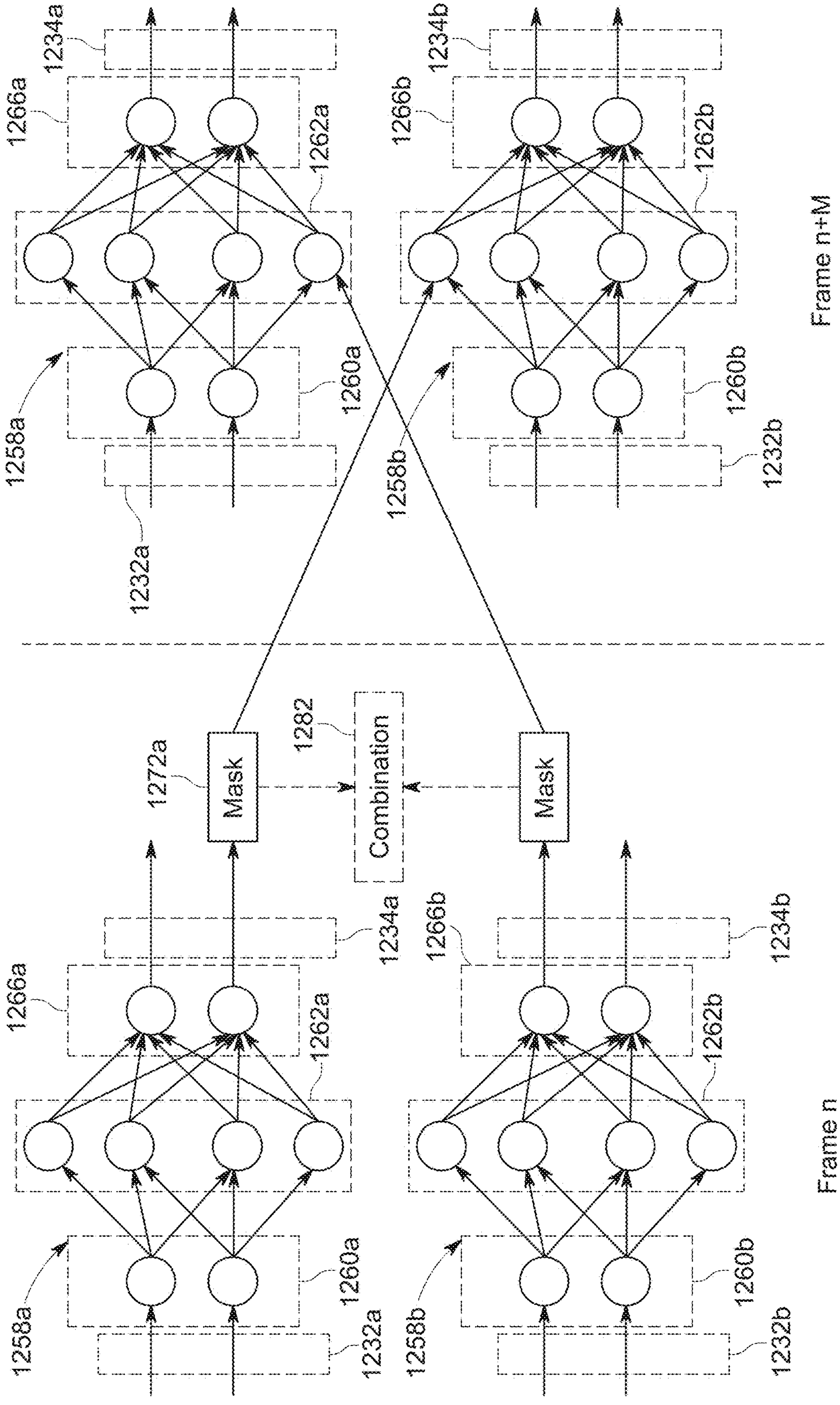
FIG. 13 illustrates an example of neural network layers using neural network products from other ear-worn devices, in accordance with certain embodiments described herein.

FIG. 13 illustrates an example of neural network layers using neural network products from other ear-worn devices, in accordance with certain embodiments described herein.

The above description of FIG. 12 applies to FIG. 13, except that the mask 1272*a* generated by the neural network 1258*a* when processing Frame n of audio data is input to an intermediate layer 1262*b* of the neural network 1258*b* when it is processing Frame n+M of audio data. The mask 1272*b* generated by the neural network 1258*b* when processing Frame n of audio data is input to an intermediate layer 1262*a* of the neural network 1258*a* when it is processing Frame n+M of audio data.

Figure 14:
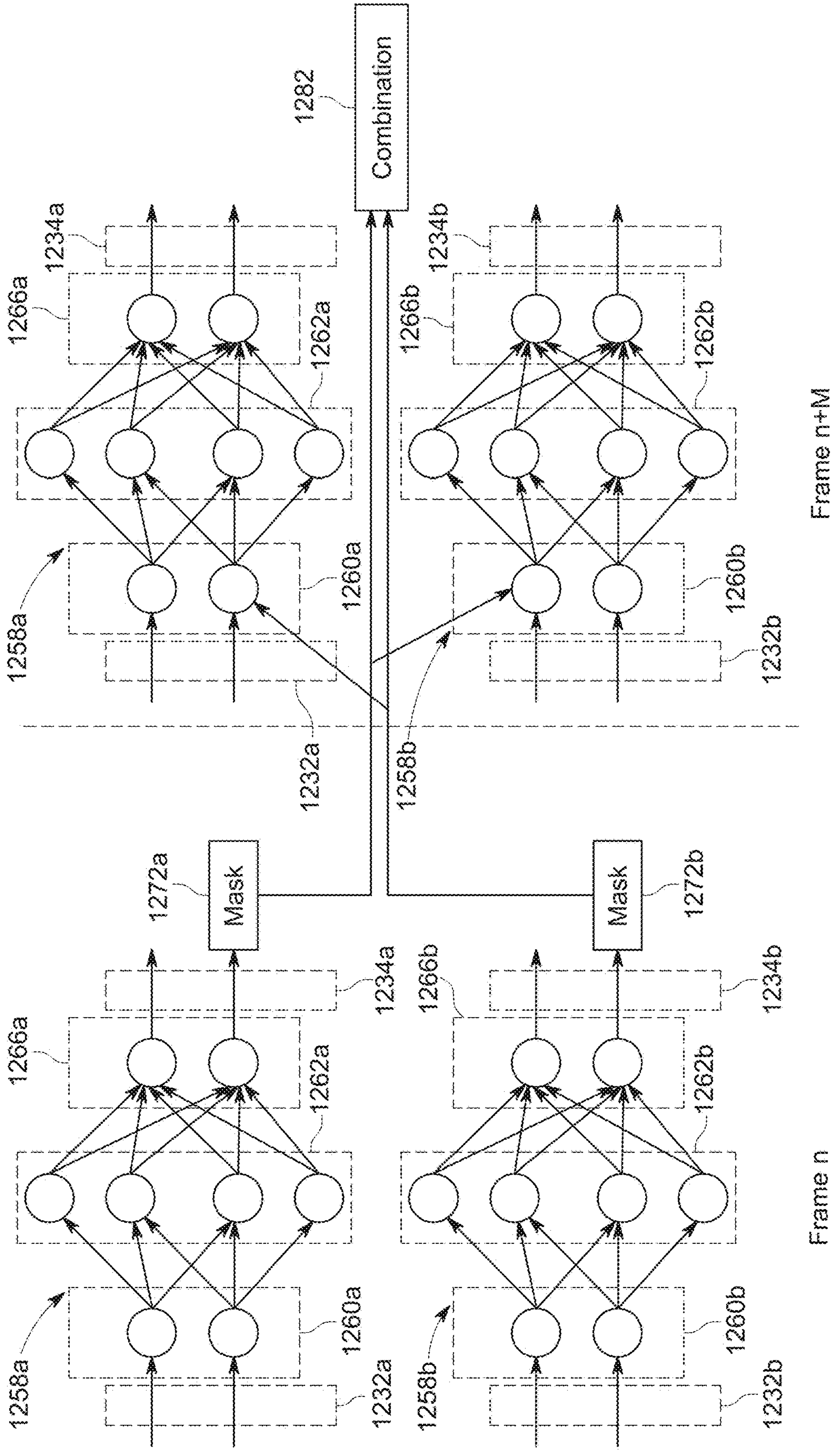
FIG. 14 illustrates an example of neural network layers using neural network products from other ear-worn devices, in accordance with certain embodiments described herein.

FIG. 14 illustrates an example of neural network layers using neural network products from other ear-worn devices, in accordance with certain embodiments described herein. The above description of FIG. 12 applies to FIG. 14, except that the masks 1272*a* and 1272*b* generated during processing of Frame n of audio data are combined (e.g., averaged) by combination circuitry 1282 (according to any of the manners described above) and applied to audio signals when processing Frame n+M of audio data, thereby generating enhanced audio signals. In other words, stale masks (e.g., where the masks are generated at least 2-20 milliseconds apart) are combined. Thus, combination of masks from Frame n may be performed without impacting latency of the processing of Frame n. Additionally, the masks 1272*a* and 1272*b* are inputted to the input layers 1260*b* and 1260*a* of the neural networks 1258*b* and 1258*a*, respectively.

Figure 15:
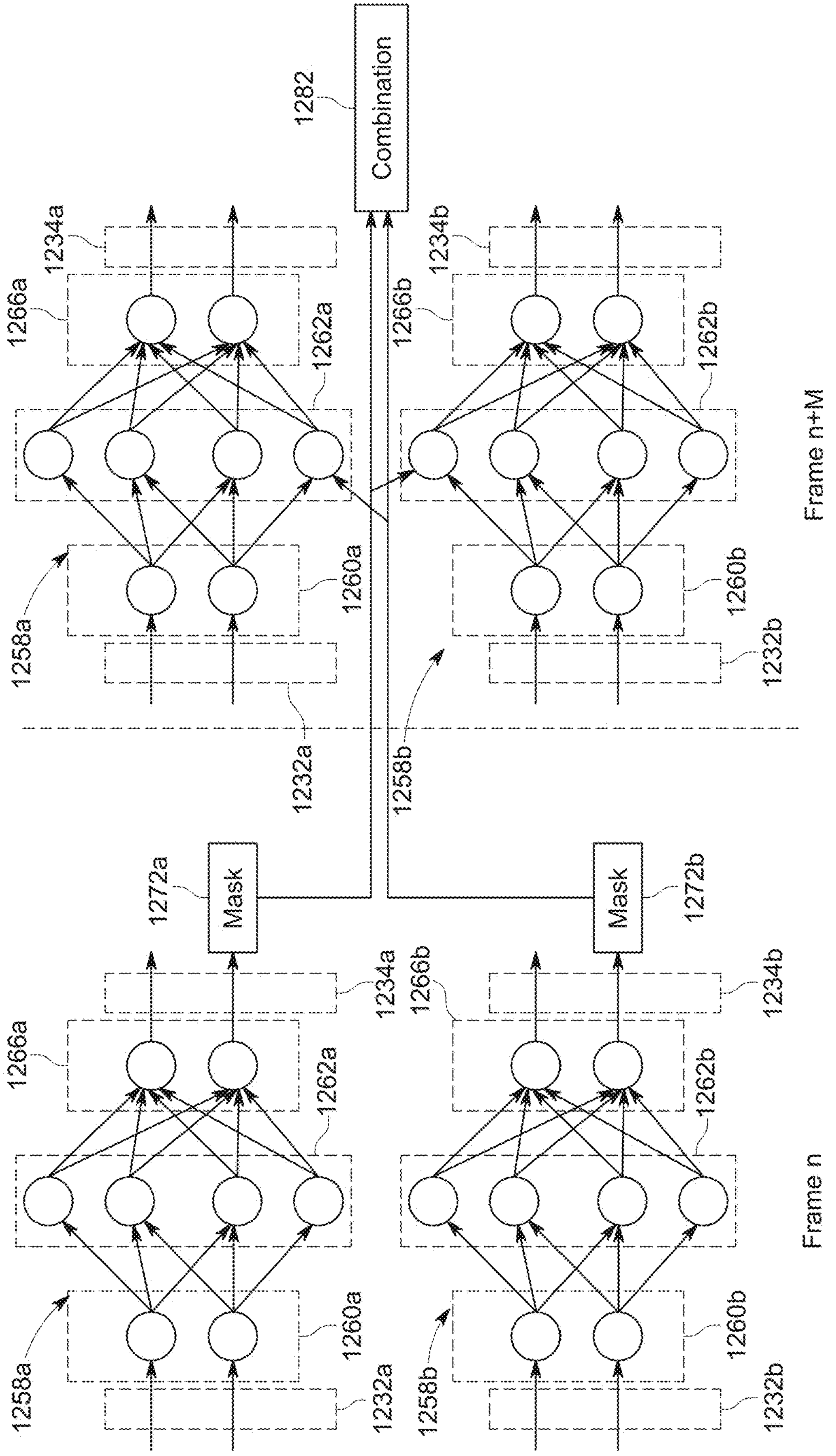
FIG. 15 illustrates an example of neural network layers using neural network products from other ear-worn devices, in accordance with certain embodiments described herein.

FIG. 15 illustrates an example of neural network layers using neural network products from other ear-worn devices, in accordance with certain embodiments described herein. The above description of FIG. 14 applies to FIG. 15, except that the masks 1272*a* and 1272*b* are inputted to intermediate layers 1262*b* and 1262*a* of the neural networks 1258*b* and 1258*a*, respectively.

The above description of FIGS. 9-15 has described sharing neural network products (e.g., the neural network products 934, 1034, 1134, which may be masks, and/or the masks 1272), and inputting them to one or more neural network layers, where the neural network products and masks may be used by circuitry downstream of the neural network circuitry (e.g., by mask application circuitry 928*a*, 1028*a*, and/or 1128*a*). Generally, any neural network products, even those which are not necessarily used by circuitry downstream of the neural network circuitry, may be shared and inputted to neural network layers, as described with reference to FIG. 16 below.

Figure 16:
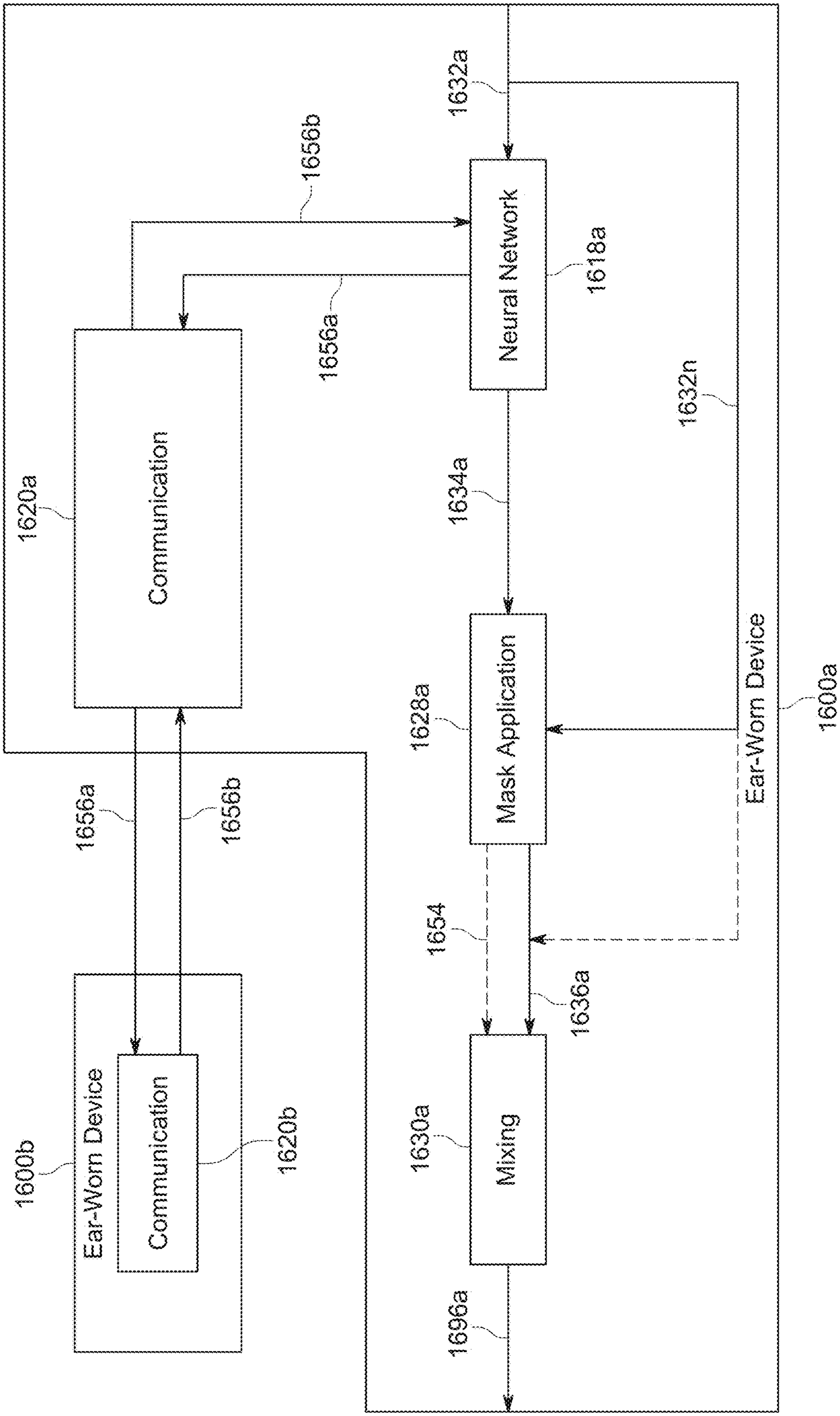
FIG. 16 illustrates a system of two ear-worn devices, in accordance with certain embodiments described herein.

FIG. 16 illustrates a system of two ear-worn devices 1600*a* (which may correspond to the ear-worn device 200*a* and/or 300*a*) and 1600*b* (which may correspond to the ear-worn device 200*b* and/or 300*b*), in accordance with certain embodiments described herein. The ear-worn device 1600*a* may, for example, be worn on the right ear of a wearer, and the ear-worn device 1600*b* may, for example, be worn on the left ear of a wearer. Thus, the ear-worn devices 1600*a* and 1600*b* may each be part of a pair. FIG. 16 further illustrates circuitry in the ear-worn device 1600*a*. It should be appreciated that the circuitry and functionality described and illustrated for the ear-worn device 1600*a* may be replicated in the ear-worn device 1600*b*, but might not be explicitly illustrated or described for simplicity. It should also be appreciated that the ear-worn device 1600*a* may include more circuitry and components than shown and such circuitry and components may be disposed before, after, or between certain of the circuitry and components illustrated in FIG. 16.

The circuitry in the ear-worn device 1600*a* includes neural network circuitry 1618*a* (which may correspond to the neural network circuitry 218*a*, 318*a*, and/or 518), mask application circuitry 1628*a* (which may correspond to the mask application circuitry 528), mixing circuitry 1630*a* (which may correspond to the mixing circuitry 530), and communication circuitry 1620*a* (which may correspond to the communication circuitry 220*a* and/or 320*a*). The ear-worn device 1600*b* includes communication circuitry 1620*b* (which may correspond to the communication circuitry 220*b* and/or 320*b*). The neural network circuitry 1618*a*, the mask application circuitry 1628*a*, and the mixing circuitry 1630*a* may be part of audio enhancement circuitry (e.g., the audio enhancement circuitry 316*a* and/or 516), and the audio enhancement circuitry may be part of processing circuitry (e.g., the processing circuitry 214*a* and/or 314*a*). The mask application circuitry 1628*a* and the mixing circuitry 1630*a* may be part of post-processing circuitry (e.g., the post-processing circuitry 590 and/or 690).

The neural network circuitry 1618*a* of the ear-worn device 1600*a* may be configured to implement one or more neural network layers, and the one or more neural network layers may be configured to generate at least one neural network product 1656*a* (where the at least one neural network product 1656 need not necessarily be used by circuitry downstream of the neural network circuitry 1618*a*). The neural network circuitry (e.g., the neural network circuitry 218*b*) of the ear-worn device 1600*b* may be configured to implement one or more neural network layers (which may be the same as or different from the one or more neural network layers implemented by the neural network circuitry 1618*a* of the ear-worn device 1600*a*), and the one or more neural network layers may be configured to generate at least one neural network product 1656*b*. In the ear-worn device 1600*a*, the communication circuitry 1620*a* may be configured to receive the at least one neural network product 1656*a* from the neural network circuitry 1618*a*. The communication circuitry 1620*a* may be configured to transmit the at least one neural network product 1656*a* to the communication circuitry 1620*b* of the ear-worn device 1600*b*. The at least one neural network product 1656*a* may be an example of the shared data 238*a*. As further illustrated in FIG. 16, the communication circuitry 1620*a* may be configured to receive at least one or more neural network product 1656*b* from the communication circuitry 1620*b* of the ear-worn device 1600*b*. The at least one neural network product 1656*b* may be an example of the shared data 238*b*. The neural network circuitry 1618*a* of the ear-worn device 1600*a* may be configured to input the at least one neural network product 1656*b* received from the ear-worn device 1600*b* (in some embodiments, along with the at least one neural network product 1656*a*) to at least one of the one or more neural network layers implemented by the neural network circuitry 1618*a*. Further examples may be found with reference to FIG. 17.

Figure 17:
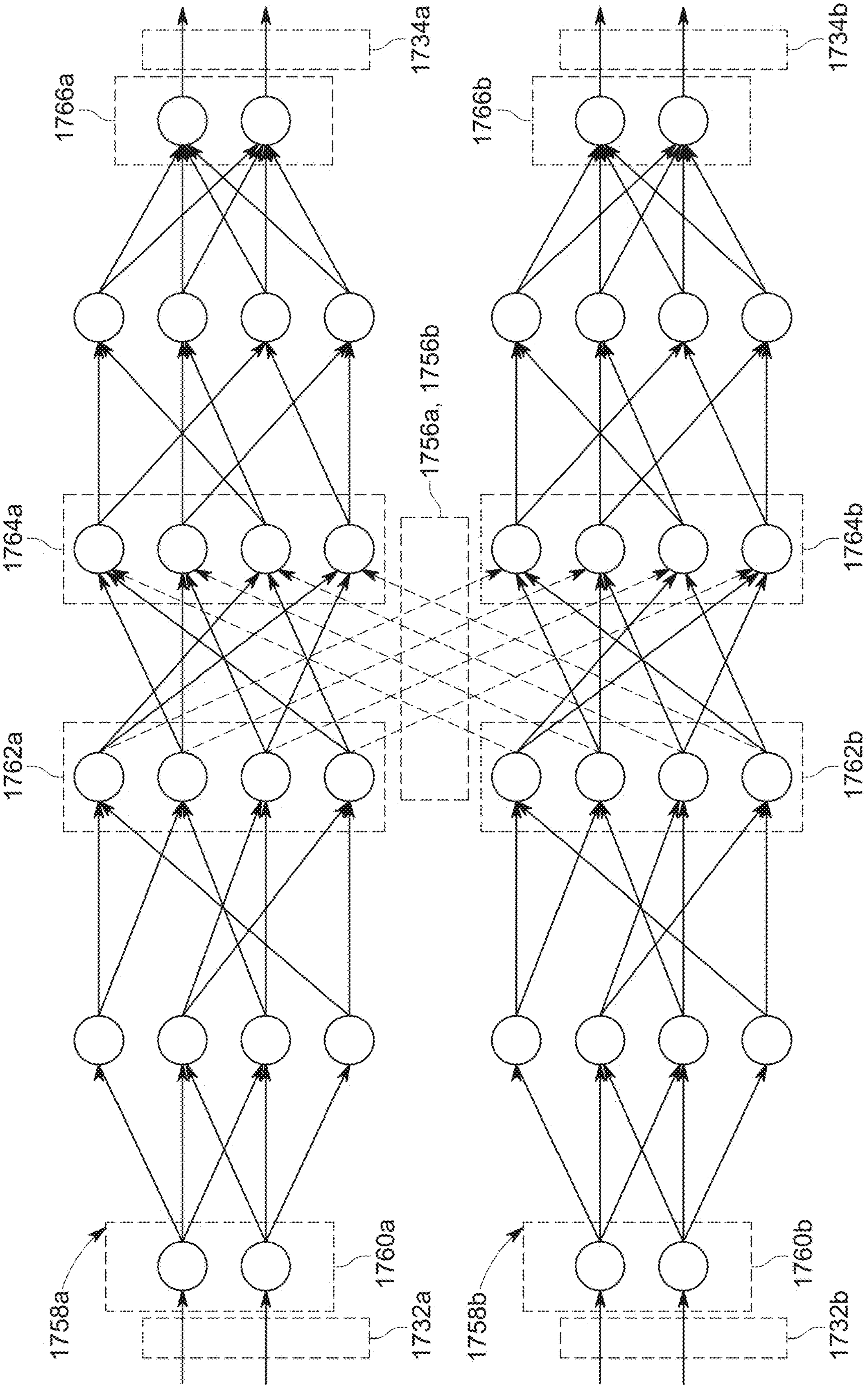
FIG. 17 illustrates an example of neural network layers using neural network products from other ear-worn devices, in accordance with certain embodiments described herein.

FIG. 17 illustrates an example of neural network layers using neural network products from other ear-worn devices, in accordance with certain embodiments described herein. FIG. 17 illustrates a neural network 1758*a* (which may generally be one or more neural network layers) and a neural network 1758*b* (which may also generally be one or more neural network layers). The neural network 1758*a* may be implemented by neural network circuitry in one ear-worn device (e.g., the neural network circuitry 1618*a* of the ear-worn device 1600*a*) and the neural network 1758*b* may be implemented by neural network circuitry in another ear-worn device (e.g., the neural network circuitry of the ear-worn device 1600*b*).

In the example of FIG. 17, each of the neural networks 1758 includes six layers, although it should be appreciated that the neural networks 1758 may have other numbers of layers. FIG. 17 highlights four different layers for each neural network 1758, an input layer 1760, an intermediate layer 1762, an intermediate layer 1764, and an output layer 1766. (It should be appreciated that each of the neural networks 1758 includes four intermediate layers, namely, those layers that are not the input layer 1760 nor the output layer 1766.) The input layers 1760 may be configured to receive the one or more audio signals 1732 (e.g., which may correspond to the one or more audio signals 1632) or processed versions thereof (e.g., after pre-processing, as described above, but which is not illustrated for simplicity). The output layers 1766 may be configured to output the one or more neural network products 1734 (e.g., which may correspond to the one or more neural network products 1634).

The intermediate layer 1762*a* of the neural network 1758*a* may be configured to generate the neural network products 1756*a* (or more generally, at least one neural network product 1756*a*, and which may correspond to the neural network products 1656*a*) and output the neural network products 1756*a* to the subsequent layer, the intermediate layer 1764*a*, of the neural network 1758*a*, as well as to the intermediate layer 1764*b* of the neural network 1758*b*. The intermediate layer 1762*b* of the neural network 1758*b* may be configured to generate the neural network products 1756*b* (or more generally, at least one neural network product 1756*b*, and which may correspond to the neural network products 1656*b*) and output the neural network products 1756*b* to the subsequent layer, the intermediate layer 1764*b*, of the neural network 1758*b*, as well as to the intermediate layer 1764*a* of the neural network 1758*a*. In other words, the intermediate layer 1764*a* of the neural network 1758*a* may be configured to receive as inputs both the neural network products 1756*a* from the intermediate layer 1762*a* of the neural network 1758*a*, as well as the neural network products 1756*b* from the intermediate layer 1762*b* of the neural network 1758*b*. The intermediate layer 1764*b* of the neural network 1758*b* may be configured to receive as inputs both the neural network products 1756*b* from the intermediate layer 1762*b* of the neural network 1758*b*, as well as the neural network products 1756*a* from the intermediate layer 1762*a* of the neural network 1758*a*. It should be appreciated that, as illustrated in FIG. 16, the ear-worn device (e.g., the ear-worn device 1600*a*) running the neural network 1758*a* may be configured to receive the neural network products 1756*b* from another ear-worn device (e.g., the ear-worn device 1600*b*) using communication circuitry (e.g., the communication circuitry 1620*a*). The ear-worn device (e.g., the ear-worn device 1600*b*) running the neural network 1758*b* may be configured to receive the neural network products 1756*a* from another ear-worn device (e.g., the ear-worn device 1600*a*) using communication circuitry (e.g., the communication circuitry 1620*b*). Generally, a neural network product 1756 may be the product of any layer of a neural network 1758 (e.g., the input layer 1760, the output layer 1766, or any of the intermediate layers). In some embodiments (e.g., FIG. 17), the neural network products 1756*b* may be products of the nth layer of the neural network 1758*b*, and the (n+1)th layer of the neural network 1758*a* may be configured to receive the neural network products 1756*b* as inputs (along with the neural network products 1756*a* generated by the nth layer of the neural network 1758*a*). In other words, the neural network circuitry implementing the neural network 1758*a* may be configured to input the neural network products 1756*b* generated by the nth layer of the neural network 1758*b* to the (n+1)th layer of the neural network 1758*a*. Generally, the neural network products 1756*a* and 1756*b* may be each produced by any layer of their respective neural networks 1758*a* and 1758*b* and inputted to any layer of each neural network 1758*a* and 1758*b*.

The neural network products 1756*b* may represent information about the one or more audio signals 1732*b* and how the neural network 1758*b* is processing them. When the neural network 1758*a* receives the neural network products 1756*b*, the neural network 1758*a* may gain access to this information. The neural network products 1756*a* may represent information about the audio signals 1732*a* and how the neural network 1758*a* is processing them. When the neural network 1758*b* receives the neural network products 1756*a*, the neural network 1758*a* may gain access to this information. The neural networks 1758*a* and 1758*b* may each be trained to use the information from the other neural network to cause their respective neural network products 1734*a* and 1734*b* to converge. In this manner, binaural inconsistencies may be reduced or removed.

The description above with reference to FIG. 9 described mask averaging (i.e., averaging a mask generated by one ear-worn device with a mask generated by another ear-worn device) as one method for reducing or removing binaural inconsistencies. In some cases, averaging masks with significant delays (e.g., a first mask averaged with a second mask that was generated more than a certain amount of time, such as 10 milliseconds, before the first mask was generated) could result in artifacts being introduced in the audio signal produced using the averaged masks. While certain types of wireless communication such as NFMI may be able to transfer a mask from one ear-worn device to another with a small enough latency to avoid such artifacts, other types of wireless communication such as Bluetooth may not. From another perspective, it may be possible to delay the operation of the receiving ear-worn device while the data from the other ear-worn device is transmitted to it, such that the masks that are combined do not have significant delays; but, this may introduce undesirable latency into the system.

However, a neural network receiving (e.g., using Bluetooth) a neural network product (e.g., the neural network products 1034, 1656, and/or 1756) from another neural network that was generated a significant amount of time ago (e.g., 10-25 milliseconds ago, or more generally, 2-25 milliseconds ago) may be able to use the neural network product (as described with reference to FIGS. 10-17) without introducing artifacts. In other words, due to latency in transferring a mask from one ear-worn device to another, two neural network products from different ear-worn devices that are inputted to the same layer of a neural network may not have been generated at the same time. In some embodiments, the two neural network products may be generated within 10 milliseconds of each other. In some embodiments, the two neural network products may be generated within 5 milliseconds of each other. In some embodiments, the two neural network products may be generated within 3 milliseconds of each other. In some embodiments, the two neural network products may be generated within 2 milliseconds of each other. In some embodiments, the wireless communication link between the ear-worn devices may be an NFMI communication link. However, in some embodiments, a layer of a neural network may receive neural network products generated a significant time apart without introducing artifacts. Thus, in some embodiments, the two neural network products may be generated within 10-25 milliseconds of each other. Accordingly, in some embodiments, the wireless communication link between the ear-worn devices may be a Bluetooth communication link (which may involve longer latencies than NFMI).

Generally, a system may include a first ear-worn device (e.g., the ear-worn device 900*a*, 1000*a*, 1100*a*, and/or 1600*a*) including first neural network circuitry (e.g., the neural network circuitry 918*a*, 1018*a*, 1118*a*, and/or 1618*a*) and first communication circuitry (e.g., the communication circuitry 920*a*, 1020*a*, 1120*a*, and/or 1620*a*), and a second ear-worn device (e.g., the ear-worn device 900*b*, 1000*b*, 1120*b*, and/or 1600*b*) including second neural network circuitry (e.g., the neural network circuitry 218*b*) and second communication circuitry (e.g., the communication circuitry 920*b*, 1020*b*, 1120*b*, and/or 1620*b*). The first communication circuitry and the second communication circuitry may be configured to communicate over a wireless communication link (e.g., the wireless communication link 222 and/or 322). The first neural network circuitry may be configured to receive one or more first audio signals (e.g., the one or more audio signals 932*a*, 1032*a*, 1132*a*, 1232*a*, 1632*a*, and/or 1732*a*) generated by the first ear-worn device, and implement one or more first neural network layers (e.g., the layers of the neural networks 1258*a* and/or 1758*a*), where the first neural network circuitry may be configured to use the one or more first neural network layers to generate a first neural network product (e.g., the neural network products 934*a*, 1034*a*, 1134*a*, 1656*a*, 1756*a*, and/or the mask 1272*a*) based on the one or more first audio signals. The second neural network circuitry may be configured to receive one or more second audio signals (e.g., the one or more audio signals 1232*b* and/or 1732*b*) generated by the second ear-worn device, and implement one or more second neural network layers (e.g., the layers of the neural networks 1258*b* and/or 1758*b*), where the second neural network circuitry may be configured to use the one or more second neural network layers to generate a second neural network product (e.g., the neural network products 934*b*, 1034*b*, 1134*b*, 1656*b*, 1756*b*, and/or the mask 1272*b*) based on the one or more second audio signals. The first communication circuitry may be configured to transmit, to the second communication circuitry over the wireless communication link, first data that is or originates from the first neural network product. Furthermore, the first communication circuitry may be configured to receive, from the second communication circuitry over the wireless communication link, second data that is or originates from the second neural network product. Further description may be found above with reference to FIGS. 9-17.

In more detail, in some embodiments, the first communication circuitry may be configured to transmit the first neural network product itself (e.g., a mask) to the second ear-worn device and receive the second neural network product itself from the second ear-worn device. However, in some embodiments, what is transmitted may be different from what is generated by the neural network layers. In particular, what is transmitted (e.g., the second data) may originate from the neural network product (e.g., the second neural network product). For example, the neural network product (e.g., a mask) may be processed prior to transmission, and the processed version of the neural network product (i.e., what is transmitted) may be smaller in size than the neural network product itself. In some embodiments, the processed version of the neural network product may contain just portions of the neural network product below a threshold frequency. In some embodiments, the processed version of the neural network product may contain just portions of the neural network product above a threshold frequency. In some embodiments, the processed version of the neural network product may contain every other frequency, or every third frequency, or generally every n frequency, of the neural network product. In some embodiments, interpolation may be performed between the shared frequencies in order to generate the full neural network product. Generally, in some embodiments, the processed version of the neural network product (i.e., the version that is transmitted to the other ear-worn device) may include some but not all frequencies of the neural network product.

In some embodiments, the one or more second neural network layers of the second ear-worn device may be configured to generate the second neural network product such that the second neural network product is an encoded version of certain data (e.g., an encoded version of the second mask). For example, the one or more second neural network layers may include a dense layer trained to reduce the second mask in size, and the second neural network product may be the reduced-sized (i.e., encoded) version of the second mask. The encoding performed by the one or more second neural network layers may also be considered compression. This encoding may be different than the processing described above that includes retaining some but not all frequencies. This second neural network product (i.e., the encoded mask) may be the same as the second data that is transmitted.

Thus, in some embodiments, the first data may be a first mask and the second data may be a second mask, while in other embodiments, the first data may be a processed version of the first mask and the second data may be a processed version of the second mask. As described above, one example of a processed version of a mask may be some but not all frequencies of the mask (e.g., every n frequencies), and another example of a processed version of a mask may be an encoded mask. As also described above, in some embodiments, the first ear-worn device may be configured to combine the first mask with the second mask, thereby generating a first combined mask. When the second data received by the first ear-worn device is the second mask itself, the first ear-worn device may be configured to simply combine the first mask with the second mask. When the second data received by the first ear-worn device is a processed version of the second mask, where the processed version of the second mask includes some but not all frequencies of the second mask, in some embodiments the first ear-worn device may be configured to generate the second mask from the second data, for example by using interpolation, prior to the averaging. When the second data received by the first ear-worn device is a processed version of the second mask, where the processed version of the second mask includes an encoded version of the second mask, in some embodiments the first ear-worn device may be configured to generate the second mask from the second data, for example by using decoding. The decoding may include using one or more neural network layers, for example, a dense layer included in the one or more first neural network layers of the first ear-worn device.

As described above, an ear-worn device may be configured to input a neural network product to one or more neural network layers. Thus, following the example above, in some embodiments the first neural network circuitry of the first ear-worn device may be configured to input the second data or a processed version thereof to at least one of the one or more first neural network layers. When the second data is the second neural network product (e.g., a mask) itself, in some embodiments the first neural network circuitry may be configured to input the second neural network product itself to at least one of the one or more first neural network layers. When the second data is a processed version of the second neural network including some but not all frequencies of the second neural network product, in some embodiments the first neural network circuitry may be configured to input the second data as is to at least one of the one or more first neural network layers. In some embodiments, the first neural network circuitry may be configured to generate the second neural network product from the second data using interpolation, and then input the second neural network product to at least one of the one or more first neural network layers. When the second data is an encoded version of the second neural network product, in some embodiments the first neural network circuitry may be configured to input the second data as is to at least one of the one or more first neural network layers, and the one or more first neural network layers (e.g., specifically, a dense layer) may be trained to decode the second data (e.g., to generate the second mask) prior to processing by the rest of the one or more first neural network layers. In other words, the first neural network circuitry may be configured to decode the second data using the one or more first neural network layers. It should be appreciated that decoding performed prior to averaging may be the same or different from the decoding performed during input of data to a neural network.

Figure 18:
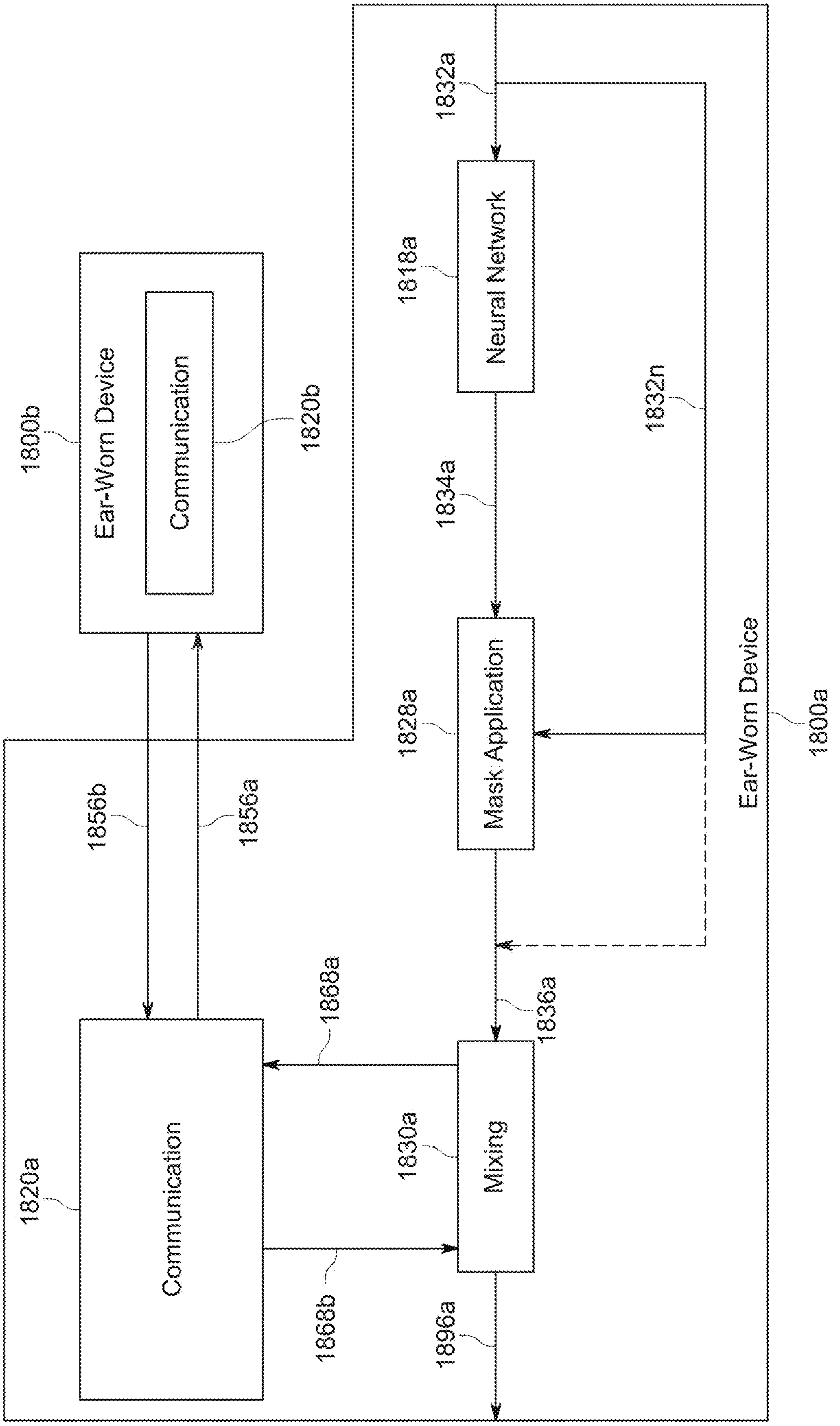
FIG. 18 illustrates a system of two ear-worn devices, in accordance with certain embodiments described herein.

FIG. 18 illustrates a system of two ear-worn devices 1800*a* (which may correspond to the ear-worn device 200*a* and/or 300*a*) and 1800*b* (which may correspond to the ear-worn device 200*b* and/or 300*b*), in accordance with certain embodiments described herein. The ear-worn device 1800*a* may, for example, be worn on the right ear of a wearer, and the ear-worn device 1800*b* may, for example, be worn on the left ear of a wearer. Thus, the ear-worn devices 1800*a* and 1800*b* may each be part of a pair. FIG. 18 further illustrates circuitry in the ear-worn device 1800*a*. It should be appreciated that the circuitry and functionality described and illustrated for the ear-worn device 1800*a* may be replicated in the ear-worn device 1800*b*, but might not be explicitly illustrated or described for simplicity. It should also be appreciated that the ear-worn device 1800*a* may include more circuitry and components than shown and such circuitry and components may be disposed before, after, or between certain of the circuitry and components illustrated in FIG. 18.

The circuitry in the ear-worn device 1800*a* includes neural network circuitry 1818*a* (which may correspond to the neural network circuitry 218*a*, 318*a*, 518), mask application circuitry 1828*a* (which may correspond to the mask application circuitry 528), mixing circuitry 1830*a* (which may correspond to the mixing circuitry 530), and communication circuitry 1820*a* (which may correspond to the communication circuitry 220*a* and/or 320*a*). The ear-worn device 1800*b* includes communication circuitry 1820*b* (which may correspond to the communication circuitry 220*b* and/or 320*b*). The neural network circuitry 1818*a*, the mask application circuitry 1828*a*, and the mixing circuitry 1830*a* may be part of audio enhancement circuitry (e.g., the audio enhancement circuitry 316*a* and/or 516), and the audio enhancement circuitry may be part of processing circuitry (e.g., the processing circuitry 214*a* and/or 314*a*). The mask application circuitry 1828*a* and the mixing circuitry 1830*a* may be part of post-processing circuitry (e.g., the post-processing circuitry 590 and/or 690).

The ear-worn device 1800*a* (specifically, in the example of FIG. 18, the mixing circuitry 1830*a*) may be configured to calculate a value 1868*a* for a metric. In some embodiments, the metric may be an environmental metric (i.e., a metric related to the environment). For example, the metric may be a running average signal-to-noise ratio (SNR). The ear-worn device 1800*a* may be configured to calculate the running average of SNR using the speech signal and noise signal generated by the mask application circuitry 1828*a*. The communication circuitry 1820*a* may be configured to receive the metric value 1868*a*. The communication circuitry 1820*a* may be configured to transmit the metric value 1868*a* to the communication circuitry 1820*b* of the ear-worn device 1800*b* over a wireless communication link (e.g., the wireless communication link 222 and/or 322) and receive a metric value 1868*b* (i.e., a value calculated for the same metric) from the communication circuitry 1820*b* of the ear-worn device 1800*b* over the wireless communication link. The metric value 1868*a* may be an example of the shared data 238*a* and the metric value 1868*b* may be an example of the shared data 238*b*. While FIG. 18 illustrates the mixing circuitry 1830*a* calculating the metric value 1868*a*, in some embodiments other circuitry in the ear-worn device 1800*a* may be configured to calculate the metric value 1868*a*.

The mixing circuitry 1830*a* may be configured to mix the at least two audio signals 1836*a* based, at least in part, on the metric value 1868*b* from the ear-worn device 1800*b*. In some embodiments, the mixing circuitry 1830*a* may be configured to modulate weighting of the at least two audio signals 1836*a* based, at least in part, on the metric value 1868*b* from the ear-worn device 1800*b*. In some embodiments, the metric may be a running average of signal-to-noise ratio (SNR). Thus, the metric value 1868*a* may be an SNR value at the ear-worn device 1800*a* and the metric value 1868*b* may be an SNR value at the ear-worn device 1800*b*. In such embodiments, the mixing circuitry 1830*a* may be configured to mix the at least two audio signals 1836*a* based, at least in part, on a lower of the SNR value at the ear-worn device 1800*a* (i.e., the metric value 1868*a*) and the SNR value at the ear-worn device 1800*b* (i.e., the metric value 1868*b*). In other words, the mixing circuitry 1830*a* may be configured to mix the at least two audio signals 1836*a* based, at least in part, on the lower (worse) of the SNRs. In some embodiments, the mixing circuitry 1830*a* may be configured to include a higher amplitude of noise in the output audio signal 1840*a* when the lower of the SNR values has decreased. For example, if the mixing circuitry 1830*a* is configured to mix a speech component of the audio signal 1832*n* ("Speech") with a noise component of the audio signal 1832*n* ("Noise") according to the formula Speech+x*Noise, the mixing circuitry 1830*a* may be configured to increase x when the lower of the SNRs decreases (i.e., becomes worse). In other words, as the lower of the SNRs decreases, the noise reduction may become less aggressive. In the example of FIG. 18, the metric value 1868*b* is input to the mixing circuitry 1830*a*. In some embodiments, other circuitry may be configured to receive the metric value 1868*b* and control the mixing circuitry 1830*a* based, at least in part, on the metric value 1868*b*.

In some embodiments, each ear-worn device may be configured to receive new shared data 238 from the other ear-worn device whenever the new shared data 238 has been generated. In some embodiments, each ear-worn device may be configured to receive new shared data 238 from the other ear-worn device periodically. When the shared data 238 is input to a neural network (e.g., as in FIGS. 10-17), in some embodiments, the neural network running on each ear-worn device may be trained with shared data 238 having varying amounts of latency to account for varying amounts of latency that may be encountered in actual data transmission from one ear-worn device to another.

The above description has described various types of binaural data sharing in neural network-based ear-worn devices. In some embodiments, ear-worn devices may employ multiple types of binaural data sharing. As a specific example, in some embodiments, ear-worn devices may share processed microphone signals (as described with reference to FIG. 7) and neural network products (e.g., as described with reference to FIGS. 9, 10, 11, and 16, where in some embodiments the neural network products may be masks). As another specific example, in some embodiments, ear-worn devices may share beamformed audio signals (as described with reference to FIG. 8) and neural network products (e.g., as described with reference to FIGS. 9, 10, 11, and 16, where in some embodiments the neural network products may be masks).

However, it may be more efficient (e.g., in terms of power and/or latency) to only employ one type of binaural data sharing, or in other words, to only transmit data between the ear-worn devices once over the course of the data processing path. As described above, for the goal of reducing binaural inconsistencies, it may be helpful for each ear-worn device to use the same mask. In some embodiments, this may be accomplished by sharing and combining masks (as described with reference to FIG. 9). In some embodiments, this may be accomplished by sharing data upstream of the neural network (e.g., sharing processed microphone signals as described with reference to FIG. 7, or sharing beamformed audio signals as described with reference to FIG. 8) such that the neural network circuitry on each ear-worn device receives the same inputs, and ensuring that the neural network circuitry on each ear-worn device is configured to generate the same output based on the same inputs, as described further below.

Consider an example in which a left ear-worn device (i.e., worn on the left ear) generates two processed microphone signals (e.g., any of the processed microphone signals described herein) from two microphones, and multiple audio signals (to be input to a neural network, and which may be beamformed and have different directional patterns) are formed from those two processed microphone signals. The processed microphone signals will be referred to as left processed microphone signals and the audio signals to be input to the neural network will be referred to simply as left audio signals. Furthermore, consider that a right ear-worn device (i.e., worn on the right ear) generates two processed microphone signals from two microphones, and multiple audio signals (to be input to a neural network, and which may be beamformed and have different directional patterns) are formed from those two processed microphone signals. The processed microphone signals will be referred to as right processed microphone signals and the audio signals to be input to the neural network will be referred to simply as right audio signals. In some embodiments, the left ear-worn device may be configured to generate the left audio signals and transmit them to the right ear-worn device, and the right ear-worn device may be configured to generate the right audio signals and transmit them to the left ear-worn device. In some embodiments, the left ear-worn device may be configured to transmit the left processed microphone signals to the right ear-worn device and the right ear-worn device may be configured to transmit the right processed microphone signals to the left ear-worn device. Each ear-worn device may then be configured to generate both the left audio signals and the right audio signals. Broadly, the right audio signals and the left audio signals may be right inputs and left inputs, respectively, where the inputs may be audio signals or other types of data, such as neural network products.

Generally, a system may include a first ear-worn device (e.g., the ear-worn devices 700*a*, 800*a*, 1000*a*, 1100*a*, 1600*a*, and/or 1800*a*) and a second ear-worn device (e.g., the ear-worn devices 700*b*, 800*b*, 1000*b*, 1100*b*, 1600*b*, and/or 1800*b*). In some embodiments, the first ear-worn device may include one or more first microphones (e.g., the one or more microphones 210*a*), first processing circuitry (e.g., the processing circuitry 214*a* and/or 314*a*) including first neural network circuitry (e.g., the neural network circuitry 218*a*, 318*a*, 518, 918*a*, 1018*a*, 1118*a*, 1618*a*, and/or 1818*a*) and first communication circuitry (e.g., the communication circuitry 220*a*, 320*a*, 720*a*, 820*a*, 920*a*, 1020*a*, 1120*a*, 1620*a*, and/or 1820*a*). The second ear-worn device may include one or more second microphones (e.g., the one or more microphones 210*b*), second processing circuitry (e.g., the processing circuitry 214*b*) comprising second neural network circuitry (e.g., the neural network circuitry 218*b*), and second communication circuitry (e.g., the communication circuitry 220*b* 320*b*, 720*b*, 820*b*, 920*b*, 1020*b*, 1120*b*, 1620*b*, and/or 1820*b*). The one or more first microphones may be configured to generate one or more first microphone signals (e.g., the one or more microphone signals 224*a* and/or 324*a*), the one or more second microphones may be configured to generate one or more second microphone signals (e.g., the one or more microphone signals 224*b*), the first processing circuitry may be configured to process the one or more first microphone signals, thereby generating first data, and the second processing circuitry may be configured to process the one or more second microphone signals, thereby generating second data. The first communication circuitry and the second communication circuitry may be configured to communicate over a wireless communication link (e.g., the wireless communication links 222 and/or 322). In some embodiments, the first communication circuitry may be configured to transmit the first data to the second communication circuitry over the wireless communication link and receive the second data from the second communication circuitry over the wireless communication link. The second communication circuitry may be configured to transmit the second data to the first communication circuitry over the wireless communication link and receive the first data from the first communication circuitry over the wireless communication link.

As one example, the first data may be beamformed audio signals (e.g., the one or more beamformed audio signals 886*a*, where each may have a different directional pattern) formed from microphone signals generated on the first ear-worn device, and the second data may be beamformed audio signals (e.g., the one or more beamformed audio signals 886*b*, where each may have a different directional pattern) formed from microphone signals generated on the second ear-worn device. As another example, the first data may be processed microphone signals (e.g., the one or more processed microphone signals 752*a*) generated on the first ear-worn device, and the second data may be processed microphone signals (e.g., the one or more processed microphone signals 752*b*) generated on the second ear-worn device. As another example, the first data may be neural network products (e.g., the one or more neural network products 934*a*, 1034*a*, 1134*a*, 1656*a*, 1756*a*, and/or the mask 1272*a*) generated on the first ear-worn device and the second data may be neural network products (e.g., the one or more neural network products 934*a*, 1034*a*, 1134*a*, 1656*a*, 1756*a*, and/or the mask 1272*a*) generated on the second ear-worn device.

The first neural network circuitry may be configured to implement one or more first neural network layers (e.g., the neural network layers 1258*a* and/or 1758*a*), where the one or more first neural network layers may be configured to receive inputs that are or that originate from the first data and the second data. The second neural network circuitry may be configured to implement one or more second neural network layers (e.g., the neural network layers 1258*b* and/or 1758*b*), where the one or more second neural network layers may be configured to receive the inputs (e.g., the same inputs received by the one or more first neural network layers that are or that originate from the first data and the second data. (An example of inputs to neural network layers are the audio signals 1932R and 1932L below. While that example uses audio signals as an example of inputs to neural network layers, it should be appreciated that the inputs may be any type of data, such as audio signals that have undergone pre-processing as described above.) In some embodiments, the first neural network layers may be trained to generate an audio-enhancing (e.g., noise-reducing and/or spatially-focusing) mask (or generally, a neural network product) based on the inputs. In some embodiments, the second neural network layers may be trained to generate the audio-enhancing mask (or generally, the same neural network product generated by the one or more first neural network layers) based on the inputs. For example, the first and second neural network layers may be trained to generate the same mask, or at least the same mask magnitude portion. For example, when the first and second data are processed microphone signals, the inputs originating from the first data and the second data may be beamformed audio signals formed from the processed microphone signals (i.e., each ear-worn device may perform the beamforming after receiving the transferred data), or processed versions thereof. As another example, when the first and second data are beamformed audio signals, the inputs may be the beamformed audio signals themselves, or processed versions thereof. (Thus, inputs "originating" from data may include the scenario in which the inputs and data are the same.) As another example, the inputs may be neural network products (e.g., masks). As described above, in some embodiments, the inputs may undergo further pre-processing (as described above) prior to being input to the neural network layers. In some embodiments, the one or more neural network layers implemented by the neural network circuitry on each ear-worn device may be the same.

In some embodiments, the one or more first neural network layers implemented by the first neural network circuitry and the one or more second neural network layers implemented by the second neural network circuitry of the second ear-worn device may be configured to receive the inputs with the same ordering of the inputs. When the one or more first neural network layers running on the first ear-worn device and the one or more second neural network layers running on the second ear-worn device are the same, based on the ordering of the inputs to the neural network layers being the same as well, the ear-worn devices may both be configured to generate the same mask, or at least the same mask magnitude portion (or generally, the same neural network product). Examples are provided with reference to FIG. 19-22. In the following examples, the inputs to the neural networks are audio signals and the outputs are masks, but it should be appreciated that the same ordering techniques may be applied when the inputs or outputs are of different types.

Figure 19:
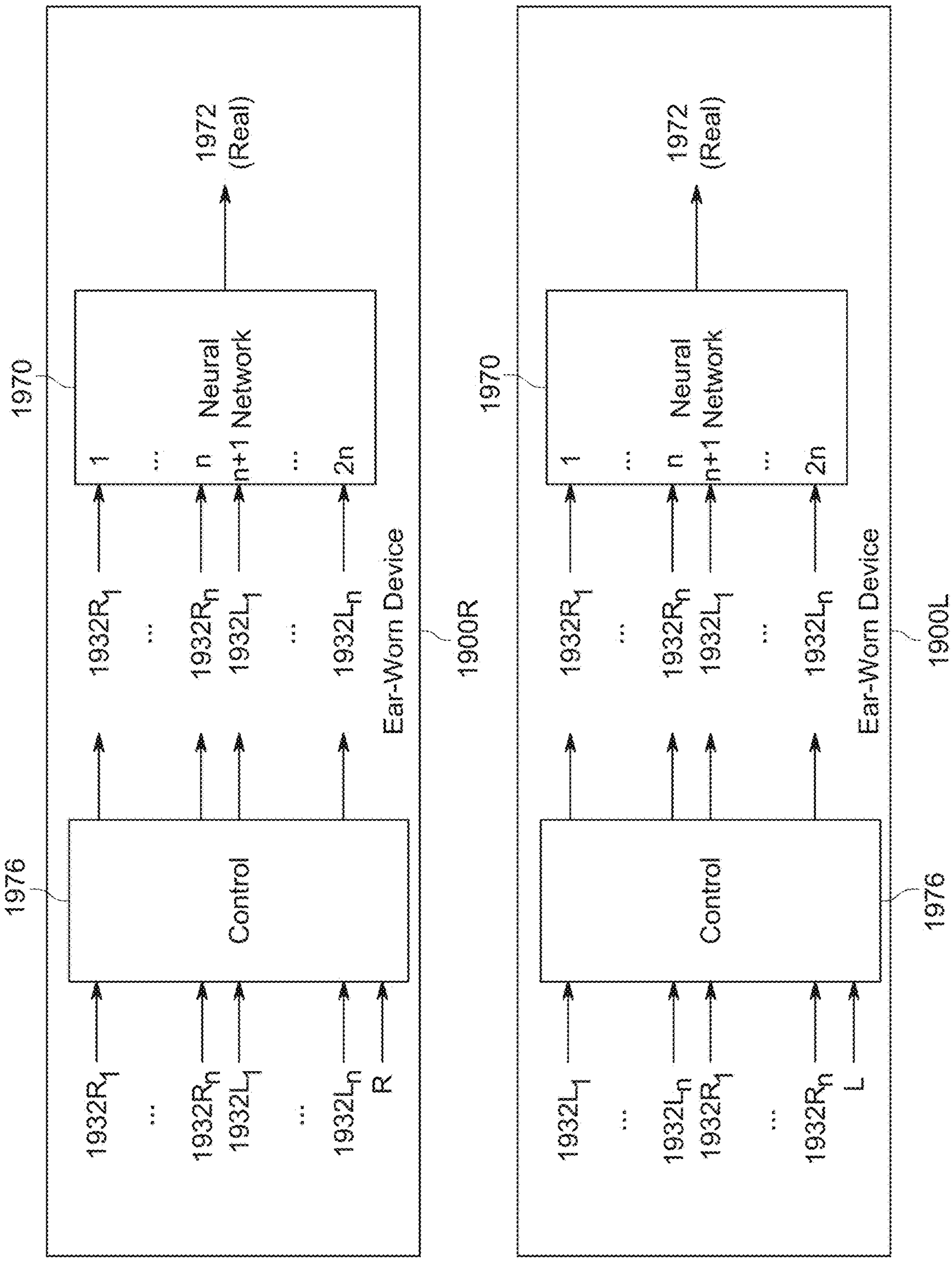
FIG. 19 illustrates a system of two ear-worn devices, in accordance with certain embodiments described herein.

FIG. 19 illustrates a system of two ear-worn devices 1900R and 1900L, in accordance with certain embodiments described herein. It should be appreciated that the ear-worn devices 1900R and 1900L may include more circuitry and components than shown and such circuitry and components may be disposed before, after, or between certain of the circuitry and components illustrated in FIG. 19. The ear-worn devices 1900R and 1900L may correspond to any of the ear-worn devices described herein. The ear-worn device 1900R may, for example, be worn on the right ear of a wearer, and the ear-worn device 1900L may, for example, be worn on the left ear of a wearer. Thus, the ear-worn devices 1900R and 1900L may each be part of a pair. FIG. 19 in particular illustrates an example of neural networks receiving left and right audio signals, in accordance with certain embodiments described herein. FIG. 19 illustrates a neural network 1970 running on a right ear-worn device 1900R and the neural network 1970 running on the left ear-worn device 1900L. The neural network 1970 may be implemented by neural network circuitry (e.g., any of the neural network circuitry described herein). Each of the ear-worn devices 1900R and 1900L includes control circuitry 1976 configured to receive the left and right audio signals 1932R and 1932L, as well as an input indicating whether the ear-worn device 1900 is the right one or the left one. Thus, the control circuitry 1976 on the right ear-worn device 1900R may receive an input "R" and the control circuitry 1976 on the left ear-worn device 1900L may receive an input "L." These inputs may be derived from indications programmed into each ear-worn device 1900, or received by each ear-worn device 1900 (e.g., from a processing device such as a smartphone over a wireless communication link) of whether it is a right ear-worn device or a left ear-worn device. (While the neural network 1970 is illustrated as receiving audio signals 1932, as described above, the neural network 1970 may actually receive pre-processed versions of the audio signals 1932. For simplicity, such pre-processing is not illustrated. The audio signals 1932R and 1932L may be examples of general "inputs" to neural networks, or to neural network layers.)

As is illustrated, the neural network 1970 may be configured to receive the left and right audio signals 1932R and 1932L respectively, as a vector. Generally, absent such indications, an ear-worn device 1900 may only know whether it itself generated given beamformed audio signals, or whether given beamformed audio signals were received from the other ear-worn device 1900. There might not be a mechanism to ensure that each of the ear-worn devices 1900R and 1900L input beamformed audio signals to the neural network 1970 in the same order (e.g., right audio signals before left audio signals, or vice versa). However, based on the right or left indications received by the control circuitry 1976, the control circuitry 1976 may be able and configured to arrange the right and left audio signals 1932R and 1932L, respectively, into a vector with the same order on both ear-worn devices 1900R and 1900L. In the example of FIG. 19, the right audio signals 1932R are ordered first in the vector and the left audio signals 1932L are ordered second in the vector, for both ear-worn devices 1900R and 1900L (but this is just one non-limiting example). Because the neural network 1970 on each ear-worn device 1900 may receive the beamformed audio signals 1932R and 1932L in the same order, and because the neural networks 1970 on each ear-worn device 1900 may be identical, the masks 1972 output by the neural networks 1970 on the right and left ear-worn devices 1900R and 1900L may be the same. In particular, the mask 1972 in FIG. 19 may be real and therefore only have a magnitude portion but not a phase portion. Because the masks 1972 as outputted by the right and left ear-worn devices 1900R and 1900L are the same, mask averaging to reduce binaural inconsistencies may not be needed, and only transmitting data upstream of the neural network (i.e., transmitting the processed microphone signals or the beamformed audio signals) between the ear-worn devices 1900 might be involved. This may conserve power and/or mitigate latency issues.

Generally, in some embodiments, a first ear-worn device and a second ear-worn device may be configured to order the inputs (in the example of FIG. 19, audio signals) to their neural networks with the same ordering based on different indications programmed into or received by the first and second ear-worn devices. For example, as described with reference to FIG. 19, the control circuitry 1976 in the ear-worn device 1900R may receive an indication "R" and the control circuitry 1976 in the ear-worn device 1900L may receive an indication "L," and based on these indications, the ear-worn devices 1900R and 1900L may order the audio signals 1932R and 1932L in the same order for input to the neural networks 1970 on each device. These indications "R" and "L" may, for example, be programmed into the ear-worn devices 1900R and 1900L, respectively, or received by the ear-worn devices 1900R and 1900L, respectively (e.g., from a processing device such as a smartphone over a wireless communication link).

Figure 20:
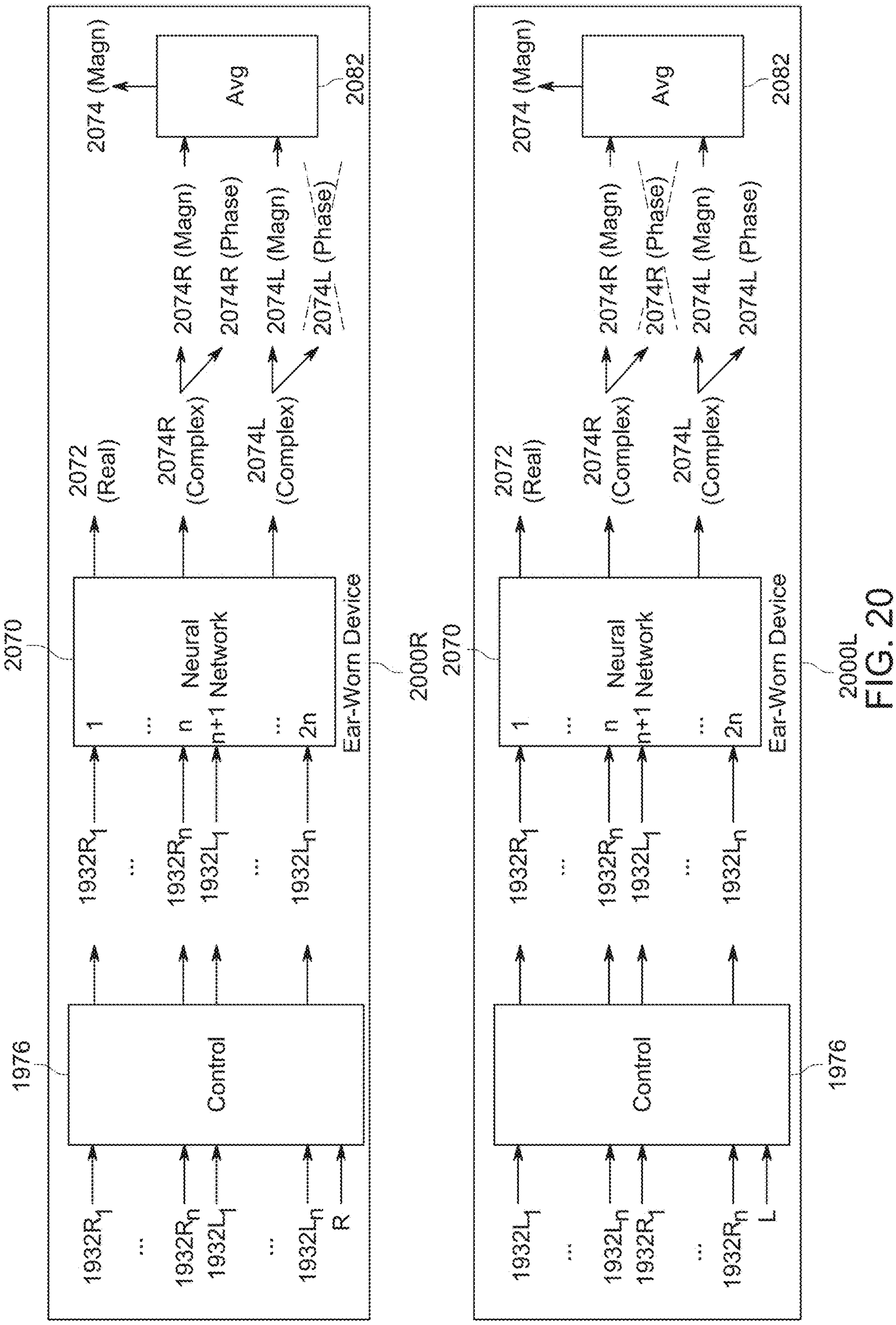
FIG. 20 illustrates a system of two ear-worn devices, in accordance with certain embodiments described herein.

FIG. 20 illustrates a system of two ear-worn devices 2000R and 2000L, in accordance with certain embodiments described herein. It should be appreciated that the ear-worn devices 2000R and 2000L may include more circuitry and components than shown and such circuitry and components may be disposed before, after, or between certain of the circuitry and components illustrated in FIG. 20. The ear-worn devices 2000R and 2000L may correspond to any of the ear-worn devices described herein. The ear-worn device 2000R may, for example, be worn on the right ear of a wearer, and the ear-worn device 2000L may, for example, be worn on the left ear of a wearer. Thus, the ear-worn devices 2000R and 2000L may each be part of a pair. (While the neural network 2070 is illustrated as receiving audio signals 2032, as described above, the neural network 2070 may actually receive pre-processed versions of the audio signals 2032. For simplicity, such pre-processing is not illustrated. The audio signals 2032R and 2032L may be examples of general "inputs" to neural networks, or to neural network layers.)

FIG. 20 is the same as FIG. 19, except that FIG. 20 illustrates that the neural networks 2070 each generate a real mask 2072 and two complex additive components 2074R and 2074L. Each of the ear-worn devices 2000R and 2000L may be configured to derive the magnitude and phase portions of the additive components 2074R and 2074L. The averaging circuitry 2082 of each of the ear-worn devices 2000R and 2000L may be configured to average (or generally, combined) the magnitudes of the additive components 2074R and 2074L, thereby generating a combined additive component magnitude 2074. The ear-worn device 2000R may be configured to use the combined additive component magnitude 2074 and the phase of the additive component 2074R (but not the phase of the additive component 2074L). The ear-worn device 2000L may be configured to use the combined additive component magnitude 2074 and the phase of the additive component 2074L (but not the phase of the additive component 2074R).

In some embodiments, the neural networks on the two ear-worn devices 2000R and 2000L may be the same. In some embodiments, the neural networks on the two ear-worn devices 2000R and 2000L may be different (e.g., have different weights). Whether the neural networks are the same or different, the neural networks may still be trained to generate the real mask 2072 and the two complex additive components 2074R and 2074L.

In some embodiments, rather than the neural networks 2070 being configured to generate the complex additive component 2074R and the complex additive component 2074L, the neural networks 2070 may instead be configured to generate the additive component magnitude 2074 and the phase portions of the additive components 2074R and 2074L. In some embodiments, the neural network 2070 running on the ear-worn device 2000R may be configured to receive one input (which may be the same as the input "R" to the control circuitry 1976), and based on this input, the neural network 2070 may be trained to just generate the additive component magnitude 2074 and the phase portion of the additive component 2074R. The neural network 2070 running on the ear-worn device 2000L may be configured to receive a different input (which may be the same as the input "L" to the control circuitry 1976), and based on this input, the neural network 2070 may be trained to just generate the additive component magnitude 2074 and the phase portion of the additive component 2074L. Thus, averaging of additive component magnitudes might not be performed.

Figure 21:
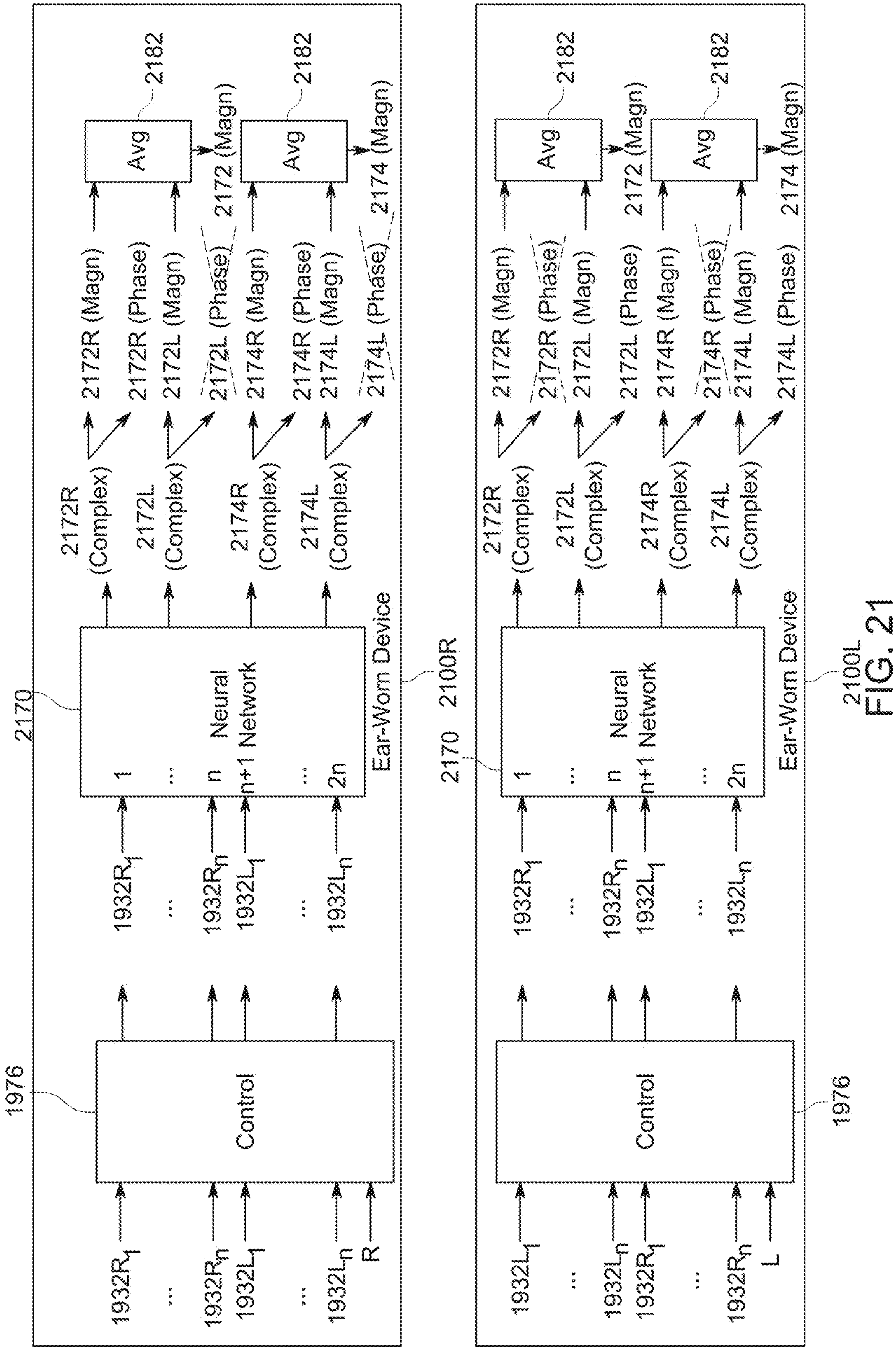
FIG. 21 illustrates a system of two ear-worn devices, in accordance with certain embodiments described herein.

FIG. 21 illustrates a system of two ear-worn devices 2100R and 2100L, in accordance with certain embodiments described herein. It should be appreciated that the ear-worn devices 2100R and 2100L may include more circuitry and components than shown and such circuitry and components may be disposed before, after, or between certain of the circuitry and components illustrated in FIG. 21. The ear-worn devices 2100R and 2100L may correspond to any of the ear-worn devices described herein. The ear-worn device 2100R may, for example, be worn on the right ear of a wearer, and the ear-worn device 2100L may, for example, be worn on the left ear of a wearer. Thus, the ear-worn devices 2100R and 2100L may each be part of a pair. (While the neural network 2170 is illustrated as receiving audio signals 2132, as described above, the neural network 2170 may actually receive pre-processed versions of the audio signals 2132. For simplicity, such pre-processing is not illustrated. The audio signals 2132R and 2132L may be examples of general "inputs" to neural networks, or to neural network layers.) FIG. 21 is the same as FIG. 20, except that FIG. 21 illustrates that the neural networks 2170 each generate two complex masks 2172R and 2172L and two complex additive components 2174R and 2174L. Each of the ear-worn devices 2100R and 2100L may be configured to derive the magnitude and phase portions of the masks 2172R and 2172L and the magnitude and phase portions of the additive components 2174R and 2174L. The averaging circuitry 2182 of each of the ear-worn devices 2100R and 2100L may be configured to average the magnitudes of the masks 2172R and 2172L and the magnitudes of the additive components 2174R and 2174L, thereby generating a combined mask magnitude 2172 and a combined additive component magnitude 2174. The ear-worn device 2100R may be configured to use the combined mask magnitude 2172 and the phase of the mask 2172R (but not the phase of the mask 2172L), and the combined additive component magnitude 2174 and the phase of the additive component 2174R (but not the phase of the additive component 2174L). The ear-worn device 2100L may be configured to use the combined mask magnitude 2172 and the phase of the mask 2172L (but not the phase of the mask 2172R), and the combined additive component magnitude 2174 and the phase of the additive component 2174L (but not the phase of the additive component 2174R).

In some embodiments, rather than the neural networks 2170 being configured to generate the complex mask 2172R and the complex mask 2172L, the neural networks 2170 may instead be configured to generate the mask magnitude 2172 and the phase portions of the masks 2172R and 2172L. Thus, averaging might not be performed. In some embodiments, the neural network 2170 running on the ear-worn device 2100R may be configured to receive one input (which may be the same as the input "R" to the control circuitry 1976), and based on this input, the neural network 2170 may be trained to just generate the mask magnitude 2172 and the phase portion of the mask 2172R. The neural network 2170 running on the ear-worn device 2100L may be configured to receive a different input (which may be the same as the input "L" to the control circuitry 1976), and based on this input, the neural network 2170 may be trained to just generate the mask magnitude 2172 and the phase portion of the mask 2172L. Thus, averaging of mask magnitudes might not be performed. In some embodiments, rather than the neural networks 2170 being configured to generate the complex additive component 2174R and the complex additive component 2174L, the neural networks 2170 may instead be configured to generate the additive component magnitude 2174 and the phase portions of the additive components 2174R and 2174L. In some embodiments, the neural network 2170 running on the ear-worn device 2100R may be configured to receive one input (which may be the same as the input "R" to the control circuitry 1976), and based on this input, the neural network 2170 may be trained to just generate the additive component magnitude 2174 and the phase portion of the additive component 2174R. The neural network 2170 running on the ear-worn device 2100L may be configured to receive a different input (which may be the same as the input "L" to the control circuitry 1976), and based on this input, the neural network 2170 may be trained to just generate the additive component magnitude 2174 and the phase portion of the additive component 2174L. Thus, averaging of additive component magnitudes might not be performed.

As described above, in some embodiments, the first and second ear-worn devices may be configured to generate the same mask, or at least the same mask magnitude portion. In such embodiments, the first ear-worn device might not be configured to perform binaural data transfer downstream of its neural network circuitry and the second ear-worn device might not be configured to perform binaural data transfer downstream of its neural network circuitry. For example, they might not be configured to perform binaural transfer of their masks.

Figure 22:
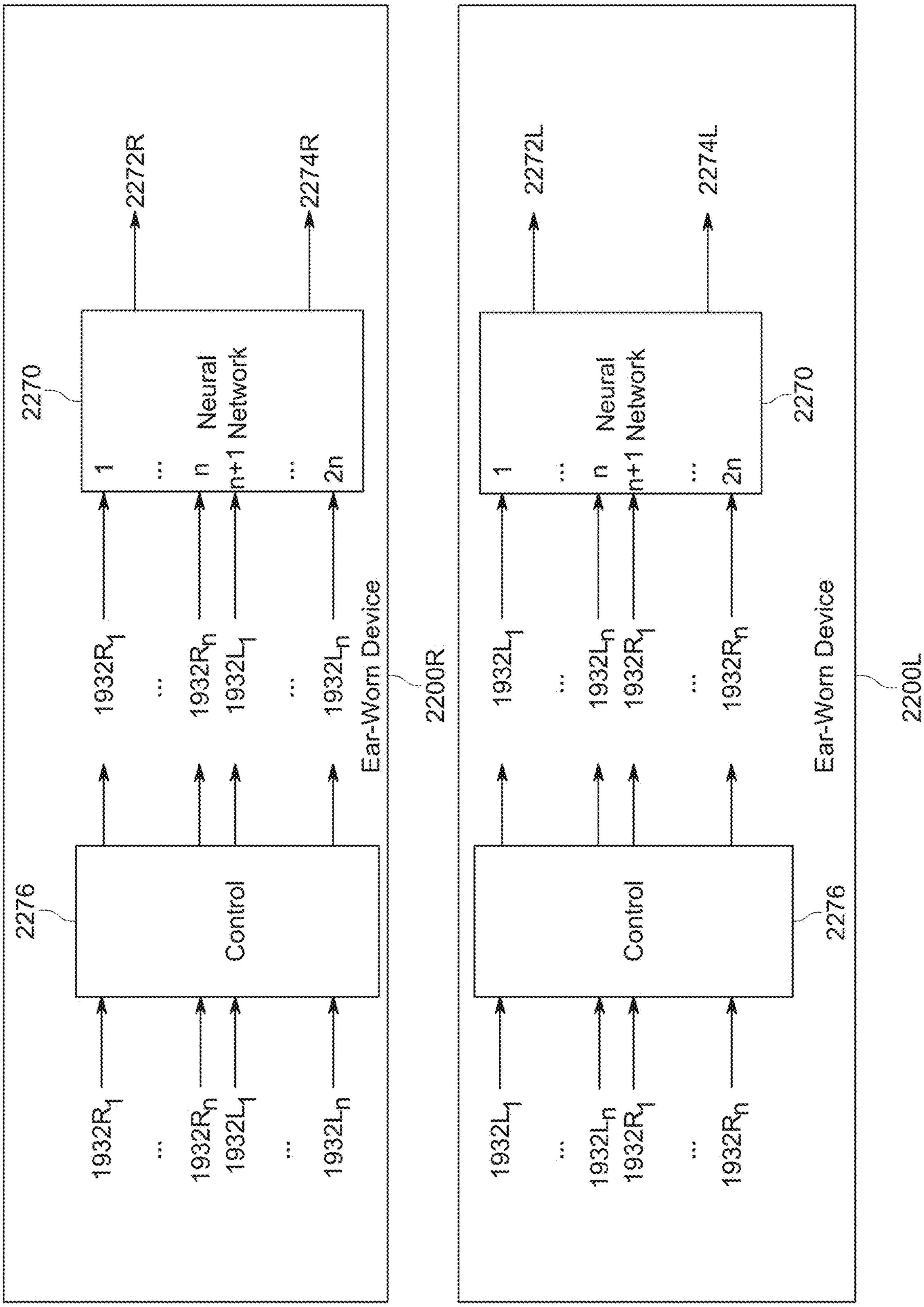
FIG. 22 illustrates a system of two ear-worn devices, in accordance with certain embodiments described herein.

FIG. 22 illustrates a system of two ear-worn devices 2200R and 2200L, in accordance with certain embodiments described herein. It should be appreciated that the ear-worn devices 2200R and 2200L may include more circuitry and components than shown and such circuitry and components may be disposed before, after, or between certain of the circuitry and components illustrated in FIG. 22. The ear-worn devices 2200R and 2200L may correspond to any of the ear-worn devices described herein. The ear-worn device 2200R may, for example, be worn on the right ear of a wearer, and the ear-worn device 2200L may, for example, be worn on the left ear of a wearer. Thus, the ear-worn devices 2200R and 2200L may each be part of a pair. (While the neural network 2270 is illustrated as receiving audio signals 2232, as described above, the neural network 2270 may actually receive pre-processed versions of the audio signals 2232. For simplicity, such pre-processing is not illustrated. The audio signals 2232R and 2232L may be examples of general "inputs" to neural networks, or to neural network layers.) FIG. 22 illustrates a neural network 2270 running on a right ear-worn device 2200R and the neural network 2270 running on the left ear-worn device 2200L. The neural network 2270 may be implemented by neural network circuitry (e.g., any of the neural network circuitry described herein). Each of the ear-worn devices 2200R and 2200L includes control circuitry 2276 configured to receive the left and right audio signals 1932R and 1932L. In contrast to the embodiment of FIG. 19, the control circuitry 2276 does not receive an input indicating whether the ear-worn device 2200 is the right one or the left one. As is illustrated, the neural network 2270 may be configured to receive the left and right audio signals 1932R and 1932L respectively, as a vector. Each ear-worn device 2200 may thus only know whether it itself generated given beamformed audio signals, or whether given beamformed audio signals were received from the other ear-worn device 2200. Thus, the control circuitry 1376 might not be able to arrange the right and left audio signals 1932R and 1932L, respectively, into a vector with the same order on both ear-worn devices 2200R and 2200L. In the example of FIG. 22, the right audio signals 1932R are ordered first in the vector and the left audio signals 1932L are ordered second in the vector on the ear-worn device 2200R, but the left audio signals 1932L are ordered first in the vector and the right audio signals 1932R are ordered second in the vector on the ear-worn device 2200L. In other words, each ear-worn device 2200's own beamformed audio signals 1932 are arranged first and the other ear-worn device 2200's beamformed audio signals 1932 are arranged second (but this is just one non-limiting example). Because the neural network 2270 on each ear-worn device 2200 may receive the beamformed audio signals 1932R and 1932L in different orders, the masks 2272R and 2272L output by the neural network 1370 on the right and left ear-worn devices 1900R and 1900L, respectively, may be different. To reduce binaural inconsistencies, it may be helpful to transfer the masks 2272R and 2272L (or at least their magnitudes) between the ear-worn devices 2200R and 2200L for averaging, as described above (e.g., with reference to FIG. 9). This example may thus involve transmitting data upstream of the neural network (i.e., transmitting the processed microphone signals or the beamformed audio signals) and downstream of the neural network (i.e., transmitting the masks) between the ear-worn devices 2200.

As described above, in some embodiments, beamforming processed microphone signals (e.g., processed microphone signals 752) from different ear-worn devices together (as described above, e.g., with respect to a four-beam pattern) may result in better spatial focusing than just beamforming processed microphone signals from a single ear-worn device. However, beamforming together processed microphone signals from different ear-worn devices may require knowledge of certain parameters such as the precise distance between the two ear-worn devices. In some embodiments, during a fitting, the distance between the two ear-worn devices on a particular user may be measured (e.g., using a physical measurement tool such as calipers). This distance may be programmed into the particular user's ear-worn devices and used for beamforming processed microphone signals from the different ear-worn devices together. In some embodiments, a sound may be played at the side of a user's head, and the time delay between when the sound is received by the closer ear-worn device versus the farther ear-worn device may be measured and used to determine the distance between the ear-worn devices (e.g., by multiplying the time delay by the speed of sound).

The above description has described various methods for binaural data sharing in neural network-based ear-worn devices. As described above, certain methods may involve each ear-worn device using the same inputs to the same neural network and generating the same outputs. In some embodiments, two ear-worn devices may alternate performing the neural network computations (and the other portions of the signal processing path as well). In such embodiments, each ear-worn device may be configured to transfer data to the other, and one ear-worn device may be configured to perform the neural network computations and transfer the output to the other ear-worn device. Both ear-worn devices may then generate the same output as sound into each ear of the user. This may help to conserve battery power, but may be at the expense of latency.

In some embodiments, each ear-worn device may be configured to transfer the result of its processing to the other ear-worn device. For example, each ear-worn device may be configured to transfer its noise-reduced, spatially-focused, or noise-reduced and spatially-focused audio signal to the other ear-worn device. In some embodiments, each ear-worn device may be configured to beamform the noise-reduced, spatially-focused, or noise-reduced and spatially-focused audio signal it itself generated together with the noise-reduced, spatially-focused, or noise-reduced and spatially-focused audio signal transferred from the other ear-worn device. The result may be a forward-focused signal (e.g., a monaural-sounding signal).

Binaural data sharing may incur increased power consumption, but may also improve performance (e.g., improve noise reduction and/or spatial focusing). In some embodiments, binaural data sharing may be performed or not based on the environment. For example, if the noise volume in the environment is above a threshold, or the signal-to-noise ratio (SNR) of the environment is above a threshold, then binaural data sharing may be performed; otherwise, binaural data sharing may not be performed.

Generally, a system (e.g., any of the systems described herein) may include a first ear-worn device (e.g., any of the ear-worn devices described herein) that includes neural network circuitry, and a second ear-worn device (e.g., any of the ear-worn devices described herein). The first ear-worn device may be configured to receive second data from the second ear-worn device, generate first data, and input the first and second data, or data originating therefrom, to the neural network circuitry. In some embodiments, the first ear-worn device may be configured to receive the second data from the second ear-worn device wirelessly (e.g., over a Bluetooth or NFMI communication link). As one non-limiting example, the first and second data may be processed microphone signals, and the first ear-worn device may be configured to perform beamforming on the first and second data, and input the resulting beamformed audio signals to the neural network circuitry. As another non-limiting example, the first and second data may be beamformed audio signals, and the first ear-worn device may be configured to input the beamformed audio signals to the neural network circuitry. As another example, the first and second data may be neural network products. The neural network circuitry may be configured to implement one or more neural networks trained to process together the first and second data, or the data originating therefrom. This should be understood to include performing pre-processing on the data (as described above) prior to the neural network processing. The one or more neural networks may be further configured to generate, based on processing together the first and second data or the data originating therefrom, a neural network product (e.g., a mask).

In some embodiments, the first data and the second data may have been generated at the same time, or at approximately the same time. The first ear-worn device may be configured to wait to process the first data until it has received the second data from the second ear-worn device, and then it may process the first data and the second data together as described above. However, in some embodiments, the first and second data may have been generated at different times, and the first ear-worn device might not be configured to wait to process the first data until specific data has arrived from the second ear-worn device. Rather, the first ear-worn device may be configured to process the first data together with the most-recently received second data from the second ear-worn device. This second data may have been generated before the first data, but may have arrived at the first ear-worn device at approximately the same time that the first data was generated due to the wireless transmission delay. In some embodiments, the first data and the second data may be generated more than 5 milliseconds apart. In some embodiments, the first data and the second data may be generated more than 10 milliseconds apart. In some embodiments, the first data and the second data may be generated more than 20 milliseconds apart. In some embodiments, the first data may have been generated during a first sampling window, the second data may have been generated during a second sampling window, and the first and second sampling windows might not overlap. In some embodiments, the second sampling window may be before the first sampling window. In some embodiments, the first ear-worn device may be configured to receive the second data prior to completing generation of the first data. The latency between generation of the second and first data may be due to, at least in part, to latency in wireless transmission when using Bluetooth for the transmission. The latency may also be due to sampling windows on the two ear-worn devices that are not synchronized. Despite this latency, the first ear-worn device may still be configured to process the first and second data together with a neural network. As described above, a neural network may be better able to process data with mixed latencies together. For example, the neural network may be trained with training data having mixed latencies.

Figure 23:
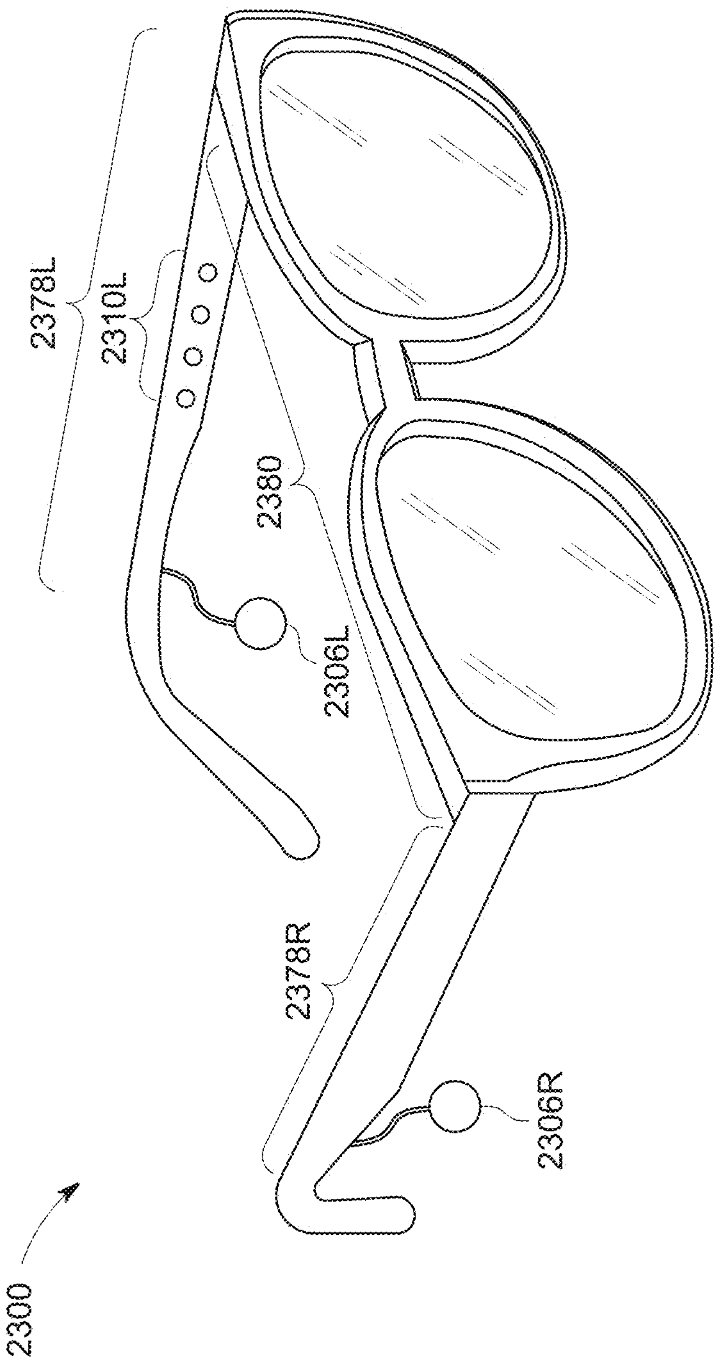
FIG. 23 illustrates eyeglasses with built-in hearing aids, in accordance with certain embodiments described herein.

FIG. 23 illustrates eyeglasses 2300 with built-in hearing aids, in accordance with certain embodiments described herein. The eyeglasses 2300 have a left temple 2378L, a right temple 2378R, and a front rim 2380. The eyeglasses 2300 further include a receiver 2306L connected to the left temple 2378L and a receiver 2306R connected to the right temple 2378R. FIG. 23 illustrates microphones 2310L disposed on the left temple 2378L. It should be appreciated that microphones 2310R may also be disposed on the right temple 2378R (but not visible in the figure). It should be appreciated that microphones may also be disposed on the front rim 2380 (but not visible in the figure). While FIG. 23 illustrates four microphones 2310L on the left temple 2378L, more or fewer microphones may be disposed on a temple or rim. In some embodiments (such as that of FIG. 23), the inlets for the microphones may be disposed on the inner side of the temples and/or rim (i.e., the side facing toward the wearer's face), thereby reducing visibility of the inlets to other people. In some embodiments, the inlets for the microphones may be disposed on the upper side of the temples and/or rim, thereby reducing visibility of the inlets to other people. In some embodiments, the inlets for the microphones may be disposed on the outer side of the temples and/or rim (i.e., the side facing away from the wearer's face). In some embodiments, there may be processing circuitry in the left temple 2378L, processing circuitry in the right temple 2378R, and internal electrical connections (e.g., wires) between the left temple 2378L and the right temple 2378R, for example, through the front rim 2380, enabling transmission of data between the processing circuitry in the left temple 2378L and the processing circuitry in the right temple 2378R.

Figure 24:
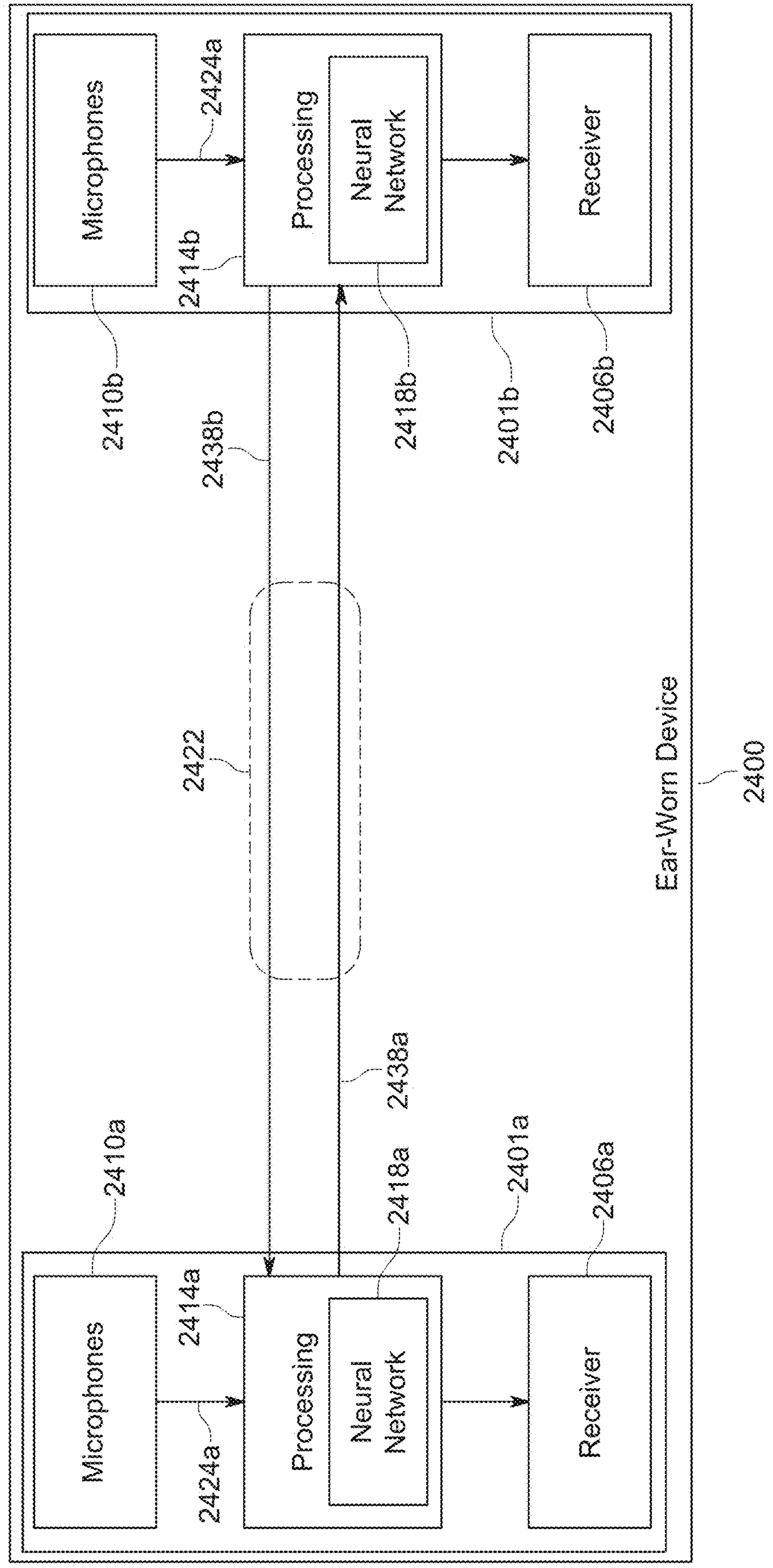
FIG. 24 illustrates an ear-worn device, and circuitry in the ear-worn device, in accordance with certain embodiments described herein.

FIG. 24 illustrates an ear-worn device 2400, and circuitry in the ear-worn device 2400, in accordance with certain embodiments described herein. The ear-worn device 2400 may be any type of single device having microphones configured to be worn near each ear, such as the eyeglasses 2300. The ear-worn device 2400 includes one or more microphones 2410*a*, processing circuitry 2414*a* including neural network circuitry 2418*a*, a receiver 2406*a*, one or more microphones 2410*b*, processing circuitry 2414*b* including neural network circuitry 2418*b*, a receiver 2406*b*, and internal electrical connections 2422 (e.g., wires). It should be appreciated that the ear-worn device 2400 may include more circuitry and components than shown and such circuitry and components may be disposed before, after, or between certain of the circuitry and components illustrated in FIG. 24.

The one or more microphones 2410*a* (which may, for example, correspond to the microphones 2310L) may include one, two, or more than two (e.g., 2, 3, 4, 5, or more) microphones. For example, the one or more microphones 2410*a* may include more than two microphones in an array. The one or more microphones 2410*b* may include one, two, or more than two (e.g., 2, 3, 4, 5, or more) microphones. For example, the one or more microphones 2410*b* may include more than two microphones in an array. The one or more microphones 2410*a* and the one or more microphones 2410*b* may be configured to receive sound signals and generate audio signals from the sound signals. Audio signals generated by microphones may be referred to herein as microphone signals. FIG. 24 illustrates one or more microphone signals 2424*a* generated by the one or more microphones 2410*a* and inputted to the processing circuitry 2414*a*, and one or more microphone signals 2424*b* generated by the one or more microphones 2410*b* and inputted to the processing circuitry 2414*b*. Each microphone signal 2424 may be generated by one of the one or more microphones 2410. In some embodiments, the ear-worn device 2400 may generate the same number of microphone signals 2424 as its microphones 2410, because each microphone may generate one microphone signal.

The processing circuitry 2414*a* may be configured to process the one or more microphone signals 2424*a*. For example, the processing circuitry 2414*a* may be configured to perform one or more of analog processing, digital processing, beamforming, and audio enhancement. In particular, the neural network circuitry 2418*a* may be used for audio enhancement. The processing circuitry 2414*b* may be configured to process the one or more microphone signals 2424*b*. For example, the processing circuitry 2414*b* may be configured to perform one or more of analog processing, digital processing, beamforming, and audio enhancement. In particular, the neural network circuitry 2418*b* may be used for audio enhancement. Further description of processing circuitry may be found above with reference to FIGS. 3-22.

The receiver 2406*a* (which may correspond to the receiver 2306L) may be configured to play back the output of the processing circuitry 2414*a* as sound into the ear of the user. The receiver 2406*b* (which may correspond to the receiver 2306R) may be configured to play back the output of the processing circuitry 2414*b* as sound into the ear of the user. The receivers 2406*a* and 2406*b* may also be configured to implement digital-to-analog conversion prior to the playing back.

As illustrated in FIG. 24, the ear-worn device 2400 may be configured to send shared data 2438*a* from the processing circuitry 2414*a* to the processing circuitry 2414*b*, and to send shared data 2438*b* from the processing circuitry 2414*b* to the processing circuitry 2414*a*, over the internal electrical connections 2422 (e.g., wires). For example, the internal electrical connections 2422 may be implemented in the front rim of eyeglasses (e.g., the front rim 2380). As further illustrated in FIG. 24, the one or more microphones 2410*a*, the processing circuitry 2414*a*, and the receiver 2406*a* may be implemented in a first portion 2401*a* of the ear-worn device 2400 (e.g., the left temple 2378L of the eyeglasses 2300) and the one or more microphones 2410*b*, the processing circuitry 2414*b*, and the receiver 2406*b* may be implemented in a second portion 2401*b* of the ear-worn device 2400 (e.g., the right temple 2378R of the eyeglasses 2300).

Any of the above description of the shared data 238*a* and 238*b* may apply to the shared data 2438*a* and 2438*b*. Generally, any description above with reference to FIGS. 3-22 may apply to the eyeglasses 2300 and the ear-worn device 2400, except that data sharing may occur between two different parts of one device (e.g., between the processing circuitry in two temples of eyeglasses) over internal electrical connections, rather than between two different devices over a wireless communication link. For example, the sharing may occur between a first ear-worn device portion (e.g., the first portion 2401*a* of the ear-worn device 2400 and/or the left temple 2378L of the eyeglasses 2300) and a second ear-worn device portion (e.g., the second portion 2401*b* of the ear-worn device 2400 and/or the right temple 2378R of the eyeglasses 2300). More specifically, the sharing may occur between processing circuitry (e.g., the processing circuitry 2414*a*) of the first portion of the ear-worn device and processing circuitry (e.g., the processing circuitry 2414*b*) of the second portion of the ear-worn device. The internal electrical connections may be, for example, wires, and may be implemented in a front rim of eyeglasses (e.g., the front rim 2380 of the eyeglasses 2300).

Deploying audio enhancement techniques may introduce delays between when a sound is emitted by the sound source and when the enhanced sound is output to a user. For example, such techniques may introduce a delay between when a speaker speaks and when a listener hears the enhanced speech. During in-person communication, long latencies can create the perception of an echo as both the original sound and the enhanced version of the sound are played back to the listener. Additionally, long latencies can interfere with how the listener processes incoming sound due to the disconnect between visual cues (e.g., moving lips) and the arrival of the associated sound. To attain tolerable latencies when implementing a neural network on an ear-worn device, the ear-worn device may need to be capable of performing billions of operations per second. To address power issues with such demanding requirements, neural network circuitry (e.g., any of the neural network circuitry described herein, in addition to other circuitry) may be implemented on a chip in the ear-worn device. Thus, in some embodiments, some or all of the processing circuitry (e.g., any of the processing circuitry described herein, including some or all of any of the audio enhancement circuitry described herein and/or some or all of any of the neural network circuitry described herein) may be implemented on a single same chip (i.e., a single semiconductor die or substrate) in the ear-worn device. Further description of chips incorporating (in some embodiments, among other elements) neural network circuitry for use in ear-worn devices may be found in U.S. Pat. No. 11,886,974, entitled "Neural Network Chip for Ear-Worn Device," issued Jan. 30, 2024, which is incorporated by reference herein in its entirety, as well as below.

Any of the neutral network circuitry described herein may include circuitry configured to perform operations necessary for computing the output of a neural network layer. One such operation may be a matrix-vector multiplication. In some embodiments, neural network circuitry may include multiple identical tiles on the chip, each including multiple multiply-and-accumulate circuits configured to perform intermediate computations of a matrix-vector multiplication in parallel and then compute results of the intermediate computations into a final result. Each tile may additionally include memory configured to store neural network weights, registers configured to store input activation elements, and routing circuitry configured to facilitate communication of status and data between tiles. Other types of circuitry configured to perform processing described herein may be implemented as digital processing circuitry on the chip. In some embodiments, such digital processing circuitry may use a SIMD (single instruction multiple data) architecture. Thus, the chip may include the tiles and digital processing circuitry described above. In some embodiments, for a model having up to 10M 8-bit weights, and when operating at 100 GOPs/sec on time series data, the chip may achieve power efficiency of 4 GOPs/milliwatt, measured at 40 degrees Celsius, when the chip uses supply voltages between 0.5-1.8V, and when the chip is performing operations without idling. In some embodiments, in addition to such a chip, any of the ear-worn devices described herein may include a digital signal processor configured to perform other processing operations.

This disclosure includes, at least, the following examples:

Example A1 is directed to a system, comprising: a first car-worn device comprising: first neural network circuitry; and first communication circuitry; and a second ear-worn device comprising: second neural network circuitry; and second communication circuitry; wherein: the first communication circuitry and the second communication circuitry are configured to communicate over a wireless communication link; the first neural network circuitry is configured to: receive one or more first audio signals generated by the first ear-worn device; and implement one or more first neural network layers, wherein the first neural network circuitry is configured to use the one or more first neural network layers to generate a first neural network product based on the one or more first audio signals; the second neural network circuitry is configured to: receive one or more second audio signals generated by the second ear-worn device; and implement one or more second neural network layers, wherein the second neural network circuitry is configured to use the one or more second neural network layers to generate a second neural network product based on the one or more second audio signals; and the first communication circuitry is configured to: transmit, to the second communication circuitry over the wireless communication link, first data comprising or originating from the first neural network product; and receive, from the second communication circuitry over the wireless communication link, second data comprising or originating from the second neural network product.

Example A2 is directed to the system of example A1, wherein the first data comprises a first mask and the second data comprises a second mask; or the first data comprises a processed version of the first mask and the second data comprises a processed version of the second mask.

Example A3 is directed to the system of example A2, wherein the first ear-worn device is configured to combine the first mask with the second mask, thereby generating a first combined mask.

Example A4 is directed to the system of example A3, wherein the first car-worn device is configured, when combining the first mask with the second mask, to average the first mask with the second mask.

Example A5 is directed to the system of example A3, wherein the first ear-worn device is configured, when combining the first mask with the second mask, to combine a magnitude portion of the first mask with a magnitude portion of the second mask.

Example A6 is directed to the system of example A5, wherein the first combined mask comprises: a magnitude portion based on combining the magnitude portion of the first mask with the magnitude portion of the second mask; and a phase portion based on a phase portion of the first mask.

Example A7 is directed to the system of any of examples A5-A6, wherein the first ear-worn device is configured, when combining the magnitude portion of the first mask with the magnitude portion of the second mask, to average the magnitude portion of the first mask with the magnitude portion of the second mask.

Example A8 is directed to the system of any of examples A3-A7, wherein the second ear-worn device is configured to combine the first mask with the second mask, thereby generating a second combined mask.

Example A9 is directed to the system of example A8, wherein the second ear-worn device is configured, when combining the first mask with the second mask, to average the first mask with the second mask.

Example A10 is directed to the system of any of examples A8-A9, wherein the first combined mask and the second combined mask are the same.

Example A11 is directed to the system of example A8, wherein the second ear-worn device is configured, when combining the first mask with the second mask, to combine a magnitude portion of the first mask with a magnitude portion of the second mask.

Example A12 is directed to the system of example A11, wherein the second combined mask comprises: a magnitude portion based on combining the magnitude portion of the first mask with the magnitude portion of the second mask; and a phase portion based on a phase portion of the second mask.

Example A13 is directed to the system of any of examples A11-A12, wherein the second ear-worn device is configured, when combining the magnitude portion of the first mask with the magnitude portion of the second mask, to average the magnitude portion of the first mask with the magnitude portion of the second mask.

Example A14 is directed to the system of any of examples A8-A13, wherein magnitude portions of the first combined mask and the second combined mask are the same.

Example A15 is directed to the system of any of examples A3-A14, wherein the first ear-worn device is configured to apply the first combined mask to one of the one or more first audio signals.

Example A16 is directed to the system of example A15, wherein the one of the one or more first audio signals comprises a beamformed audio signal.

Example A17 is directed to the system of any of examples A8-A16, wherein: the first ear-worn device is configured to apply the first combined mask to one of the one or more first audio signals; and the second ear-worn device is configured to apply the second combined mask to one of the one or more second audio signals.

Example A18 is directed to the system of example A17, wherein: the one of the one or more first audio signals comprises a beamformed audio signal; and the one of the one or more second audio signals comprises a beamformed audio signal.

Example A19 is directed to the system of any of examples A17-A18, wherein the one of the one or more first audio signals and the one of the one or more second audio signals are different.

Example A20 is directed to the system of any of examples A3-A14, wherein the first ear-worn device is configured to apply the first combined mask to an audio signal received by the first ear-worn device subsequently to the one or more first audio signals.

Example A21 is directed to the system of any of examples A2-A20, wherein the first mask and the second mask each comprise a noise-reducing mask.

Example A22 is directed to the system of any of examples A2-A20, wherein the first mask and the second mask each comprise a spatially-focusing mask.

Example A23 is directed to the system of any of examples A2-A20, wherein the first mask and the second mask each comprise a noise reducing and spatially-focusing mask.

Example A24 is directed to the system of any of examples A2-A23, wherein: the first ear-worn device is configured to compare the first mask with the second mask; the first ear-worn device further comprises mixing circuitry configured to mix at least two audio signals, thereby generating an output audio signal; and based on the comparison, the mixing circuitry is further configured to modulate weighting of the at least two audio signals in the mixing.

Example A25 is directed to the system of example A24, wherein the first ear-worn device is configured, when comparing the first mask with the second mask, to: calculate magnitudes of the first mask and the second mask; subtract the magnitudes, thereby generating a difference; and determine an absolute value of the difference.

Example A26 is directed to the system of any of examples A24-A25, wherein the mixing circuitry is further configured to generate the output audio signal to include a higher amplitude of noise when the comparison indicates that a difference between the first mask and the second mask has increased.

Example A27 is directed to the system of example A1, wherein the at least one second neural network product is a non-final product of the one or more second neural network layers.

Example A28 is directed to the system of example A1, wherein the at least one second neural network product is an output by a non-final layer of the one or more second neural network layers.

Example A29 is directed to the system of any of examples A2-A28, wherein the second data comprises the processed version of the second mask; and the first ear-worn device is configured to generate the second mask from the second data using decoding or interpolation.

Example A30 is directed to the system of any of examples A1-A29, wherein the first neural network circuitry is configured to input the second data or a processed version thereof to at least one of the one or more first neural network layers.

Example A31 is directed to the system of example A30, wherein the first neural network circuitry is configured to input the second data or the processed version thereof to the at least one of the one or more first neural network layers when processing audio signals received subsequent to the one or more first audio signals.

Example A32 is directed to the system of any of examples A30-A31, wherein the second neural network product is a product of an nth layer of the one or more second neural network layers, and the first neural network circuitry is configured to input the second neural network product to an (n+1)th layer of the one or more first neural network layers.

Example A33 is directed to the system of any of examples A30-A32, wherein the first neural network circuitry is configured to input both the second neural network product and the first neural network product to the at least one of the one or more first neural network layers.

Example A34 is directed to the system of any of examples A30-A33, wherein the second neural network circuitry is configured to input the first neural network product to at least one of the one or more second neural network layers.

Example A35 is directed to the system of example A34, wherein the second neural network circuitry is configured to input the first neural network product to the at least one of the one or more second neural network layers when processing audio signals received subsequent to the one or more second audio signals.

Example A36 is directed to the system of any examples A30-A35, wherein the first neural network circuitry is configured to use the one or more first neural network layers to decode the second data.

Example A37 is directed to the system of any of examples A1-A36, wherein the second data comprises some but not all frequencies of the second neural network product.

Example A38 is directed to the system of any of claims A1-A36, wherein the second data comprises an encoded version of the second neural network product.

Example A39 is directed to the system of any of examples A1-A38, wherein the wireless communication link comprises a near-field magnetic induction (NFMI) communication link.

Example A40 is directed to the system of any of examples A1-A39, wherein the first neural network product is generated within 10 milliseconds of the second neural network product.

Example A41 is directed to the system of any of examples A1-A39, wherein the first neural network product is generated within 5 milliseconds of the second neural network product.

Example A42 is directed to the system of any of examples A1-A39, wherein the first neural network product is generated within 3 milliseconds of the second neural network product.

Example A43 is directed to the system of any of examples A1-A39, wherein the first neural network product is generated within 10-25 milliseconds of the second neural network product.

Example A44 is directed to the system of any of examples A1-A44, wherein the one or more first neural network layers and the one or more second neural network layers are the same.

Example A45 is directed to the system of any of examples A1-A43, wherein the one or more first neural network layers and the one or more second neural network layers are different.

Example A46 is directed to the system of any of examples A1-A45, wherein the one or more first neural network layers and the one or more second neural network layers are trained to perform noise reduction.

Example A47 is directed to the system of any of examples A1-A45, wherein the one or more first neural network layers and the one or more second neural network layers are trained to perform spatial focusing.

Example A48 is directed to the system of any of examples A1-A45, wherein the one or more first neural network layers and the one or more second neural network layers are trained to perform noise reduction and spatial focusing.

Example B1 is directed to a system, comprising: a first ear-worn device comprising: one or more first microphones; first processing circuitry comprising first neural network circuitry; and first communication circuitry; and a second ear-worn device comprising: one or more second microphones; second processing circuitry comprising second neural network circuitry; and second communication circuitry; wherein: the first communication circuitry and the second communication circuitry are configured to communicate over a wireless communication link; the one or more first microphones are configured to generate one or more first microphone signals; the one or more second microphones are configured to generate one or more second microphone signals; the first processing circuitry is configured to process the one or more first microphone signals, thereby generating one or more first processed microphone signals; the second processing circuitry is configured to process the one or more second microphone signals, thereby generating one or more second processed microphone signals; the first communication circuitry is configured to: transmit the one or more first processed microphone signals to the second communication circuitry over the wireless communication link, and receive the one or more second processed microphone signals from the second communication circuitry over the wireless communication link; and the first neural network circuitry is configured to receive one or more audio signals comprising or originating from the one or more first processed microphone signals and the one or more second processed microphone signals and implement one or more first neural network layers trained to perform audio enhancement based on the one or more audio signals.

Example B2 is directed to the system of example B1, wherein: the first processing circuitry further comprises first beamforming circuitry; the first beamforming circuitry is configured to perform beamforming on the one or more first processed microphone signals and the one or more second processed microphone signals, thereby generating one or more beamformed audio signals; and the one or more audio signals received by the first neural network circuitry comprise or originate from the one or more beamformed audio signals.

Example B3 is directed to the system of example B2, wherein the first beamforming circuitry is configured to beamform together at least two of the one or more first processed microphone signals and at least two of the one or more second processed microphone signals.

Example B4 is directed to the system of example B2, wherein the first beamforming circuitry is configured to beamform together at least one of the one or more first processed microphone signals and at least one of the one or more second processed microphone signals.

Example B5 is directed to the system of example B2, wherein the one or more beamformed audio signals comprise two or more beamformed audio signals, and the first beamforming circuitry is configured to: beamform together at least two of the one or more first processed microphone signals, thereby generating one or more of the two or more beamformed audio signals; and beamform together at least two of the one or more second processed microphone signals, thereby generating one or more of the two or more beamformed audio signals.

Example B6 is directed to the system of example B2, wherein the first beamforming circuitry is not configured to beamform the one or more first processed microphone signals together with the one or more second processed microphone signals.

Example B7 is directed to the system of any of examples B2-B6, wherein the one or more beamformed audio signals comprise two or more beamformed audio signals, each having a different beamformed directional pattern.

Example B8 is directed to the system of example B7, wherein the two or more beamformed audio signals comprise at least one front-facing beamformed audio signal and at least one rear-facing beamformed audio signal.

Example B9 is directed to the system of any of examples B1-B8, wherein: the second communication circuitry is configured to: transmit the one or more second processed microphone signals to the first communication circuitry over the wireless communication link; and receive the one or more first processed microphone signals from the first communication circuitry over the wireless communication link.

Example B10 is directed to the system of example B9, wherein: the second processing circuitry comprises second beamforming circuitry; and the second beamforming circuitry is configured to perform beamforming on the one or more first processed microphone signals and the one or more second processed microphone signals, thereby generating the one or more beamformed audio signals; and the second neural network circuitry is configured to receive the one or more beamformed audio signals and implement one or more second neural network layers trained to perform audio enhancement based on the one or more beamformed audio signals.

Example B11 is directed to the system of example B10, wherein the first beamforming circuitry and the second beamforming circuitry are configured to generate the same one or more beamformed audio signals.

Example B12 is directed to the system of example B10, wherein: the one or more first neural network layers and the one or more second neural network layers are the same.

Example B13 is directed to the system of example B10, wherein: the one or more first neural network layers and the one or more second neural network layers are different.

Example B14 is directed to the system of example B1, wherein: the first processing circuitry comprises first beamforming circuitry; the second processing circuitry comprises second beamforming circuitry; the one or more first processed microphone signals comprise one or more first beamformed signals, and the first processing circuitry is configured to generate the one or more first beamformed signals using the first beamforming circuitry; the one or more second processed microphone signals comprise one or more second beamformed signals, and the second processing circuitry is configured to generate the one or more second beamformed signals using the second beamforming circuitry; and the one or more audio signals comprise or originate from: the one or more first beamformed audio signals and the one or more second beamformed audio signals; and/or one or more beamformed audio signals formed by beamforming at least one of the one or more first beamformed audio signals together with at least one of the one or more second beamformed audio signals.

Example B15 is directed to the system of example B14, wherein the one or more audio signals comprise the one or more first beamformed audio signals and the one or more second beamformed audio signals, and the first beamforming circuitry is not configured to beamform the one or more first beamformed audio signals together with the one or more second beamformed audio signals.

Example B16 is directed to the system of any of examples B14-B15, wherein: the second communication circuitry is configured to: transmit the one or more second beamformed audio signals to the first communication circuitry over the wireless communication link; and receive the one or more first beamformed audio signals from the first communication circuitry over the wireless communication link.

Example B17 is directed to the system of example B16, wherein: the second neural network circuitry is configured to receive the one or more audio signals and implement one or more second neural network layers trained to perform audio enhancement based on the one or more audio signals:

Example B18 is directed to the system of example B16, wherein: the one or more first neural network layers and the one or more second neural network layers are the same.

Example B19 is directed to the system of example B16, wherein: the one or more first neural network layers and the one or more second neural network layers are different.

Example B20 is directed to the system of any of examples B1-B19 wherein the first neural network circuitry and the second neural network circuitry are configured to generate, based on the one or more audio signals, a same mask, or at least a same mask magnitude portion.

Example B21 is directed to the system of example B20, wherein the mask comprises a noise-reducing mask.

Example B22 is directed to the system of example B20, wherein the mask comprises a spatially-focusing mask.

Example B23 is directed to the system of example B20, wherein the mask comprises a noise-reducing and spatially-focusing mask.

Example B24 is directed to the system of any of examples B1-B23, wherein the first ear-worn device is configured to generate a spatially-focused output audio signal having a narrower focus than if the first ear-worn device did not receive the one or more second processed microphone signals from the second ear-worn device.

Example B25 is directed to the system of any of example B1-B24, wherein the wireless communication link comprises a near-field magnetic induction (NFMI) communication link.

Example B26 is directed to the system of any of examples B1-B25, wherein the first processed microphone signals are generated within 10 milliseconds of the second processed microphone signals.

Example B27 is directed to the system of any of examples B1-B26, wherein the first processed microphone signals are generated within 5 milliseconds of the second processed microphone signals.

Example B28 is directed to the system of any of examples B1-B26, wherein the first processed microphone signals are generated within 3 milliseconds of the second processed microphone signals.

Example B29 is directed to the system of any of examples B1-B9, B14-B16, and B20-B28, wherein: the second neural network circuitry is configured to implement one or more second neural network layers; and the one or more first neural network layers and the one or more second neural network layers are the same.

Example B26 is directed to the system of any of examples B1-B9, B14-B16, and B20-B28, wherein: the second neural network circuitry is configured to implement one or more second neural network layers; and the one or more first neural network layers and the one or more second neural network layers are different.

Example B27 is directed to the system of example B1, wherein: the second neural network circuitry is configured to implement one or more second neural network layers; and the one or more first neural network layers implemented by the first neural network circuitry and the one or more second neural network layers implemented by the second neural network circuitry are configured to receive inputs comprising or originating from the one or more audio signals, with a same ordering of the inputs.

Example B28 is directed to the system of example B27, wherein: the first ear-worn device and the second ear-worn device are configured to order the inputs with the same ordering based on different indications programmed into or received by the first and second ear-worn devices.

Example B29 is directed to the system of any of examples B27-B28, wherein the one or more first neural network layers and the one or more second neural network layers are the same.

Example B30 is directed to the system of any of examples B27-B29, wherein the first ear-worn device is not configured to perform binaural data transfer downstream of the first neural network circuitry and the second ear-worn device is not configured to perform binaural data transfer downstream of the second neural network circuitry.

Example C1 is directed to a system, comprising: a first ear-worn device comprising: first processing circuitry comprising: first neural network circuitry configured to implement a neural network; first mixing circuitry configured to mix at least two audio signals, thereby generating an output audio signal; and first communication circuitry; and a second ear-worn device comprising second communication circuitry; wherein: the first communication circuitry and the second communication circuitry are configured to communicate over a wireless communication link; the first processing circuitry is configured to calculate a first value for an environmental metric; the first communication circuitry is configured to: transmit the first value for the environmental metric to the second communication circuitry over the wireless communication link; and receive a second value for the environmental metric from the second communication circuitry over the wireless communication link; and the first mixing circuitry is further configured to mix the at least two audio signals based, at least in part, on the second value for the environmental metric.

Example C2 is directed to the system of example C1, wherein the first mixing circuitry is configured, when mixing the at least two audio signals based, at least in part, on the second value for the environmental metric, to modulate weighting of the at least two audio signals based, at least in part, on the second value for the environmental metric.

Example C3 is directed to the system of any of examples C1-C2, wherein: the environmental metric is a running average of signal-to-noise ratio (SNR); the first value comprises a first SNR value at the first ear-worn device; and the second value comprises a second SNR value at the second ear-worn device.

Example C4 is directed to the system of example C3, wherein the first mixing circuitry is configured, when mixing the at least two audio signals based, at least in part, on the second value for the environmental metric, to mix the at least two audio signals based, at least in part, on a lower of the first SNR value and the second SNR value.

Example C5 is directed to the system of example C4, wherein the mixing circuitry is further configured to generate an output audio signal to include a higher amplitude of noise in the output audio signal when the lower of the first SNR value and the second SNR value has decreased.

Example D1 is directed to a system, comprising: a first ear-worn device comprising: one or more first microphones; first processing circuitry comprising first neural network circuitry; and first communication circuitry; and a second ear-worn device comprising: one or more second microphones; second processing circuitry comprising second neural network circuitry; and second communication circuitry; wherein: the one or more first microphones are configured to generate one or more first microphone signals; the one or more second microphones are configured to generate one or more second microphone signals; the first processing circuitry is configured to process the one or more first microphone signals, thereby generating first data; the second processing circuitry is configured to process the one or more second microphone signals, thereby generating second data; the first communication circuitry and the second communication circuitry are configured to communicate over a wireless communication link; the first communication circuitry is configured to: transmit the first data to the second communication circuitry over the wireless communication link; and receive the second data from the second communication circuitry over the wireless communication link; the second communication circuitry is configured to: transmit the second data to the first communication circuitry over the wireless communication link; and receive the first data from the first communication circuitry over the wireless communication link; the first neural network circuitry is configured to implement one or more first neural network layers configured to receive inputs comprising or originating from the first data and the second data and trained to generate an audio-enhancing mask based on the inputs; and the second neural network circuitry is configured to implement one or more second neural network layers configured to receive the inputs comprising or originating from the first data and the second data and trained to generate the audio-enhancing mask based on the inputs; wherein: the one or more first neural network layers implemented by the first neural network circuitry and the one or more second neural network layers implemented by the second neural network circuitry are configured to receive the inputs with a same ordering of the inputs.

Example D2 is directed to the system of example D1, wherein: the first ear-worn device and the second ear-worn device are configured to order the inputs with the same ordering based on different indications programmed into or received by the first and second ear-worn devices.

Example D3 is directed to the system of any of examples D1-D2, wherein the one or more first neural network layers and the one or more second neural network layers are the same.

Example D4 is directed to the system of any of examples D1-D3, wherein the first ear-worn device is not configured to perform binaural data transfer downstream of the first neural network circuitry and the second ear-worn device is not configured to perform binaural data transfer downstream of the second neural network circuitry.

Example E1 is directed to a system, comprising: a first ear-worn device; and a second ear-worn device; wherein: the first ear-worn device is configured to receive second data from the second ear-worn device; the second ear-worn device is configured to receive first data from the second ear-worn device; and based on the first ear-worn device receiving the second data and the second ear-worn device receiving the first data, the first ear-worn device and the second ear-worn device are configured to generate a same neural network product.

Example E2 is directed to the system of example E1, wherein the neural network product comprises a mask.

Example F1 is directed to a system, comprising: a first ear-worn device comprising: one or more first microphones; first processing circuitry comprising first neural network circuitry; and first communication circuitry; and a second ear-worn device comprising: one or more second microphones; second processing circuitry comprising second neural network circuitry; and second communication circuitry; wherein: the one or more first microphones are configured to generate one or more first microphone signals; the one or more second microphones are configured to generate one or more second microphone signals; the first processing circuitry is configured to process the one or more first microphone signals, thereby generating first data; the second processing circuitry is configured to process the one or more second microphone signals, thereby generating second data; the first communication circuitry and the second communication circuitry are configured to communicate over a wireless communication link; the first communication circuitry is configured to: transmit the first data to the second communication circuitry over the wireless communication link; and receive the second data from the second communication circuitry over the wireless communication link; the second communication circuitry is configured to: transmit the second data to the first communication circuitry over the wireless communication link; and receive the first data from the first communication circuitry over the wireless communication link; and based on the first ear-worn device receiving the second data and the second ear-worn device receiving the first data, the first neural network circuitry and the second neural network circuitry are configured to generate a same neural network product.

Example F2 is directed to the system of example F1, wherein the neural network product comprises a mask.

Example G1 is directed to a system, comprising: a first ear-worn device comprising neural network circuitry; and a second ear-worn device; wherein: the first ear-worn device is configured to: receive second data from the second ear-worn device; generate first data; and input the first and second data, or data originating therefrom, to the neural network circuitry, wherein the neural network circuitry is configured to implement one or more neural networks trained to: process together the first and second data, or the data originating therefrom; and generate, based on processing together the first and second data, or the data originating therefrom, a neural network product.

Example G2 is directed to the system of example G1, wherein the first data and the second data were generated more than 5 milliseconds apart.

Example G3 is directed to the system of example G1, wherein the first data and the second data were generated more than 10 milliseconds apart.

Example G4 is directed to the system of example G1, wherein the first data and the second data were generated more than 20 milliseconds apart.

Example G5 is directed to the system of any of examples G1-G4, wherein the second data is generated before the first data.

Example G6 is directed to the system of any of examples G1-G5, wherein the first data was generated during a first sampling window, the second data was generated during a second sampling window, and the first and second sampling windows do not overlap.

Example G7 is directed to the system of example G6, wherein the second sampling window is before the first sampling window.

Example G8 is directed to the system of any of examples G1-G7, wherein the first ear-worn device is configured to receive the second data prior to completing generation of the first data.

Example G9 is directed to the system of any of examples G1-G8, wherein the neural network product comprises a mask.

Example G10 is directed to the system of any of examples G1-G9, wherein the first ear-worn device is configured to receive the second data from the second ear-worn device over a Bluetooth wireless communication link.

Example H1 is directed to an ear-worn device, comprising: a first ear-worn device portion comprising: first processing circuitry comprising first neural network circuitry; a second ear-worn device portion comprising: second processing circuitry comprising second neural network circuitry; wherein: the first neural network circuitry is configured to: receive one or more first audio signals generated by the first processing circuitry; and implement one or more first neural network layers, wherein the first neural network circuitry is configured to use the one or more first neural network layers to generate a first neural network product based on the one or more first audio signals; the second neural network circuitry is configured to: receive one or more second audio signals generated by the second processing circuitry; and implement one or more second neural network layers, wherein the second neural network circuitry is configured to use the one or more second neural network layers to generate a second neural network product based on the one or more second audio signals; and the first processing circuitry is configured to: transmit first data comprising or originating from the first neural network product to the second processing circuitry over internal electrical connections; and receive second data comprising or originating from the second neural network product thereof from the second processing circuitry over the internal electrical connections.

Example H2 is directed to the ear-worn device of example H1, wherein the first data comprises a first mask and the second data comprises a second mask; or the first data comprises a processed version of the first mask and the second data comprises a processed version of the second mask.

Example H3 is directed to the ear-worn device of example H2, wherein the first processing circuitry is configured to combine the first mask with the second mask, thereby generating a first combined mask.

Example H4 is directed to the ear-worn device of example H3, wherein the first processing circuitry is configured, when combining the first mask with the second mask, to average the first mask with the second mask.

Example H5 is directed to the ear-worn device of example H3, wherein the first processing circuitry is configured, when combining the first mask with the second mask, to combine a magnitude portion of the first mask with a magnitude portion of the second mask.

Example H6 is directed to the ear-worn device of example H5, wherein the first combined mask comprises: a magnitude portion based on combining the magnitude portion of the first mask with the magnitude portion of the second mask; and a phase portion based on a phase portion of the first mask.

Example H7 is directed to the ear-worn device of any of examples H5-H6, wherein the first processing circuitry is configured, when combining the magnitude portion of the first mask with the magnitude portion of the second mask, to average the magnitude portion of the first mask with the magnitude portion of the second mask.

Example H8 is directed to the ear-worn device of any of examples H3-H7, wherein the second processing circuitry is configured to combine the first mask with the second mask, thereby generating a second combined mask.

Example H9 is directed to the ear-worn device of example H8, wherein the second processing circuitry is configured, when combining the first mask with the second mask, to average the first mask with the second mask.

Example H10 is directed to the ear-worn device of any of examples H8-H9, wherein the first combined mask and the second combined mask are the same.

Example H11 is directed to the ear-worn device of example H8, wherein the second processing circuitry is configured, when combining the first mask with the second mask, to combine a magnitude portion of the first mask with a magnitude portion of the second mask.

Example H12 is directed to the ear-worn device of example H11, wherein the second combined mask comprises: a magnitude portion based on combining the magnitude portion of the first mask with the magnitude portion of the second mask; and a phase portion based on a phase portion of the second mask.

Example H13 is directed to the ear-worn device of any of examples H11-H12, wherein the second processing circuitry is configured, when combining the magnitude portion of the first mask with the magnitude portion of the second mask, to average the magnitude portion of the first mask with the magnitude portion of the second mask.

Example H14 is directed to the ear-worn device of any of examples H8-H13, wherein magnitude portions of the first combined mask and the second combined mask are the same.

Example H15 is directed to the ear-worn device of any of examples H3-H14, wherein the first processing circuitry is configured to apply the first combined mask to one of the one or more first audio signals.

Example H16 is directed to the ear-worn device of example H15, wherein the one of the one or more first audio signals comprises a beamformed audio signal.

Example H17 is directed to the ear-worn device of any of examples H8-H16, wherein: the first processing circuitry is configured to apply the first combined mask to one of the one or more first audio signals; and the second processing circuitry is configured to apply the second combined mask to one of the one or more second audio signals.

Example H18 is directed to the ear-worn device of example H17, wherein: the one of the one or more first audio signals comprises a beamformed audio signal; and the one of the one or more second audio signals comprises a beamformed audio signal.

Example H19 is directed to the ear-worn device of any of examples H17-H18, wherein the one of the one or more first audio signals and the one of the one or more second audio signals are different.

Example H20 is directed to the ear-worn device of any of examples H3-H14, wherein the first processing circuitry is configured to apply the first combined mask to an audio signal received by the first processing circuitry subsequently to the one or more first audio signals.

Example H21 is directed to the ear-worn device of any of examples H2-H20, wherein the first mask and the second mask each comprise a noise-reducing mask.

Example H22 is directed to the ear-worn device of any of examples H2-H20, wherein the first mask and the second mask each comprise a spatially-focusing mask.

Example H23 is directed to the ear-worn device of any of examples H2-H20, wherein the first mask and the second mask each comprise a noise reducing and spatially-focusing mask.

Example H24 is directed to the ear-worn device of any of examples H2-H23, wherein: the first processing circuitry is configured to compare the first mask with the second mask; the first processing circuitry further comprises mixing circuitry configured to mix at least two audio signals, thereby generating an output audio signal; and based on the comparison, the mixing circuitry is further configured to modulate weighting of the at least two audio signals in the mixing.

Example H25 is directed to the ear-worn device of example H24, wherein the first processing circuitry is configured, when comparing the first mask with the second mask, to: calculate magnitudes of the first mask and the second mask; subtract the magnitudes, thereby generating a difference; and determine an absolute value of the difference.

Example H26 is directed to the ear-worn device of any of examples H24-H25, wherein the mixing circuitry is further configured to generate the output audio signal to include a higher amplitude of noise when the comparison indicates that a difference between the first mask and the second mask has increased.

Example H27 is directed to the ear-worn device of example H1, wherein the at least one second neural network product is a non-final product of the one or more second neural network layers.

Example H28 is directed to the ear-worn device of example H1, wherein the at least one second neural network product is an output by a non-final layer of the one or more second neural network layers.

Example H29 is directed to the ear-worn device of any of examples H2-H28, wherein the second data comprises the processed version of the second mask; and the first ear-worn device is configured to generate the second mask from the second data using decoding or interpolation.

Example H30 is directed to the ear-worn device of any of examples H1-H29, wherein the first neural network circuitry is configured to input the second data or a processed version thereof to at least one of the one or more first neural network layers.

Example H31 is directed to the ear-worn device of example H30, wherein the first neural network circuitry is configured to input the second data or the processed version thereof to the at least one of the one or more first neural network layers when processing audio signals received subsequent to the one or more first audio signals.

Example H32 is directed to the ear-worn device of any of examples H30-H31, wherein the second neural network product is a product of an nth layer of the one or more second neural network layers, and the first neural network circuitry is configured to input the second neural network product to an (n+1)th layer of the one or more first neural network layers.

Example H33 is directed to the ear-worn device of any of examples H30-H32, wherein the first neural network circuitry is configured to input both the second neural network product and the first neural network product to the at least one of the one or more first neural network layers.

Example H34 is directed to the ear-worn device of any of examples H30-H33, wherein the second neural network circuitry is configured to input the first neural network product to at least one of the one or more second neural network layers.

Example H35 is directed to the ear-worn device of example H34, wherein the second neural network circuitry is configured to input the first neural network product to the at least one of the one or more second neural network layers when processing audio signals received subsequent to the one or more second audio signals.

Example H36 is directed to the ear-worn device of any of examples H1-H35, wherein the internal electrical connections comprise wires.

Example H37 is directed to the ear-worn device of any of examples H1-H36, wherein the first neural network product is generated within 10 milliseconds of the second neural network product.

Example H38 is directed to the ear-worn device of any of examples H1-H36, wherein the first neural network product is generated within 5 milliseconds of the second neural network product.

Example H39 is directed to the ear-worn device of any of examples H1-H36, wherein the first neural network product is generated within 3 milliseconds of the second neural network product.

Example H40 is directed to the ear-worn device of any of examples H1-H36, wherein the first neural network product is generated within 10-25 milliseconds of the second neural network product.

Example H41 is directed to the ear-worn device of any of examples H1-H40, wherein the one or more first neural network layers and the one or more second neural network layers are the same.

Example H42 is directed to the ear-worn device of any of examples H1-H40, wherein the one or more first neural network layers and the one or more second neural network layers are different.

Example H43 is directed to the ear-worn device of any of examples H1-H42, wherein the one or more first neural network layers and the one or more second neural network layers are trained to perform noise reduction.

Example H44 is directed to the ear-worn device of any of examples H1-H42, wherein the one or more first neural network layers and the one or more second neural network layers are trained to perform spatial focusing.

Example H45 is directed to the ear-worn device of any of examples H1-H42, wherein the one or more first neural network layers and the one or more second neural network layers are trained to perform noise reduction and spatial focusing.

Example H46 is directed to the ear-worn device of any of examples H1-H45, wherein the ear-worn device comprises eyeglasses.

Example H47 is directed to the ear-worn device of example H46, wherein the first ear-worn device portion comprises a right temple of the eyeglasses and the left ear-worn device portion comprises a left temple of the eyeglasses.

Example H48 is directed to the ear-worn device of any of examples H45-H47, wherein the internal electrical connections are implemented in a front rim of the eyeglasses.

Example H49 is directed to the ear-worn device of any of examples H30-H35, wherein the first neural network circuitry is configured to use the one or more first neural network layers to decode the second data.

Example H50 is directed to the ear-worn device of any of examples H1-H49, wherein the second data comprises some but not all frequencies of the second neural network product.

Example H51 is directed to the ear-worn device of any of examples H1-H49, wherein the second data comprises an encoded version of the second neural network product.

Example I1 is directed to an ear-worn device, comprising: a first ear-worn device portion comprising: one or more first microphones; and first processing circuitry comprising first neural network circuitry; and a second ear-worn device portion comprising: one or more second microphones; second processing circuitry comprising second neural network circuitry; wherein: the one or more first microphones are configured to generate one or more first microphone signals; the one or more second microphones are configured to generate one or more second microphone signals; the first processing circuitry is configured to process the one or more first microphone signals, thereby generating one or more first processed microphone signals; the second processing circuitry is configured to process the one or more second microphone signals, thereby generating one or more second processed microphone signals; the first processing circuitry is configured to: transmit the one or more first processed microphone signals to the second processing circuitry over internal electrical connections; and receive the one or more second processed microphone signals from the second processing circuitry over the internal electrical connections; and the first neural network circuitry is configured to receive one or more audio signals comprising or originating from the one or more first processed microphone signals and the one or more second processed microphone signals and implement one or more first neural network layers trained to perform audio enhancement based on the one or more audio signals.

Example I2 is directed to the ear-worn device of example I1, wherein: the first processing circuitry further comprises first beamforming circuitry; the first beamforming circuitry is configured to perform beamforming on the one or more first processed microphone signals and the one or more second processed microphone signals, thereby generating one or more beamformed audio signals; and the one or more audio signals received by the first neural network circuitry comprise or originate from the one or more beamformed audio signals.

Example I3 is directed to the ear-worn device of example I2, wherein the first beamforming circuitry is configured to beamform together at least two of the one or more first processed microphone signals and at least two of the one or more second processed microphone signals.

Example I4 is directed to the ear-worn device of example I2, wherein the first beamforming circuitry is configured to beamform together at least one of the one or more first processed microphone signals and at least one of the one or more second processed microphone signals.

Example I5 is directed to the ear-worn device of example I2, wherein the one or more beamformed audio signals comprise two or more beamformed audio signals, and the first beamforming circuitry is configured to: beamform together at least two of the one or more first processed microphone signals, thereby generating one or more of the two or more beamformed audio signals; and beamform together at least two of the one or more second processed microphone signals, thereby generating one or more of the two or more beamformed audio signals.

Example I6 is directed to the ear-worn device of example I2, wherein the first beamforming circuitry is not configured to beamform the one or more first processed microphone signals together with the one or more second processed microphone signals.

Example I7 is directed to the ear-worn device of any of examples I2-I6, wherein the one or more beamformed audio signals comprise two or more beamformed audio signals, each having a different beamformed directional pattern.

Example I8 is directed to the ear-worn device of example I7, wherein the two or more beamformed audio signals comprise at least one front-facing beamformed audio signal and at least one rear-facing beamformed audio signal.

Example I9 is directed to the ear-worn device of any of examples I1-I8, wherein: the second processing circuitry is configured to: transmit the one or more second processed microphone signals to the first processing circuitry over the internal electrical connections; and receive the one or more first processed microphone signals from the first processing circuitry over the internal electrical connections.

Example I10 is directed to the ear-worn device of example I9, wherein: the second processing circuitry comprises second beamforming circuitry; and the second beamforming circuitry is configured to perform beamforming on the one or more first processed microphone signals and the one or more second processed microphone signals, thereby generating the one or more beamformed audio signals; and the second neural network circuitry is configured to receive the one or more beamformed audio signals and implement one or more second neural network layers trained to perform audio enhancement based on the one or more beamformed audio signals.

Example I11 is directed to the ear-worn device of example I10, wherein the first beamforming circuitry and the second beamforming circuitry are configured to generate the same one or more beamformed audio signals.

Example I12 is directed to the ear-worn device of example I10, wherein: the one or more first neural network layers and the one or more second neural network layers are the same.

Example I13 is directed to the ear-worn device of example I10, wherein: the one or more first neural network layers and the one or more second neural network layers are different.

Example I14 is directed to the ear-worn device of example I1, wherein: the first processing circuitry comprises first beamforming circuitry; the second processing circuitry comprises second beamforming circuitry; the one or more first processed microphone signals comprise one or more first beamformed signals, and the first processing circuitry is configured to generate the one or more first beamformed signals using the first beamforming circuitry; the one or more second processed microphone signals comprise one or more second beamformed signals, and the second processing circuitry is configured to generate the one or more second beamformed signals using the second beamforming circuitry; and the one or more audio signals comprise or originate from: the one or more first beamformed audio signals and the one or more second beamformed audio signals; and/or one or more beamformed audio signals formed by beamforming at least one of the one or more first beamformed audio signals together with at least one of the one or more second beamformed audio signals.

Example I15 is directed to the ear-worn device of example I14, wherein the one or more audio signals comprise the one or more first beamformed audio signals and the one or more second beamformed audio signals, and the first beamforming circuitry is not configured to beamform the one or more first beamformed audio signals together with the one or more second beamformed audio signals.

Example I16 is directed to the ear-worn device of any of examples I14-I15, wherein: the second processing circuitry is configured to: transmit the one or more second beamformed audio signals to the first processing circuitry over the internal electrical connections; and receive the one or more first beamformed audio signals from the first processing circuitry over the internal electrical connections.

Example I17 is directed to the ear-worn device of example I16, wherein: the second neural network circuitry is configured to receive the one or more audio signals and implement one or more second neural network layers trained to perform audio enhancement based on the one or more audio signals.

Example I18 is directed to the ear-worn device of example I16, wherein: the one or more first neural network layers and the one or more second neural network layers are the same.

Example I19 is directed to the ear-worn device of example I16, wherein: the one or more first neural network layers and the one or more second neural network layers are different.

Example I20 is directed to the ear-worn device of any of examples I1-I19 wherein the first neural network circuitry and the second neural network circuitry are configured to generate, based on the one or more audio signals, a same mask, or at least a same mask magnitude portion.

Example I21 is directed to the ear-worn device of example I20, wherein the mask comprises a noise-reducing mask.

Example I22 is directed to the ear-worn device of example I20, wherein the mask comprises a spatially-focusing mask.

Example I23 is directed to the ear-worn device of example I20, wherein the mask comprises a noise-reducing and spatially-focusing mask.

Example I24 is directed to the ear-worn device of any of examples I1-I23, wherein the first processing circuitry is configured to generate a spatially-focused output audio signal having a narrower focus than if the first processing circuitry did not receive the one or more second processed microphone signals from the second processing circuitry.

Example I25 is directed to the ear-worn device of any of example I1-I24, wherein the internal electrical connections comprise wires.

Example I26 is directed to the ear-worn device of any of examples I1-I25, wherein the first processed microphone signals are generated within 10 milliseconds of the second processed microphone signals.

Example I27 is directed to the ear-worn device of any of examples I1-I26, wherein the first processed microphone signals are generated within 5 milliseconds of the second processed microphone signals.

Example I28 is directed to the ear-worn device of any of examples I1-I26, wherein the first processed microphone signals are generated within 3 milliseconds of the second processed microphone signals.

Example I29 is directed to the ear-worn device of any of examples I1-I9, I14-I16, and I20-I28, wherein: the second neural network circuitry is configured to implement one or more second neural network layers; and the one or more first neural network layers and the one or more second neural network layers are the same.

Example I26 is directed to the ear-worn device of any of examples I1-I9, I14-I16, and I20-I28, wherein: the second neural network circuitry is configured to implement one or more second neural network layers; and the one or more first neural network layers and the one or more second neural network layers are different.

Example I27 is directed to the ear-worn device of example I1, wherein: the second neural network circuitry is configured to implement one or more second neural network layers; and the one or more first neural network layers implemented by the first neural network circuitry and the one or more second neural network layers implemented by the second neural network circuitry are configured to receive inputs comprising or originating from the one or more audio signals, with a same ordering of the inputs.

Example I28 is directed to the ear-worn device of example I27, wherein: the first processing circuitry and the second processing circuitry are configured to order the inputs with the same ordering based on different indications programmed into or received by the first and second processing circuitry.

Example I29 is directed to the ear-worn device of any of examples I27-I28, wherein the one or more first neural network layers and the one or more second neural network layers are the same.

Example I30 is directed to the ear-worn device of any of examples I27-I29, wherein the first processing circuitry is not configured to perform binaural data transfer downstream of the first neural network circuitry and the second processing circuitry is not configured to perform binaural data transfer downstream of the second neural network circuitry.

Example I31 is directed to the ear-worn device of any of examples I1-I30, wherein the ear-worn device comprises eyeglasses.

Example I32 is directed to the ear-worn device of example I31, wherein the first ear-worn device portion comprises a right temple of the eyeglasses and the left ear-worn device portion comprises a left temple of the eyeglasses.

Example I33 is directed to the ear-worn device of any of examples I31-I32, wherein the internal electrical connections are implemented in a front rim of the eyeglasses.

Example J1 is directed to an ear-worn device, comprising: a first ear-worn device portion comprising: first processing circuitry comprising: first neural network circuitry configured to implement a neural network; and first mixing circuitry configured to mix at least two audio signals, thereby generating an output audio signal; a second ear-worn device portion comprising second processing circuitry; wherein: the first processing circuitry is configured to calculate a first value for an environmental metric; the first processing circuitry is configured to: transmit the first value for the environmental metric to the second processing circuitry over internal electrical connections; and receive a second value for the environmental metric from the second processing circuitry over the internal electrical connections; and the first mixing circuitry is further configured to mix the at least two audio signals based, at least in part, on the second value for the environmental metric.

Example J2 is directed to the ear-worn device of example J1, wherein the first mixing circuitry is configured, when mixing the at least two audio signals based, at least in part, on the second value for the environmental metric, to modulate weighting of the at least two audio signals based, at least in part, on the second value for the environmental metric Example J3 is directed to the ear-worn device of any of examples J1-J2, wherein: the environmental metric is a running average of signal-to-noise ratio (SNR); the first value comprises a first SNR value at the first ear-worn device portion, and the second value comprises a second SNR value at the second car-worn device portion.

Example J4 is directed to the ear-worn device of example J3, wherein the first mixing circuitry is configured, when mixing the at least two audio signals based, at least in part, on the second value for the environmental metric, to mix the at least two audio signals based, at least in part, on a lower of the first SNR value and the second SNR value.

Example J5 is directed to the ear-worn device of example J4, wherein the mixing circuitry is further configured to generate an output audio signal to include a higher amplitude of noise in the output audio signal when the lower of the first SNR value and the second SNR value has decreased.

Example J6 is directed to the ear-worn device of any of examples J1-J5, wherein the ear-worn device comprises eyeglasses.

Example J7 is directed to the ear-worn device of example J6, wherein the first ear-worn device portion comprises a right temple of the eyeglasses and the left ear-worn device portion comprises a left temple of the eyeglasses.

Example J8 is directed to the ear-worn device of any of examples J6-J7, wherein the internal electrical connections are implemented in a front rim of the eyeglasses.

Example K1 is directed to an ear-worn device, comprising: a first ear-worn device portion comprising: one or more first microphones; and first processing circuitry comprising first neural network circuitry; a second ear-worn device portion comprising: one or more second microphones; and second processing circuitry comprising second neural network circuitry; wherein: the one or more first microphones are configured to generate one or more first microphone signals; the one or more second microphones are configured to generate one or more second microphone signals; the first processing circuitry is configured to process the one or more first microphone signals, thereby generating first data; the second processing circuitry is configured to process the one or more second microphone signals, thereby generating second data; the first processing circuitry is configured to: transmit the first data to the second processing circuitry over internal electrical connections; and receive the second data from the second processing circuitry over the internal electrical connections; the second processing circuitry is configured to: transmit the second data to the first processing circuitry over the internal electrical connections; and receive the first data from the first processing circuitry over the internal electrical connections; the first neural network circuitry is configured to implement one or more first neural network layers configured to receive inputs comprising or originating from the first data and the second data and trained to generate an audio-enhancing mask based on the inputs; and the second neural network circuitry is configured to implement one or more second neural network layers configured to receive the inputs comprising or originating from the first data and the second data and trained to generate the audio-enhancing mask based on the inputs; wherein: the one or more first neural network layers implemented by the first neural network circuitry and the one or more second neural network layers implemented by the second neural network circuitry are configured to receive the inputs with a same ordering of the inputs.

Example K2 is directed to the ear-worn device of example K1, wherein: the first processing circuitry and the second processing circuitry are configured to order the inputs with the same ordering based on different indications programmed into or received by the first and second processing circuitry.

Example K3 is directed to the ear-worn device of any of examples K1-K2, wherein the one or more first neural network layers and the one or more second neural network layers are the same.

Example K4 is directed to the ear-worn device of any of examples K1-K3, wherein the first processing circuitry is not configured to perform binaural data transfer downstream of the first neural network circuitry and the second processing circuitry is not configured to perform binaural data transfer downstream of the second neural network circuitry.

Example K5 is directed to the ear-worn device of any of examples K1-K4, wherein the ear-worn device comprises eyeglasses.

Example K6 is directed to the ear-worn device of example K5, wherein the first ear-worn device portion comprises a right temple of the eyeglasses and the left ear-worn device portion comprises a left temple of the eyeglasses.

Example K7 is directed to the ear-worn device of any of examples K5-K6, wherein the internal electrical connections are implemented in a front rim of the eyeglasses.

Example L1 is directed to an ear-worn device, comprising: a first ear-worn device portion comprising first processing circuitry; and a second ear-worn device portion comprising second processing circuitry; wherein: the first processing circuitry is configured to receive second data from the second processing circuitry; the second processing circuitry is configured to receive first data from the second processing circuitry; and based on the first processing circuitry receiving the second data and the second processing circuitry receiving the first data, the first processing circuitry and the second processing circuitry are configured to generate a same neural network product.

Example L2 is directed to the ear-worn device of example L1, wherein the neural network product comprises a mask.

Example L3 is directed to the ear-worn device of any of examples L1-L2, wherein the ear-worn device comprises eyeglasses.

Example L4 is directed to the ear-worn device of example H46, wherein the first ear-worn device portion comprises a right temple of the eyeglasses and the left ear-worn device portion comprises a left temple of the eyeglasses.

Example M1 is directed to an ear-worn device, comprising: a first ear-worn device portion comprising: one or more first microphones; and first processing circuitry comprising first neural network circuitry; a second ear-worn device portion comprising: one or more second microphones; and second processing circuitry comprising second neural network circuitry; wherein: the one or more first microphones are configured to generate one or more first microphone signals; the one or more second microphones are configured to generate one or more second microphone signals; the first processing circuitry is configured to process the one or more first microphone signals, thereby generating first data; the second processing circuitry is configured to process the one or more second microphone signals, thereby generating second data; the first processing circuitry is configured to: transmit the first data to the second processing circuitry over internal electrical connections; and receive the second data from the second processing circuitry over the internal electrical connections; the second processing circuitry is configured to: transmit the second data to the first processing circuitry over the internal electrical connections; and receive the first data from the first processing circuitry over the internal electrical connections; and based on the first processing circuitry receiving the second data and the second processing circuitry receiving the first data, the first neural network circuitry and the second neural network circuitry are configured to generate a same neural network product.

Example M2 is directed to the ear-worn device of example M1, wherein the neural network product comprises a mask.

Example M3 is directed to the ear-worn device of any of examples M1-M2, wherein the ear-worn device comprises eyeglasses.

Example M4 is directed to the ear-worn device of example M3, wherein the first ear-worn device portion comprises a right temple of the eyeglasses and the left ear-worn device portion comprises a left temple of the eyeglasses.

Example M5 is directed to the car-worn device of any of examples M4-M5, wherein the internal electrical connections are implemented in a front rim of the eyeglasses.

Example N1 is directed to an ear-worn device, comprising: a first ear-worn device portion comprising first processing circuitry, the first processing circuitry comprising neural network circuitry; and a second ear-worn device portion comprising second processing circuitry; wherein: the first processing circuitry is configured to: receive second data from the second processing circuitry; generate first data; and input the first and second data, or data originating therefrom, to the neural network circuitry, wherein the neural network circuitry is configured to implement one or more neural networks trained to: process together the first and second data, or the data originating therefrom; and generate, based on processing together the first and second data, or the data originating therefrom, a neural network product.

Example N2 is directed to the car-worn device of example N1, wherein the first data and the second data were generated more than 5 milliseconds apart.

Example N3 is directed to the ear-worn device of example N1, wherein the first data and the second data were generated more than 10 milliseconds apart.

Example N4 is directed to the ear-worn device of example N1, wherein the first data and the second data were generated more than 20 milliseconds apart.

Example N5 is directed to the ear-worn device of any of examples N1-N4, wherein the second data is generated before the first data.

Example N6 is directed to the ear-worn device of any of examples N1-N5, wherein the first data was generated during a first sampling window, the second data was generated during a second sampling window, and the first and second sampling windows do not overlap.

Example N7 is directed to the ear-worn device of example N6, wherein the second sampling window is before the first sampling window.

Example N8 is directed to the ear-worn device of any of examples N1-N7, wherein the first processing circuitry is configured to receive the second data prior to completing generation of the first data.

Example N9 is directed to the ear-worn device of any of examples N1-N8, wherein the neural network product comprises a mask.

Example N10 is directed to the ear-worn device of any of examples N1-N9, wherein the first processing circuitry is configured to receive the second data from the second processing circuitry over internal electrical connections.

Example N11 is directed to the ear-worn device of any of examples N1-N10, wherein the ear-worn device comprises eyeglasses.

Example N12 is directed to the ear-worn device of example N11, wherein the first ear-worn device portion comprises a right temple of the eyeglasses and the left ear-worn device portion comprises a left temple of the eyeglasses.

Example N13 is directed to the ear-worn device of any of examples N11-N12, wherein the first processing circuitry is configured to receive the second data from the second processing circuitry over internal electrical connections implemented in a front rim of the eyeglasses.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above may comprise hardware, software or a combination of hardware and software.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be objects of this disclosure. Accordingly, the foregoing description and drawings are by way of example only.

The invention claimed is:

1. A system, comprising:

a first ear-worn device comprising:
- first neural network circuitry, and
- first communication circuitry; and a second ear-worn device comprising:
- second neural network circuitry, and
- second communication circuitry;

wherein:
- the first communication circuitry and the second communication circuitry are
- configured to communicate over a wireless communication link;

the first neural network circuitry is configured to:
receive one or more first audio signals generated by the first ear-worn device, and
implement one or more first neural network layers, wherein the first neural network circuitry is configured to use the one or more first neural network layers to generate a first neural network product based on the one or more first audio signals;
the second neural network circuitry is configured to:
receive one or more second audio signals generated by the second ear-worn device, and
implement one or more second neural network layers, wherein the second neural network circuitry is configured to use the one or more second neural network layers to generate a second neural network product based on the one or more second audio signals;
the first communication circuitry is configured to:
transmit, to the second communication circuitry over the wireless communication link, first data comprising or originating from the first neural network product, and
receive, from the second communication circuitry over the wireless communication link, second data comprising or originating from the second neural network product;
the first data comprises a first mask and the second data comprises a second mask, or the first data comprises a processed version of the first mask and the second data comprises a processed version of the second mask;
the first ear-worn device is configured to combine the first mask with the second mask, thereby generating a first combined mask;
the first ear-worn device is configured, when combining the first mask with the second mask, to combine a magnitude portion of the first mask with a magnitude portion of the second mask; and
the first combined mask comprises:
a magnitude portion based on combining the magnitude portion of the first mask with the magnitude portion of the second mask, and
a phase portion based on a phase portion of the first mask.

2. The system of claim 1, wherein the first ear-worn device is configured, when combining the magnitude portion of the first mask with the magnitude portion of the second mask, to average the magnitude portion of the first mask with the magnitude portion of the second mask.

3. The system of claim 1, wherein the second ear-worn device is configured to combine the first mask with the second mask, thereby generating a second combined mask.

4. The system of claim 3, wherein the first combined mask and the second combined mask are the same.

5. The system of claim 3, wherein magnitude portions of the first combined mask and the second combined mask are the same.

6. The system of claim 3, wherein:
the first ear-worn device is configured to apply the first combined mask to one of the one or more first audio signals;
the second ear-worn device is configured to apply the second combined mask to one of the one or more second audio signals;
the one of the one or more first audio signals comprises a beamformed audio signal; and
the one of the one or more second audio signals comprises a beamformed audio signal.

7. The system of claim 3, wherein:
the first ear-worn device is configured to apply the first combined mask to one of the one or more first audio signals;
the second ear-worn device is configured to apply the second combined mask to one of the one or more second audio signals; and
the one of the one or more first audio signals and the one of the one or more second audio signals are different.

8. The system of claim 1, wherein the first ear-worn device is configured to apply the first combined mask to an audio signal received by the first ear-worn device subsequently to when the one or more first audio signals are received.

9. The system of claim 1, wherein:
the second data comprises the processed version of the second mask; and
the first ear-worn device is configured to generate the second mask from the second data using decoding or interpolation.

10. The system of claim 1, wherein the second data comprises an encoded version of the second neural network product.

11. A system, comprising:
a first ear-worn device comprising:
first neural network circuitry, and
first communication circuitry; and
a second ear-worn device comprising:
second neural network circuitry, and
second communication circuitry;
wherein:
the first communication circuitry and the second communication circuitry are configured to communicate over a wireless communication link;
the first neural network circuitry is configured to:
receive one or more first audio signals generated by the first ear-worn device, and
implement one or more first neural network layers, wherein the first neural network circuitry is configured to use the one or more first neural network layers to generate a first neural network product based on the one or more first audio signals;
the second neural network circuitry is configured to:
receive one or more second audio signals generated by the second ear-worn device, and
implement one or more second neural network layers, wherein the second neural network circuitry is configured to use the one or more second neural network layers to generate a second neural network product based on the one or more second audio signals;
the first communication circuitry is configured to:
transmit, to the second communication circuitry over the wireless communication link, first data comprising or originating from the first neural network product, and
receive, from the second communication circuitry over the wireless communication link, second data comprising or originating from the second neural network product;
the first data comprises a first mask and the second data comprises a second mask, or the first data comprises a processed version of the first mask and the second data comprises a processed version of the second mask;

the first ear-worn device is configured to compare the first mask with the second mask;

the first ear-worn device further comprises mixing circuitry configured to perform mixing of at least two audio signals, thereby generating an output audio signal; and based on the comparison, the mixing circuitry is further configured to modulate weighting of the at least two audio signals in the mixing.

12. The system of claim 11, wherein:

the second data comprises the processed version of the second mask; and the first ear-worn device is configured to generate the second mask from the second data using decoding or interpolation.

13. The system of claim 11, wherein the second data comprises an encoded version of the second neural network product.

14. A system, comprising:

a first ear-worn device comprising:

one or more first microphones configured to generate one or more first microphone signals, first processing circuitry comprising first neural network circuitry, the first processing circuitry configured to process the one or more first microphone signals, thereby generating first data, and first communication circuitry; and a second ear-worn device comprising:

one or more second microphones configured to generate one or more second microphone signals, second processing circuitry comprising second neural network circuitry, the second processing circuitry configured to process the one or more second microphone signals, thereby generating second data, and second communication circuitry;

wherein:

the first communication circuitry and the second communication circuitry are configured to communicate over a wireless communication link;

the first communication circuitry is configured to:

transmit the first data to the second communication circuitry over the wireless communication link, and receive the second data from the second communication circuitry over the wireless communication link;

the second communication circuitry is configured to:

transmit the second data to the first communication circuitry over the wireless communication link, and receive the first data from the first communication circuitry over the wireless communication link;

the first neural network circuitry is configured to:

implement one or more first neural network layers configured to receive inputs comprising or originating from the first data and the second data;

the second neural network circuitry is configured to:

implement one or more second neural network layers configured to receive the inputs comprising or originating from the first data and the second data; and based on the first ear-worn device receiving the second data and the second ear-worn device receiving the first data, the first neural network circuitry and the second neural network circuitry are configured to generate same neural network products having same values.

15. The system of claim 14, wherein the first neural network circuitry is configured to input the second data or the processed version thereof to the at least one of the one or more first neural network layers when processing audio signals received subsequent to the one or more first audio signals.

16. The system of claim 14, wherein the first neural network circuitry is configured to use the one or more first neural network layers to decode the second data.

17. The system of claim 14, wherein the second data comprises an encoded version of the second neural network product.

18. The system of claim 14, wherein the first neural network circuitry and the second neural network circuitry are configured, when generating the same neural network products having the same values, to generate masks having same magnitude portions.

19. The system of claim 14, wherein the first neural network circuitry and the second neural network circuitry are configured, when generating the same neural network products having the same values, to generate masks having same magnitude portions and different phase portions.

20. A system, comprising:

a first ear-worn device comprising:

one or more first microphones configured to generate one or more first microphone signals, first processing circuitry comprising first neural network circuitry, the first processing circuitry configured to process the one or more first microphone signals, thereby generating first data, and first communication circuitry; and a second ear-worn device comprising:

one or more second microphones configured to generate one or more second microphone signals, second processing circuitry comprising second neural network circuitry, the second processing circuitry configured to process the one or more second microphone signals, thereby generating second data, and second communication circuitry;

wherein:

the first communication circuitry and the second communication circuitry are configured to communicate over a wireless communication link;

the first communication circuitry is configured to:

transmit the first data to the second communication circuitry over the wireless communication link, and receive the second data from the second communication circuitry over the wireless communication link; and the first neural network circuitry is configured to:

implement one or more first neural network layers configured to receive inputs comprising or originating from the first data and the second data, and generate a neural network product based on the first data and the second data, wherein the second data originates from an earlier frame of audio data than the first data.

21. The system of claim 20, wherein the second data comprises an encoded version of the second neural network product.

22. The system of claim 20, wherein the first data and the second data are generated at least 2-20 milliseconds apart.

* * * * *